US010173798B2

(12) United States Patent
Hoepner et al.

(10) Patent No.: US 10,173,798 B2
(45) Date of Patent: Jan. 8, 2019

(54) APPARATUS AND METHOD FOR INSERTING ONE OR MORE GOODS INTO A MOVE-ABLE COVER

(71) Applicant: BOEWE SYSTEC GmbH, Augsburg (DE)

(72) Inventors: Bernd Hoepner, Augsburg (DE); Thomas Huber, Stadtbergen (DE); Joseph Batzer, Leitershofen (DE); Helmut Foerg, Grossaitingen (DE); Reinhard Seiler, Aindling (DE)

(73) Assignee: BOEWE SYSTEC GMBH, Augsburg (DE)

( * ) Notice: Subject to any disclaimer, the term of this patent is extended or adjusted under 35 U.S.C. 154(b) by 969 days.

(21) Appl. No.: 13/669,904

(22) Filed: Nov. 6, 2012

(65) Prior Publication Data
US 2013/0055689 A1   Mar. 7, 2013

Related U.S. Application Data

(63) Continuation of application No. PCT/EP2011/057338, filed on May 6, 2011.
(Continued)

(30) Foreign Application Priority Data

May 7, 2010 (EP) ..................... 10162320

(51) Int. Cl.
*B65B 43/54* (2006.01)
*B65B 35/56* (2006.01)
(Continued)

(52) U.S. Cl.
CPC .............. *B65B 35/56* (2013.01); *B43M 3/04* (2013.01); *B43M 3/045* (2013.01); *B65B 5/00* (2013.01);
(Continued)

(58) Field of Classification Search
CPC ....... B43M 3/04; B43M 3/045; B65H 29/242; B65H 11/005; B65B 5/04; B65B 5/00; B65B 35/56; B65G 15/58
(Continued)

(56) References Cited

U.S. PATENT DOCUMENTS 2,771,726 A    11/1956 Owen et al.
3,423,900 A *   1/1969 Orsinger .................. 53/473
(Continued)

FOREIGN PATENT DOCUMENTS

CN      1360553 A      7/2002
DE   42 05 197 C2      8/1993
(Continued)

OTHER PUBLICATIONS

Official Communication issued in International Patent Application No. PCT/EP2011/057338, dated Oct. 21, 2011.
(Continued)

*Primary Examiner* — Michelle Lopez
*Assistant Examiner* — Chinyere Rushing-Tucker
(74) *Attorney, Agent, or Firm* — Keating & Bennett, LLP

(57) ABSTRACT

An apparatus for inserting one or more goods into a moving cover includes a cover transport, and at least one separating device configured to engage with a first part of the cover and to maintain the first part of the cover separate from a second part of the cover during at least a part of the movement of the cover.

16 Claims, 39 Drawing Sheets

Related U.S. Application Data

(60) Provisional application No. 61/332,338, filed on May 7, 2010.

(51) Int. Cl.

| | | |
|---|---|---|
| *B43M 3/04* | (2006.01) | |
| *B65H 29/24* | (2006.01) | |
| *B65B 5/00* | (2006.01) | |
| *B65G 15/58* | (2006.01) | |
| *B65H 11/00* | (2006.01) | |
| *B65B 5/04* | (2006.01) | |

(52) U.S. Cl.
CPC ............... *B65B 5/04* (2013.01); *B65G 15/58* (2013.01); *B65H 11/005* (2013.01); *B65H 29/242* (2013.01); *B65H 2404/22* (2013.01); *B65H 2404/232* (2013.01); *B65H 2404/243* (2013.01); *B65H 2406/32231* (2013.01); *B65H 2701/1916* (2013.01); *B65H 2801/66* (2013.01)

(58) Field of Classification Search
USPC ........... 53/492, 381.1, 381.7, 564, 460, 569, 53/284.3; 270/58.06
See application file for complete search history.

(56) References Cited

U.S. PATENT DOCUMENTS

| | | | |
|---|---|---|---|
| 3,858,381 A | | 1/1975 | Huber et al. |
| 3,861,669 A | | 1/1975 | Kubo et al. |
| 4,020,615 A | | 5/1977 | Irvine et al. |
| 4,479,573 A | | 10/1984 | Ackley, Sr. et al. |
| 4,525,986 A | * | 7/1985 | Noll .................................. 53/569 |
| 4,674,258 A | | 6/1987 | Ehlscheid et al. |
| 4,817,368 A | | 4/1989 | DePasquale et al. |
| 5,082,255 A | | 1/1992 | Brigante et al. |
| 5,247,780 A | | 9/1993 | Kulpa et al. |
| 5,374,044 A | | 12/1994 | Belec et al. |
| 5,414,977 A | * | 5/1995 | Cohen ............................. 53/460 |
| 5,430,990 A | | 7/1995 | Long |
| 5,447,015 A | * | 9/1995 | Belec et al. .................... 53/492 |
| 5,454,464 A | | 10/1995 | Yamamoto et al. |
| 5,706,636 A | | 1/1998 | Eckl |
| 6,134,865 A | | 10/2000 | Long |
| 6,164,046 A | | 12/2000 | Werner et al. |
| 6,540,065 B2 | | 4/2003 | Kurabe et al. |
| 7,051,496 B2 | | 5/2006 | Heilman |
| 8,037,992 B2 | | 10/2011 | Ackley, Jr. |
| 2002/0112453 A1 | * | 8/2002 | Rivenbark et al. ............. 53/460 |
| 2003/0128253 A1 | | 7/2003 | Kitahara et al. |
| 2003/0150194 A1 | | 8/2003 | Ponti |
| 2004/0080091 A1 | | 4/2004 | DaCunha |
| 2004/0080099 A1 | | 4/2004 | Janatka et al. |
| 2005/0060966 A1 | * | 3/2005 | Ballestrazzi et al. ............ 53/569 |
| 2005/0246139 A1 | * | 11/2005 | Rivenbark et al. ............ 702/189 |
| 2007/0157578 A1 | | 7/2007 | Fairweather et al. |
| 2008/0086983 A1 | * | 4/2008 | Kapturowski et al. ...... 53/381.5 |
| 2009/0313950 A1 | * | 12/2009 | Hagemann ...................... 53/467 |
| 2010/0024365 A1 | | 2/2010 | Williams |
| 2010/0059918 A1 | | 3/2010 | Kern et al. |
| 2010/0319300 A1 | * | 12/2010 | Munneke ......................... 53/52 |

FOREIGN PATENT DOCUMENTS

| | | |
|---|---|---|
| EP | 0 701 509 B1 | 4/1997 |
| EP | 1 334 845 A1 | 8/2003 |
| EP | 1 911 602 A2 | 4/2008 |
| EP | 2 149 459 A2 | 2/2010 |
| EP | 1 315 656 B1 | 7/2010 |
| EP | 1 418 840 B1 | 11/2011 |
| EP | 1 468 841 B1 | 12/2011 |
| FR | 2 543 491 A1 | 10/1984 |
| GB | 1 340 890 A | 12/1973 |
| GB | 2 264 279 A | 8/1993 |
| JP | 04-046039 U | 4/1992 |
| JP | 05-107968 A | 4/1993 |
| JP | 9-504754 A | 5/1997 |
| JP | 2002-503608 A | 2/2002 |
| JP | 2002-137840 A | 5/2002 |
| JP | 2007-008598 A | 1/2007 |
| TW | 201010926 A | 3/2010 |
| WO | 94/27832 A1 | 12/1994 |
| WO | 02/096670 A1 | 12/2002 |
| WO | 2010/027522 A1 | 3/2010 |

OTHER PUBLICATIONS

Hoepner et al., "Apparatus and Method for Inserting One or More Goods Into a Moveable Cover", U.S. Appl. No. 13/669,917, filed Nov. 6, 2012.

Official Communication issued in corresponding Chinese Patent Application No. 201180033727.4, dated Jun. 20, 2014.

Batzer et al., "Apparatus and Method for Inserting One or More Goods Into a Moveable Cover," U.S. Appl. No. 13/669,133, filed Nov. 5, 2012.

Batzer et al., "Apparatus and Method for Inserting One or More Goods Into a Moveable Cover," U.S. Appl. No. 13/669,889, filed Nov. 6, 2012.

Batzer et al., "Apparatus and Method for Inserting One or More Goods Into a Moveable Cover," U.S. Appl. No. 13/669,865, filed Nov. 6, 2012.

Official Communication issued in corresponding Chinese Patent Application No. 2011800337096, dated Aug. 28, 2014.

* cited by examiner

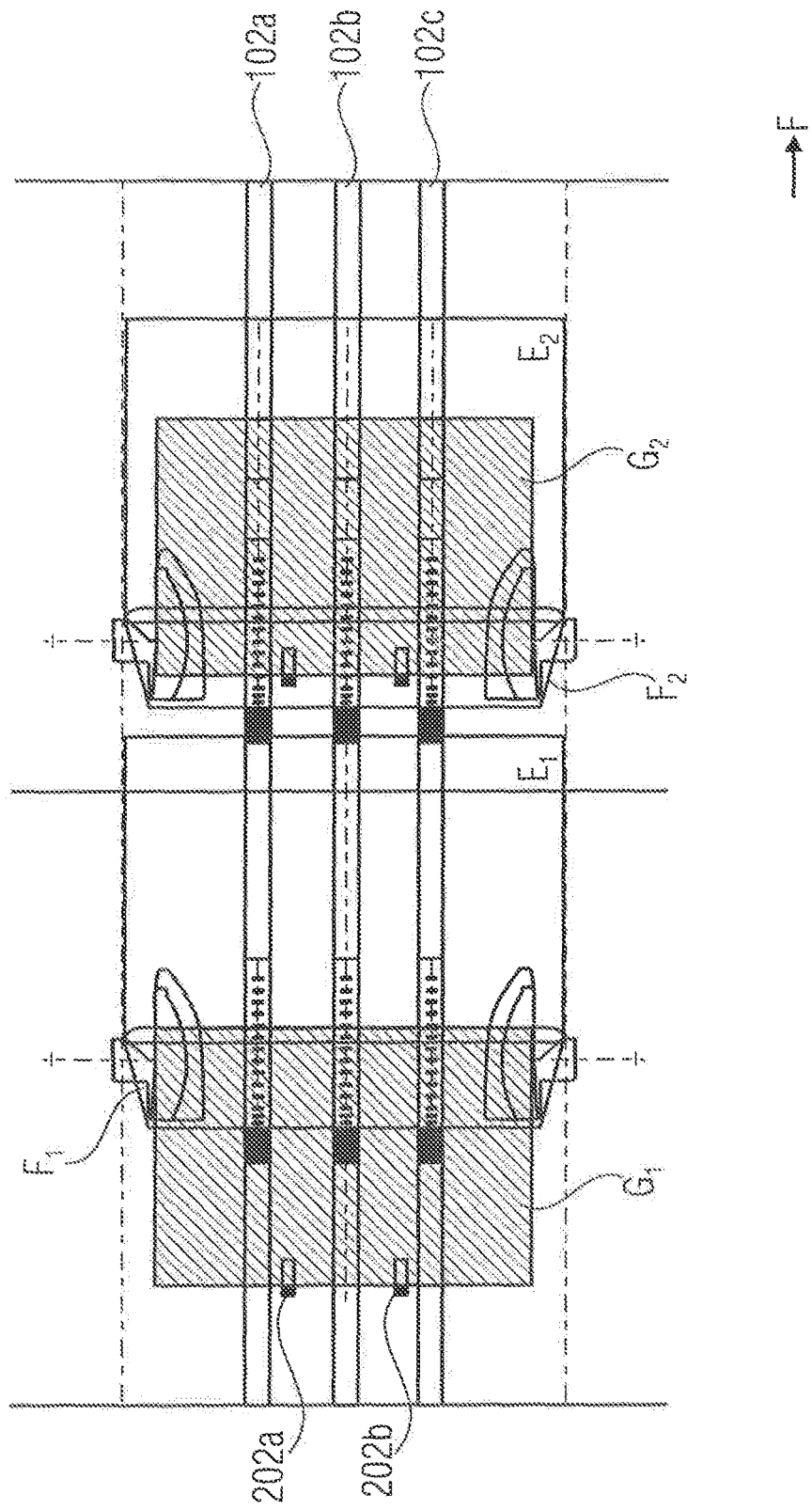

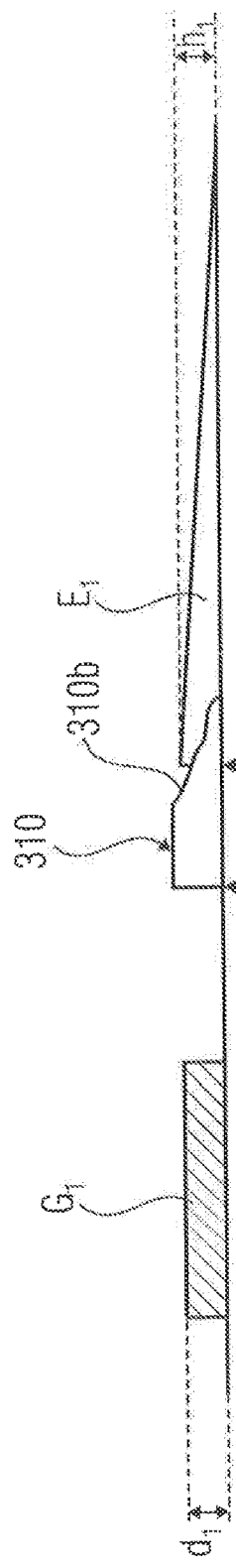

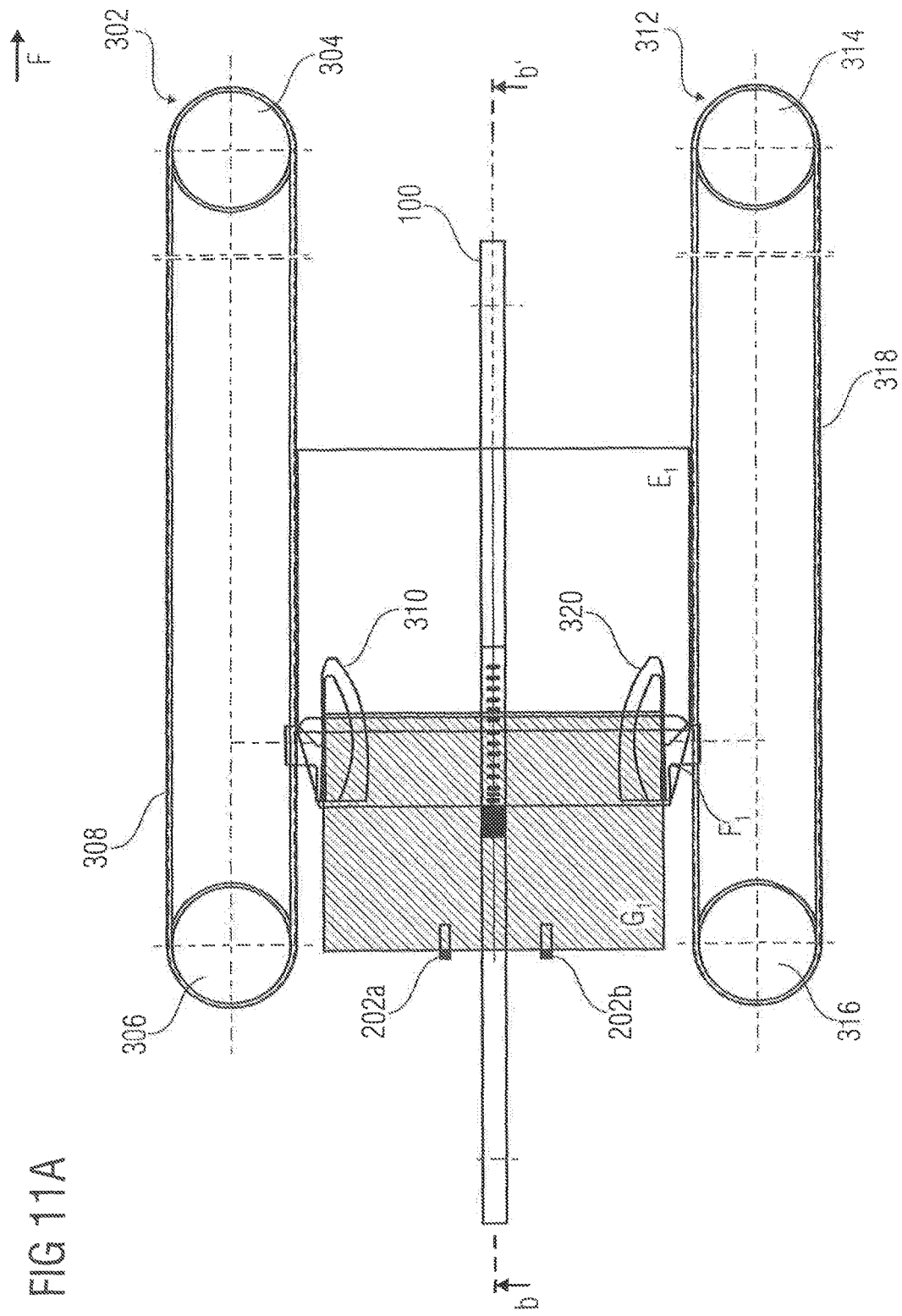

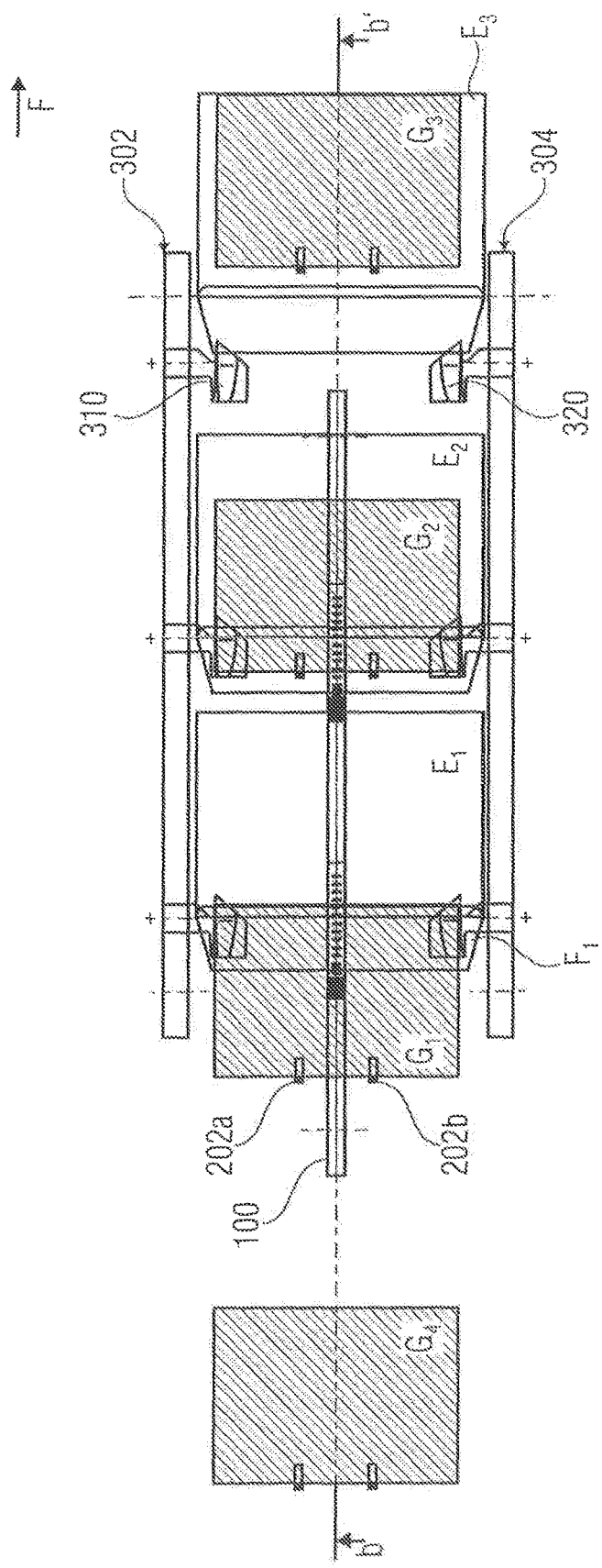

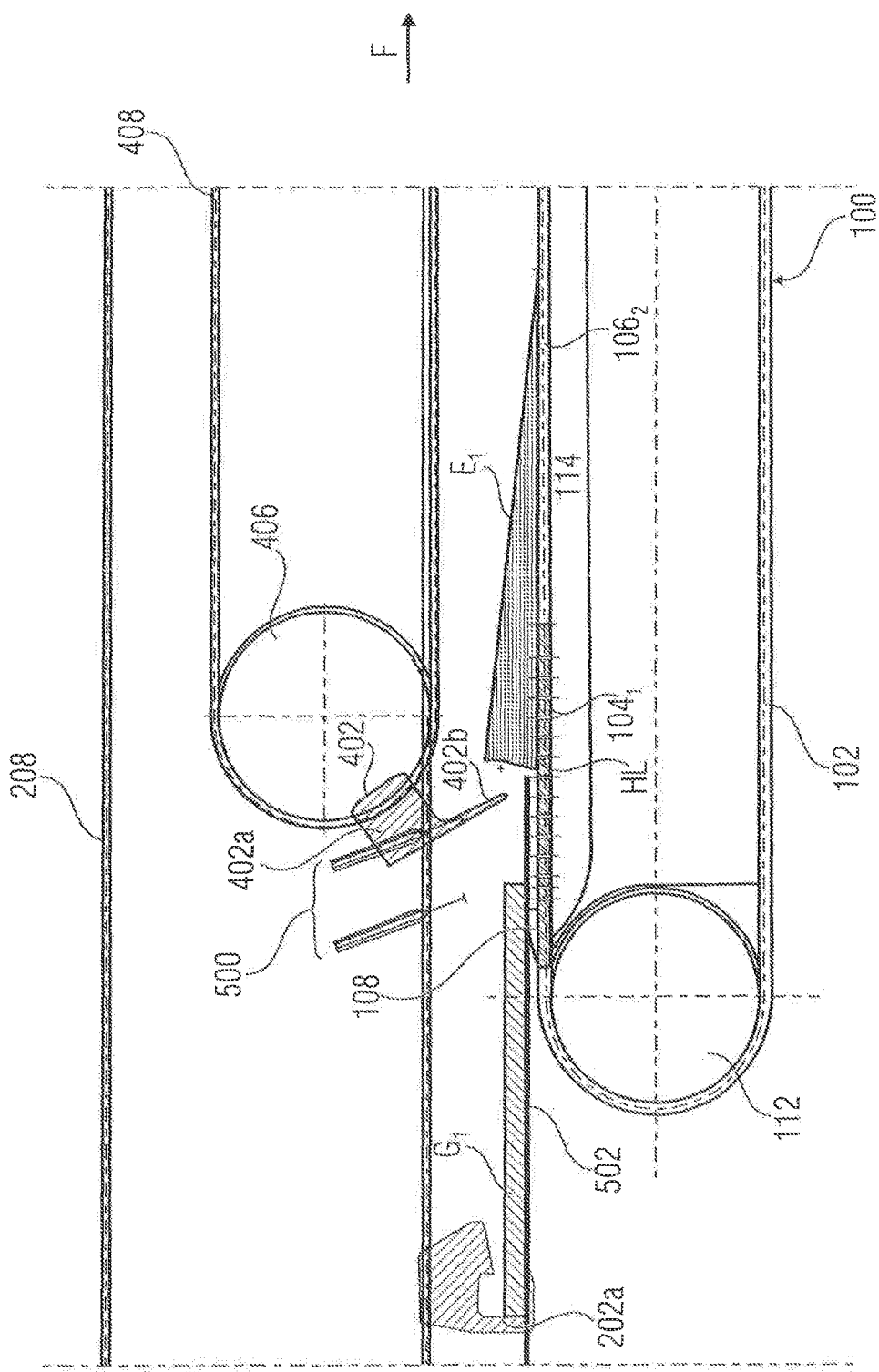

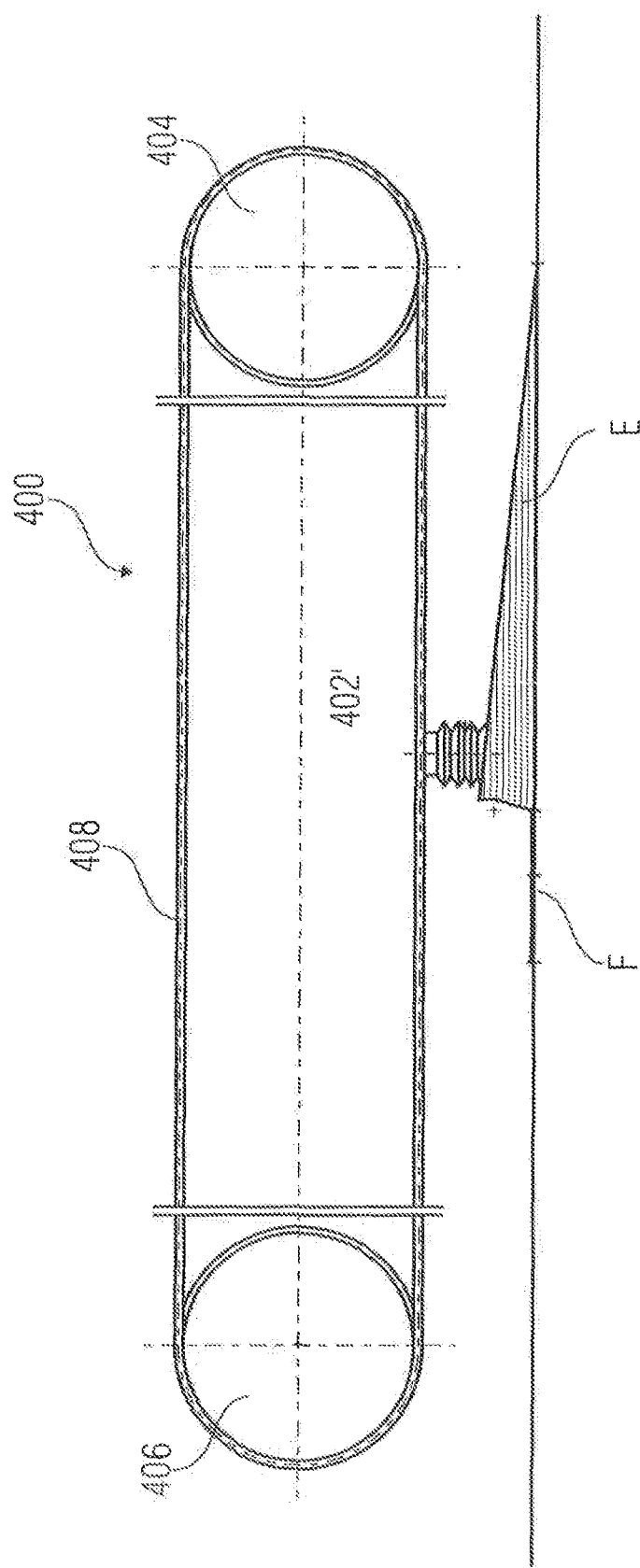

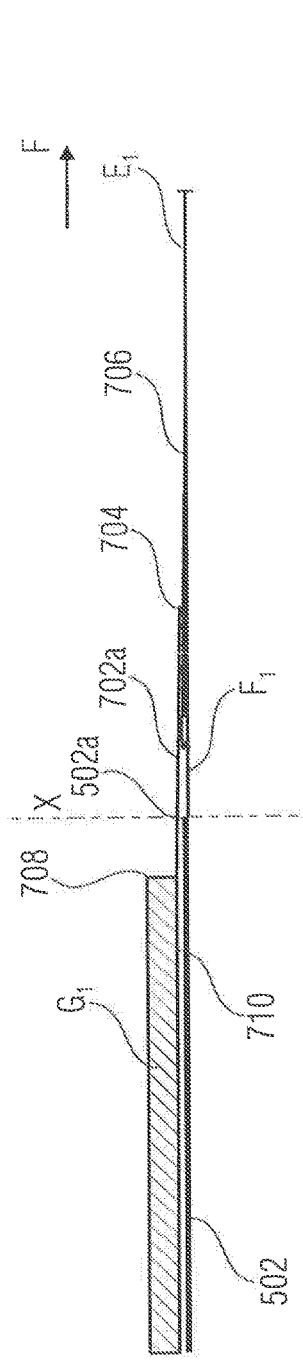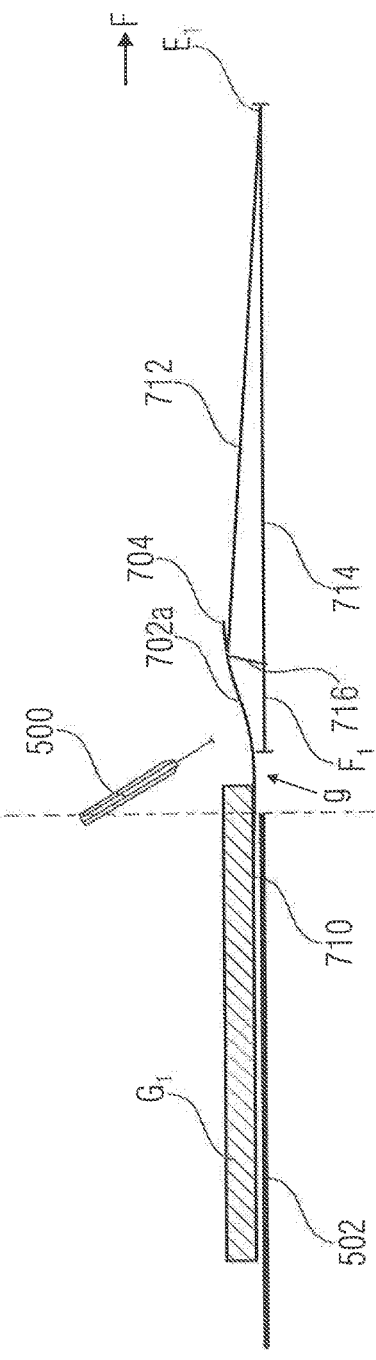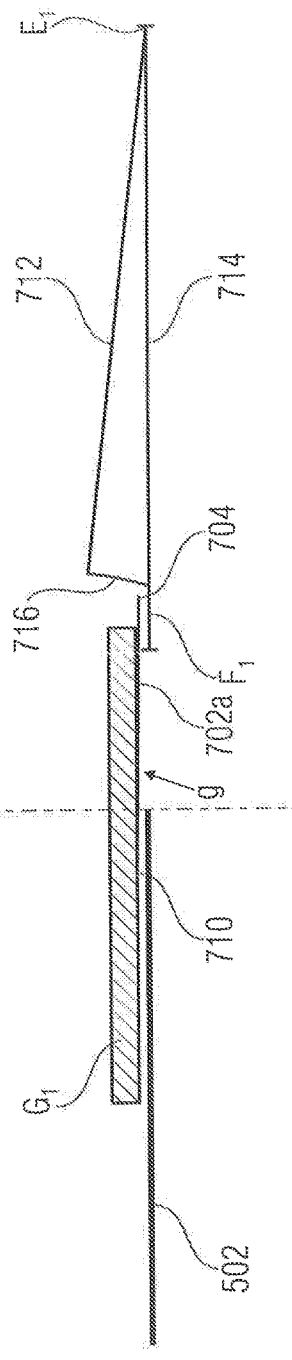

APPARATUS AND METHOD FOR INSERTING ONE OR MORE GOODS INTO A MOVE-ABLE COVER

CROSS-REFERENCE TO RELATED APPLICATIONS

This application is a continuation of copending International Application No. PCT/EP2011/057338, filed May 6, 2011, which is incorporated herein by reference in its entirety, and additionally claims priority from European Application No. EP 10162320.5, filed May 7, 2010, and U.S. Application 61/332,338, filed May 7, 2010, which are all incorporated herein by reference in their entirety.

BACKGROUND OF THE INVENTION

Embodiments of the invention relate to the field of inserting goods into covers, more specifically to a separating device in an apparatus for inserting one or more goods into a moveable cover, for example an envelope.

In the art various approaches for inserting one or more goods into a cover, such as an envelope, are known. In accordance with one approach during the filling process an envelope is stopped and only the goods are moved to be inserted into the envelope. The problem with this kind of inserters is that they operate in a start/stop mode meaning that when filling the one or more goods the envelope needs to be stopped and, after completing the filling process, the envelope is moved out of the filling position and a following envelope is arranged in the filling position and stopped again to allow filling the one or more goods into this new envelope. The problem with this kind of inserter is that the throughput, i.e., the number of envelopes that can be filled with one or more goods during a predetermined period of time, for example within an hour, is limited due to the necessity of decelerating, stopping and accelerating the envelopes during the filling process. Further, the mechanical wear and stress of the respective parts of the inserter, the goods and/or the envelopes is quite high.

Another approach for inserting one or more goods into a cover is to move both the one or more goods and the cover during the filling process. Such an approach is e.g. described in DE 42 05 197 A1, WO 94/27832 A1, U.S. Pat. No. 4,525,986 A, U.S. Pat. No. 3,858,381 A, U.S. Pat. No. 4,817,368 A, U.S. Pat. No. 5,430,990 A and WO 2002/096670 A1. The transport directions of the one or more goods and an envelope extend parallel in the same direction, however, the filling process is such that the one or more goods, the envelope or both are moved angular with respect to the transport direction towards each other. At the beginning of a filling path the envelope and the one or more goods travel side by side with the one or more goods and/or the envelope being moved angular towards each other. Eventually, the goods and the envelope meet such that due to the angular movement of the goods, they are filled into the envelope. In case filling pockets are used for each of the goods, as e.g. described in WO 94/27832 A1 or U.S. Pat. No. 5,430,990 A, a plurality of individual pockets are necessitated, which need to be returned to the starting point so that an additional transport is needed which increases the number of necessitated parts even further as well as the costs. Yet another problem of this kind of filling process are the high kinematic forces that are applied to the envelope and the goods due to the angular transport. Further, the necessity to provide parallel transports for the goods and for the envelope increases the costs, for example due to the fact that at each position respective guidings are necessitated. In terms of the necessitated installation space, quite a lengthy set up is necessitated as well as additional space for placing two transports in parallel. Also the time and efforts for changing the format is high (e.g. it is necessitated to modify a plurality of elements of the pockets for adjustment to the new format) and, basically, these approaches are not flexible with regard to the format processed. In addition, due to the many parts that move, the operation of the device is quite noisy.

Yet another approach teaches to move the one or more goods and the cover or envelope along a common filling or inserting path in such a way that the envelope is moved at least a little bit slower than the one or more goods so that along the filling path the one or more goods eventually "overtake" the envelope, however, since the envelope has its envelope throat opened, this process results in the filling of the goods into the envelope. Such an approach is, for example, described by U.S. Pat. No. 3,423,900 or EP 1 418 840 A1. In accordance with these approaches during the filling process the envelope is moved continuously along the filling path, wherein the transport of the envelope along the filling path is achieved by filling elements that are provided on both sides of the filling path and engaged with the lateral inside edges of the envelope body. However, the filling elements are inserted into the stopped envelope and moving the filling elements along the inserting path will cause the transport of the envelope along the inserting path. The drawback of this approach is that the filling elements cause the transport of the envelope so that a precise placement of these envelopes onto the filling elements is necessitated. Therefore, handling of the envelopes becomes difficult in case of deviations in the format, e.g. due to manufacturing tolerance which may be in the range of about 1.5 mm. Such tolerances in the width direction of the envelope result in the envelope to be either clamped on the filling elements or to be held by the filling elements loosely; in either case no reliable transport of the envelopes is possible. In case a clamping occurs the removal of the filled envelope from the filling elements is difficult. Further, it is not possible to actively decelerate the transport mechanism as this would result in the envelopes to slide off the filling elements. Also, there is no flexibility allowing for an easy change of the formats processed. Yet another problem with the approach of U.S. Pat. No. 3,423,900 or EP 1 418 840 A1 is that, as mentioned above, tolerances of the dimensions of the envelopes are not considered. Since the filling elements will also provide for the transport of the envelope they need to be adjusted dependent on the envelope. A further disadvantage is that removal of the envelope from the filling element by the goods transport is difficult in case the goods comprise only a single sheet of paper. In this case, the force applied by the goods transport may damage the sheet before a movement of the envelope by the filling element is started. Further, there is no possibility control how far the filling element moves into the envelope, e.g. dependent on the thickness of the goods, rather independent of the thickness of the goods to be inserted, the filling element has to be inserted completely into the envelope, i.e., it is inserted up to a fixed position so that the envelope is spanned irrespective of the thickness of the goods to be inserted. Further, in accordance with EP 1 418 840 A1 an envelope flap is held by a suction rail which decelerates the envelope so that it is maintained in contact with the filling element, however, there is no control or regulation possible. Further, there are difficulties when removing the filled envelope using the goods transport, since the provision of the additional suction rail and the decelerating action thereof necessitates to apply a high force to the envelope for removing it from the filling elements which, naturally, results in damages and possible jams even after the filling process has already been completed. Further, this approach necessitates high mechanical efforts, for example due to the necessitated mechanical coupling of all drives via a single main shaft.

Another problem with approach described in U.S. Pat. No. 3,423,900 or EP 1 418 840 A1 is that a central portion of the envelope sags because filling elements engage with the opposite lateral edges of the envelope. In case of larger formats, e.g. formats having a large lateral dimension, this is a serious problem as the one or more goods to be inserted may collide with the sagging envelope side resulting in jams so that no reliable filling is possible.

Yet another problem with approach described in U.S. Pat. No. 3,423,900 or EP 1 418 840 A1 is that the goods and the envelope are moved so that it is necessitated to carefully control the motion of each element to avoid a gap between a leading edge of the goods and an edge of an envelope flap. In case such a gap is generated the goods and the envelope flap may collide. This is a problem being specifically problematic with short flaps.

SUMMARY

According to an embodiment, an apparatus for inserting one or more goods into a moving cover may have: a cover transport; and at least one separating device configured to open the cover so that a first part and a second part of the cover are separated from each other, and engage with the first part of the cover and maintain the first part of the cover separate from the second part of the cover during at least a part of the movement of the cover.

According to another embodiment, an apparatus for inserting one or more goods into an envelope, wherein the envelope includes a first side including an envelope flap, and a second side being opposite to the side having the envelope flap, may have: a path along which an envelope and one or more goods to be inserted can be moved, wherein the path is arranged to move the one or more goods with a faster velocity than the envelope, an envelope transport, and at least one separating device configured to open the envelope so that the first side and the second side of the envelope are separated from each other, and engage with the second side of the envelope and maintain the second side of the envelope cover separate from the first side of the envelope during at least a part of the movement of the envelope.

According to another embodiment, a method for inserting one or more goods into a moving cover may have the steps of: moving a cover; opening the cover by moving at least one separating device so that a first part and a second part of the cover are separated from each other, and holding, by the at least one separating device, the first part of the cover separated from a second part of the cover during at least a part of the movement of the cover.

Embodiments of the invention provide an apparatus for inserting one or more goods into a moving cover, comprising: a cover transport; and at least one separating device configured to engage with a first part of the cover and to maintain the first part of the cover separate from a second part of the cover during at least a part of the movement of the cover.

Embodiments of the invention provide a method for inserting one or more goods into a moving cover, comprising: moving a cover; and moving at least a separating device such that the separating device engages a first part of the cover and holds the first part of the cover separated from a second part of the cover during at least a part of the movement of the cover.

Thus, in accordance with embodiments, the filling process is such that a goods transport receives the inserts directly from a collating track. An envelope may be located in a gripper transport and opened by blow air before or as it enters the filling area or the filling path. The envelope is transported into the filling path, in accordance with embodiments, from underneath with the gripper transport and, advantageously, the filling process is "hinge line"-oriented (the hinge line is the line where the envelope flap is connected to the envelope body), i.e. the filling process starts when the leading edge of the goods reached the hinge line of the envelope, e.g. a leading edge of the inserts, filling fingers, separating elements etc. When moving into the filling path, the envelope is opened by the blow air provided by air nozzles arranged in front of the filling path. The flap of the envelope may be controlled so that it does not collide with the inserts to be inserted, for example by sheet metal stripes laying on the flap while the envelope is moved into the filling path may be provided. Filling fingers are moved into the opened envelope and the filling process starts when the filling fingers have been moved into the opened envelope and a leading edge of the insert is positioned at the hinge line.

Embodiments of the invention describe a system in which a filling process is a "continuous process". This means that the envelope (the cover) and the insert (the one or more goods) are moved together in the same direction but with different speed levels so that due to this difference in speed levels the goods or inserts are eventually transported into the envelope. This approach is advantageous because in the filling area or along the filling path, several processes may take place in parallel. For example, the filling process of a first envelope along the filling path may not yet be finished, but an opening and filling process of a subsequent envelope may already have been started so that for each process step more time is available. At the same time the throughput can be increased due to the parallel operations. Further, the mutual relative movement of the inserts and envelopes allows for a relatively low filling speed even at high cycle speeds. Due to the low filling speeds a careful treatment of the inserts is guaranteed.

Contrary to conventional approaches, in accordance with the inventive approach, the filling fingers are only for guiding the inserts into the envelope, but they are not provided for causing a transport of the envelope along the filling path. Rather, an additional envelope transport is provided, for example a suction belt that may be configured to keep the envelope and the flap down on its rear side and to move the envelope along the filling path. The suction belt transport may have the same speed or a speed higher than the filling fingers so that the transport is effected only by the envelope transport but not by the filling members. The insert is moved into the opened envelope due to the higher speed of the goods transport when compared to the speed of the envelope transport, the speed of the filling fingers and the speed of the separating device.

In accordance with embodiments of the invention collisions with the envelope side wall or an envelope window, if present, are avoided due to the lateral filling fingers. Further, the filling fingers may overcome an inner envelope adhesion, i.e., the adhesion of the two sides of the envelope, which may be due to excess adhesive during the envelope manufacturing process. Once the filling process is completed, the suction belt transport positioned at the bottom is switched off and an active output transport with a speed being equal or higher than the filling slide transport, gets into contact with the filled envelope and retracts it off the lateral filling guides and moves it out of the filling path.

Further, a separating device for guiding the envelope is provided, e.g. on a circulating transport. The separating device may be provided for supporting the process of envelope opening and/or keeping the envelope open during filling. It may be arranged above the envelope transport and engages with a part of the envelope thereby avoiding sagging of the envelope so that the envelope cut and the envelope throat are protected from a collision with the inserts during the filling process.

In accordance with embodiments a flap holder is provided such that no gap between a leading edge of the goods and an edge of an envelope flap is generated so that control of the goods and the envelope which are moved simultaneously is easier and collisions between a leading edge of the goods and an edge of an envelope flap are avoided, thereby ensuring a reliable filling process.

Embodiments of the invention provide an apparatus for opening an envelope and an inserter for inserting a goods into the envelope along an inserting path, comprising a transport arranged above the inserting path, and at least one opening element that is arranged at the transport, wherein the opening element is movable by the transport along the inserting path such that the opening element engages the envelope to separate an envelope front side and an envelope back side. The transport may comprise a first portion along which the opening element is moved into the inserting path, wherein the transport and/or the opening element are adapted such that the opening element, upon entering into the inserting path, passes a position which is below a plane in which the filling path is arranged so that the opening element initially engages an envelope front side and/or an open flap of the envelope thereby supporting opening of the element.

When compared to the above-described conventional approaches, the inventive approach is advantageous. With regard to the inserters operating in accordance with the start/stop approach embodiments of the invention provide for an inserter and a filling process which is faster, yet resulting in less wear and less stress for of the goods and the envelopes during filling.

Further, when compared to the approaches providing for the continuous lateral filling process, the inventive approach is advantageous as it is flexible with regard to the formats to be used and changing between respective formats is much simpler. It is less costly because less parts are needed and the necessitated space for installation is smaller as the decisive dimensions for the installation space are the longitudinal sides of the envelope. Since the envelopes and the goods are transported in line (not angular), the number of envelopes and goods that need to be transported simultaneously along the filling path is smaller. Also, a faster filling is achieved. Also, the kinematic is reduced as the envelope and the goods are transported in line which, in turn, results in a higher process security.

When compared to the approach described in U.S. Pat. No. 3,423,900 or EP 1 418 840 A1, the inventive approach is advantageous as a separate transport for the covers or envelopes is provided, i.e., the transport of the envelopes is achieved independently of any other element engaging with the envelope, e.g. the filling fingers, the separation device or the flap holder, so that the transport may reliably handle envelopes having different dimensions due to tolerances. Further, both the one or more goods and the envelope can be actively decelerated. The envelope is transported separately from the filling elements which allows to use separate drives. Yet a further advantage of the inventive approach is that a secure separation of the two sides of the envelope is obtained and that, at the same time, the inserting of the goods is supported and is guided and any collision with the edges of the envelope are avoided. Moreover, since the envelope is not held by the filling element, it is possible to actively remove the filling element after or during the filling process. The filling finger can be moved into the envelope dependent on the goods to be inserted, i.e., the envelope is only opened as it is necessitated for receiving the goods. It is not necessitated to accelerate the envelope and the goods at the end of the process, rather due to the separate drives it is possible, for example, to slow down the filling elements so that the filled envelope leaves the filling element. Yet another advantage of the inventive approach is that the envelope transport may be actively controlled independent of the elements.

BRIEF DESCRIPTION OF THE DRAWINGS

Embodiments of the present invention will be detailed subsequently referring to the appended drawings, in which:

FIGS. 3(a) to 3(h) show the filling process in accordance with embodiments of the invention, wherein FIGS. 3(a) to 3(h) are representations of an inserter as described in FIG. 1 and FIG. 2 during the filling process;

FIG. 4 is a partial top view of the inserter of FIG. 1 using three suction belts a instead of a single suction belt;

FIG. 9(a) illustrates the placement of the filling fingers inside the envelope for a thin insert;

FIG. 9(b) illustrates the placement of the filling fingers inside the envelope for a thick insert;

FIGS. 10(a) and 10(b) show enlarged views of a front part of the filling path of the inserter of FIG. 1, wherein FIG. 10(a) is a schematic top view, and FIG. 10(b) is a sectional view taken along line b-b';

FIGS. 11(a) and 11(b) show the filling process at a position downstream from the position in FIG. 10, wherein FIG. 11(a) is a top view, and FIG. 11(b) is a view taken along line b-b' in FIG. 11(a);

FIGS. 12(a) and 12(b) show a situation even further down the filling path from the position in FIG. 11 where the filling process has been completed, wherein FIG. 12(a) is a top view, and FIG. 12(b) is a sectional view taken along line b-b';

FIGS. 13(a) and 13(b) show yet another embodiment of the filling aid;

FIG. 16 shows an initial situation of the filling process using at least one separating device according to embodiments of the invention, where an envelope is already transported by the envelope transport, but the goods have not yet reached the hinge line of the envelope;

FIG. 21 shows a separating device according to another embodiments of the invention;

FIGS. 24(a) and 24(b) show further embodiments of the flap holder, wherein FIG. 24(a) shows a flap holder having six flap holder elements, and wherein FIG. 24(b) shows another embodiment comprising only two flap holder elements;

FIGS. 25(a) to 25(c) show an embodiment using stationary flap holder elements, wherein FIG. 25(a) shows an initial situation in which an envelope has been fed to the envelope transport, wherein FIG. 25(b) shows a situation where the envelope and the goods are moved through a transfer area, and wherein FIG. 25(c) shows a situation where the envelope and the goods have left the transfer area;

FIGS. 26(a) to 26(c) show an embodiment using movable flap holder elements, wherein FIG. 26(a) shows an initial situation in which an envelope has been fed to the envelope transport, wherein FIG. 26(b) shows a situation where the envelope and the goods are moved through a transfer area, and wherein FIG. 26(c) shows a situation where the envelope and the goods have left the transfer area;

FIGS. 30(a) and 30(b) show an embodiment comprising an additional envelope transport, wherein FIG. 30(a) is a schematic top view, and FIG. 30(b) is a sectional view taken along line b-b';

DETAILED DESCRIPTION OF THE INVENTION

In a subsequent description of embodiments of the invention the same elements or elements having the same functionality will be provided with the same reference numbers. In the following, different aspect in accordance with embodiments of the invention will be described.

Figure 1:
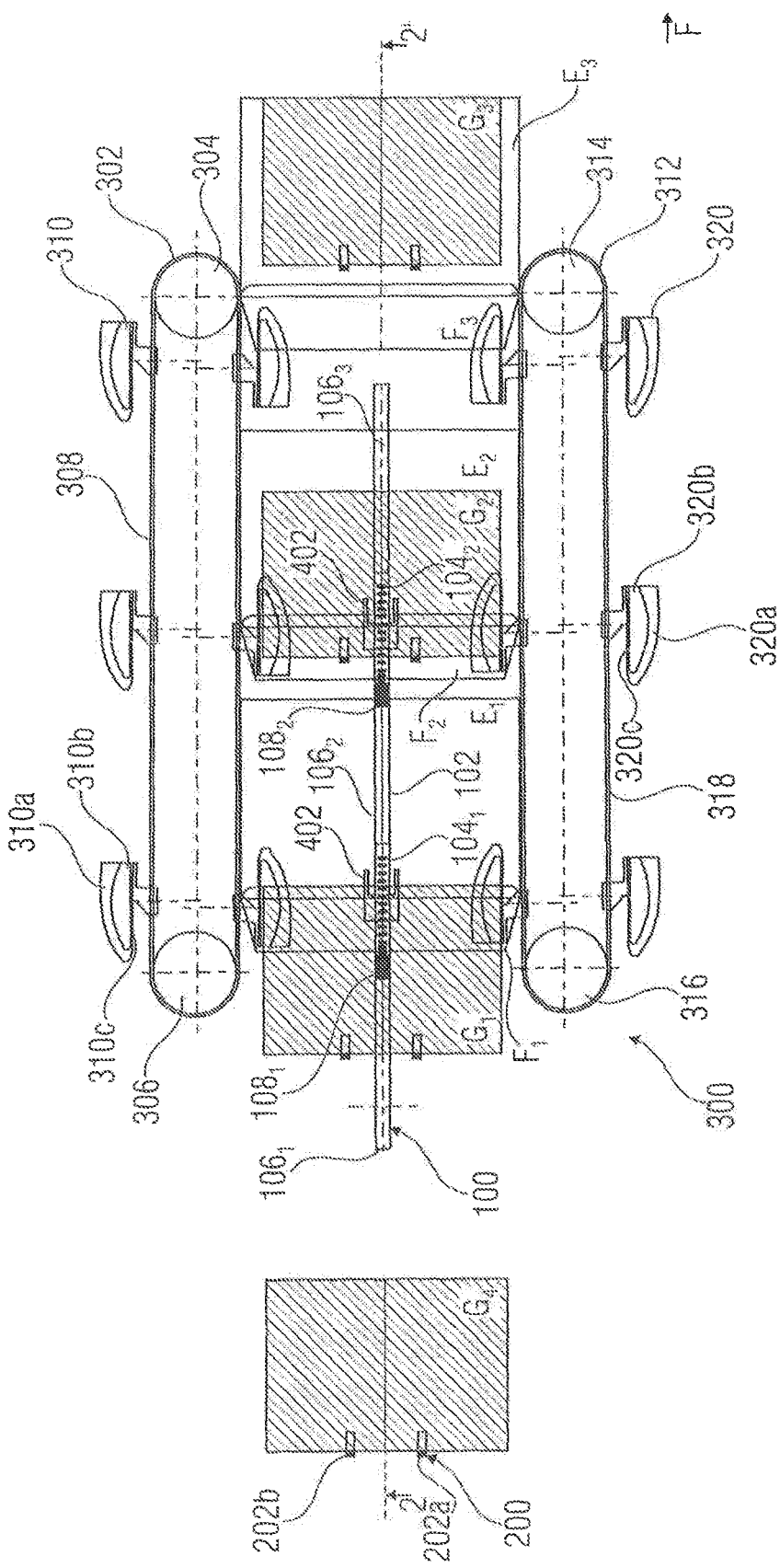
FIG. 1 is a schematic representation of an inserter in accordance with embodiments of the invention.

FIG. 1 is a schematic representation of an inserter in accordance with embodiments of the invention. FIG. 1 is a top view of the inserter which comprises an envelope transport 100 comprising a suction belt 102 having first portions $104_1$ and $104_2$ where the suction belt 102 is provided with openings so that a suction force can be applied by a vacuum mechanism provided beneath the suction belt 102 to an object arranged on the suction belt 102. Further, the suction belt comprises second portions $106_1$, $106_2$, $106_3$ where no holes are provided so that in this part of the suction belt no suction force is applied to an object arranged thereon. The suction belt 102 further comprises elevations $108_1$ and $108_2$ which are thicker (in the direction vertical to the plane of the drawing) than the portions 104 and 106. In accordance with embodiments, the elevations 108 are ramp-shaped so that the elevation raises along the transport direction F. Also other shapes of the elevations are possible. The envelope conveyor 100 is provided to transport the respective envelopes $E_1$ and $E_2$ using the suction belt 102. The envelopes are placed on the suction belt 102 such that an envelope main body is only partly arranged in the first portion $104_1$, $104_2$, however, the respective flaps $F_1$ and $F_2$ are arranged adjacent to the elevations $108_1$, $108_2$ and completely on the first portions $104_1$, $104_2$ thereby being held by the suction force applied through the openings in section $104_1$, $104_2$. This ensures that the flaps $F_1$ and $F_2$ are held on the suction belt. The ramp-shaped elevations $108_1$, $108_2$ cause the goods to slightly raise from a transport level in which the envelope is moved so that the flaps may securely be passed without any collision.

The envelope transport 100 is provided to move one or more envelopes $E_1$, $E_2$ along an inserting path or filling path which starts where an envelope $E_1$ and one or more goods $G_1$, for example one or more sheets of paper, start to overlap and which ends when the goods are completely inside the envelope $E_1$. FIG. 1 shows a further envelope $E_3$ that already left the filling path and into which the goods $G_3$ have already been inserted. Further, goods $G_4$ are depicted at the left-hand side of FIG. 1 which are currently forwarded towards the inserter to be inserted into an envelope following envelope $E_1$. The envelopes $E_1$ to $E_3$ are shown at different stages of the inserting process and, as can be seen, all envelopes have their flaps $F_1$ to $F_3$ open so that the goods $G_1$ to $G_3$ can be filled into the envelope. Envelope $E_1$ is at the beginning of the filling path and the goods $G_1$ already passed the flap $F_1$ and the leading edge of the goods is inside the envelope. Due to the different speeds with which the envelope and the goods are moved, along the filling path the goods are filled into the envelopes. Envelope $E_2$ has already received the major part of the goods $G_2$ and the rear or trailing edge of the goods has passed the edge of the flap $F_2$. Envelope $E_3$ is already filled with the goods $G_3$ which have completely passed the flap $F_3$ and are inside the envelope $E_3$, i.e. a leading edge of the goods reached the bottom of the envelope.

The inserter shown in FIG. 1 further comprises a goods transport 200 comprising a plurality of pairs of pushers 202a, 202b for engagement with the goods $G_1$ to $G_4$. The goods transport 200 moves the goods with a velocity higher than the envelope transport 100. The goods and the envelopes are transported in the same transport or conveying direction F. The openings of the envelopes are arranged lateral or perpendicular to the transport direction F so that the movement of the envelopes and the goods in line along the same direction F results in the filling of the goods into the envelopes. The goods transport comprises the pair of pushers 202a and 202b which engage with the respective trailing edges of the goods $G_1$ to $G_4$, advantageously at positions symmetrically to a center of the goods. Further, the goods transport 200 is longer than the envelope transport 100, i.e. it starts in front of the filling path and extends beyond the filling path. The goods transport 200 may also provide for a removal of the filled envelope $E_3$ out of the filling path towards a subsequent processing station or a subsequent transport.

The inserter further comprises a filling aid 300 comprising a first conveyor 302 having a first, driven roller 304 and a second roller 306 around which a chain or belt 308 extends. At predetermined intervals along the chain 308 a plurality of filling aid elements or filling fingers 310 are provided. The first conveyor 302 is arranged such that the filling elements 310 are moved in the conveying direction F on a side of the conveyor facing the envelope transport 100 and are moved in the opposite direction on the side facing away from the transport 100, i.e., the filling finger 310 move along the filling path and are returned from the end of the filling path to the beginning of the filling path. The filling aid 300 further comprises a second conveyor 312 having a similar structure as the first conveyor. The second conveyor 312 comprises a driven roller 314, a further roller 316 and a chain or belt 318 extending around the rollers 314, 316. Respective filling aid elements or filling fingers 320 are arranged at the chain or belt 318. The filling fingers 320 are moved in the conveying direction F on the side of the chain 318 facing the envelope transport 100, and are returned from the end of the filling path in the opposite direction back towards the beginning of the filling path. The driven rollers 304 and 314 may be driven by the same drive or motor so that the two conveyors operate in synchronism with each other. The filling fingers 320 are provided to be moved by a predetermined distance into the envelopes $E_1$ and $E_2$. More specifically, as is shown with respect to envelope $E_1$, the filling fingers 310, 320 are arranged partially inside the envelope $E_1$ and the goods $G_1$ are guided by the filling fingers into the envelope $E_1$, thereby avoiding collisions between the side edges (along the transport direction) of the goods and the side edges (along the transport direction) of the envelope.

In accordance with embodiments the filling fingers 310, 320 comprise a lower part 310a, 320a, an upper part 310b, 320b and a vertical element 310c, 320c connecting the upper and lower parts of the respective filling elements 310, 320. The upper and lower elements 310a, 320a, 310b, 320b may be moveable with respect to each other (e.g. the lower part may be fixed and the upper part can be moved) so as to move relative to each other dependent on the thickness of the goods $G_1$ to $G_4$ to be inserted thereby adapting to the thickness of the goods to be inserted. The filling fingers 310, 320 may become narrower towards the forward end in the conveying or transport direction of the elements 310, 320.

The conveyors 302 and 312 are arranged at a distance from each other which depends from the goods $G_1$ to $G_4$ to be inserted but not dependent on the lateral dimension of the envelopes $E_1$ to $E_3$. The filling fingers 310, 320 are arranged at a distance defined by the goods and are inserted into the envelopes only to avoid collisions of the goods with the envelope, however, the filling fingers 310, 312 do not perform any transport operation of the envelopes $E_1$, $E_2$ along the filling path. The transport of the envelopes is only provided by the envelope transport 100. Therefore, in accordance with embodiments the filling elements 310, 320 are moved by the conveyor 302, 312 with a velocity that is equal to or slower than the speed with which the envelopes are moved by the transport 100. The conveyors 302 and 312 may be moved lateral with respect to each other so as to adjust the distance between the filling elements 310, 320 easily dependent on the dimensions of the goods to be inserted, i.e., the filling fingers 310, 320 are adjusted independent of any format of the envelope and are, therefore, independent and not influenced by possible format tolerances of the envelope. Since the filling fingers 310, 312 are set with respect to the goods to be filled but not with respect to the format of the envelope, a filled envelope $E_3$ can be easily removed from the filling fingers 310, 320.

Figure 2:
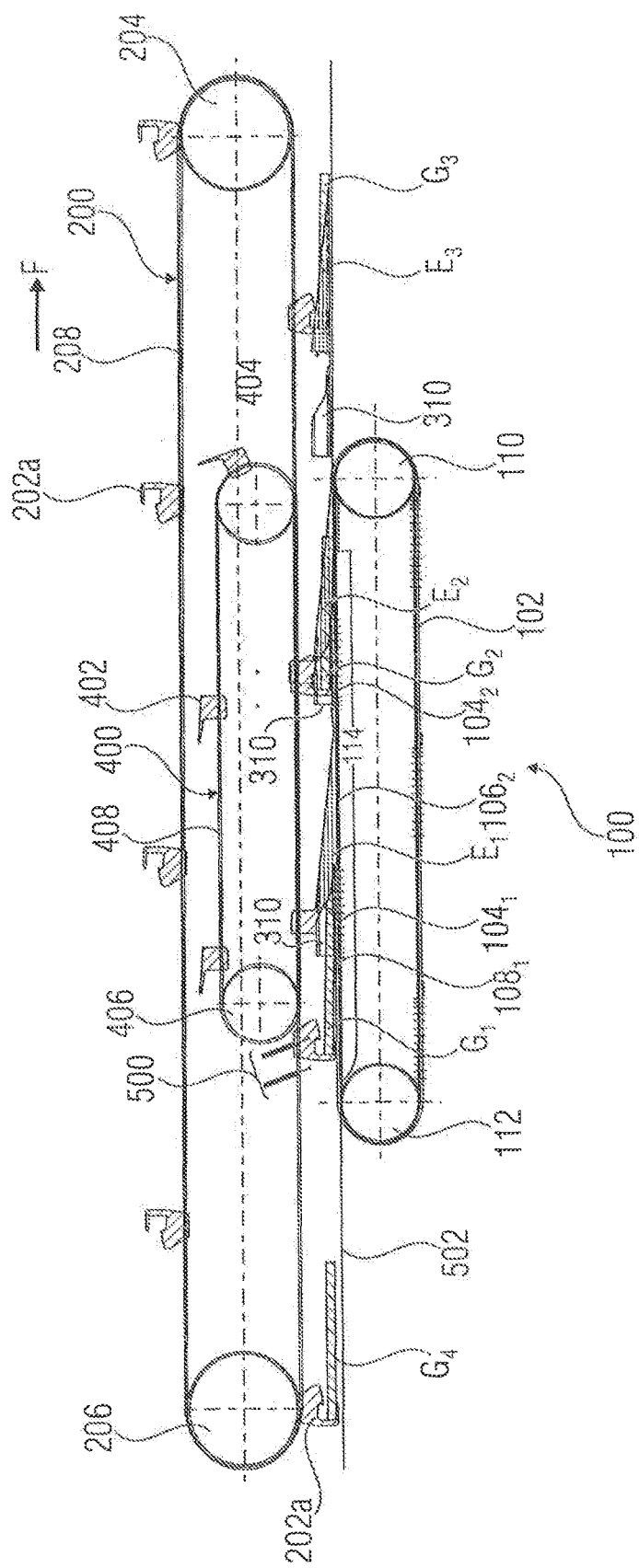
FIG. 2 shows a sectional view of the inserter taken along the line 2-2' in FIG. 1.

FIG. 1 further shows two separating claws 402 of a separating device described in further detail with regard to FIG. 2. The separating claws 402 engages with the trailing edge of a side of the envelope $E_1$ that is opposite to the side to which the flap $F_1$ is attached. The separating claws 402 are arranged such that the envelope is held open along the inserting path, i.e., the two sides of the envelope are separated and collisions between the goods and the upper side of the envelope are avoided, e.g. in situations where the center part of the upper side of the envelope would sag without any support.

The functionality of the inserter depicted in FIG. 1 is as follows. An envelope $E_1$ is received by the envelope transport 100 from an envelope feeder and is transported along the filling path with a first velocity. At the same time, goods $G_1$ are moved by the goods transport 200 also along the filling path, however, with a velocity higher than the velocity by which the transport 100 moves the envelope $E_1$. Also, the filling elements 310, 320 are moved into the filling path and are placed by a predetermined distance into the envelope. The velocity of the filling fingers 310, 320 is equal to or less than the transport speed of the envelope transport 100. As the envelope $E_1$ is moved down the filling path, due to the velocity of the goods $G_1$ being higher than the velocity of the envelope, the goods $G_1$ are inserted and collisions between inserts and the envelope are avoided by the filling fingers 310, 320 acting as the guides so that eventually, as is shown in FIG. 1 for envelope $E_2$, the goods are filled into the envelope. At the end of the filling path the goods are completely filled into the envelope, i.e., their leading edge reached a bottom of the envelope. At the end of the filling path the envelope is released from the envelope transport 100 and is conveyed or advantageously transported in the direction F by means of the goods transport 200 which is still in engagement with the goods (see envelope $E_3$). Since the velocity of the goods transport 200 is higher than the velocity by which the filling fingers 310, 320 are moved, the filled envelope $E_3$ is removed from the filling fingers 310, 320 and is transported towards an output of the inserter.

While FIG. 1 depicts an inserter in which two envelopes are arranged along the filling path at the same time, it is noted that the invention is not limited to such embodiments. The inventive principles may be equally applied to an inserter processing only a single envelope along the filling path, alternatively also more than two envelopes may be provided along the inserting path.

FIG. 2 shows a sectional view of the inserter of FIG. 1 taken along the line 2-2'. FIG. 2 shows further details of the envelope transport 100, the goods transport 200 and the separating device 400. The goods transport 200 comprises a first, driven roller 204 and a second roller 206 arranged at a distance from the end of the filling path and the beginning of the filling path, respectively. A belt or chain 208 extends around the rollers 204, 206 which carries a plurality pushers 202a. A similar structure is arranged symmetrically with respect to a longitudinal center of the inserter for moving the pusher elements 202b but is not shown in FIG. 2. The driven rollers of the two belts may be provided with the same drive which is operated independent of the drives of the envelope transport 100 and the conveyors.

The envelope transport 100 comprises a first, driven roller 110 and a second roller 112 around which the suction belt 102 extends. The envelope transport 100 further comprises a vacuum chamber 114 that extends partly between the rollers 110 and 112 for applying a suction force to the sections 104 of the suction belt as the respective sections 104 are moved across the vacuum chamber 114. The vacuum chamber 114 extends from the roller 112 along the conveying direction F towards the roller 110, however, there is a gap between the end of the vacuum chamber 114 and the roller 110 so that in this area no suction force will be applied to an envelope, i.e., at this point the envelope will be released from the envelope transport 100.

FIG. 2 further shows a separating device 400 comprising a first, driven roller 404 and a second roller 406 as well as a belt or a chain 408 extending around the rollers 404, 406 to which the respective separating claws 402 are mounted.

The device further comprises a pair of blow nozzles 500 arranged at the beginning of the filling path and provided for blowing air towards an envelope that was received by the envelope transport 100, thereby opening the envelope. Further, a surface 502 formed of a plate or one or more stripes is provided that extends in front of the filling path, wherein an envelope—when being fed to the filling path—passes beneath the surface 502, and wherein the goods on the way to the filling path move above the surface 502.

Subsequently, the filling process will be described in further detail on the basis of FIG. 3 showing in FIG. 3(*a*) to (*h*) representations of an inserter as described in FIG. 1 and FIG. 2 during the filling process. In FIG. 3(*a*) the envelope $E_1$ has been supplied from an envelope feeder that may be arranged beneath the filling path and received at the envelope transport 100 (see FIG. 1 and FIG. 2). The envelope $E_1$ has been opened by the blowers 500 (see FIG. 2) and a leading edge of the goods $G_1$ has been positioned at the hinge line HL and the filling process starts. The filling fingers 310, 320 have been moved such that a leading edge thereof is inside the envelope $E_1$, and the separation claw 402 has been brought into engagement with the upper side of the envelope $E_1$. In accordance with embodiments a center part of the flap of an envelope is held by the envelope transport, however, the part of the flap not held may rise so that a collision with goods to be inserted may occur. To avoid this, the inserter may further comprise a flap holder 504, e.g. metal stripes 504*a*-504*d*. Two stripes 504*a*, 504*b* are provided on one side of the envelope transport 100, i.e. between the envelope transport 100 and the first conveyor 302 of the filling aid 300. Two stripes 504*b*, 504*c* are provided on the other side of the envelope transport 100, i.e. between the envelope transport 100 and the second conveyor 312 of the filling aid 300. The metal stripes 504*a*-504*d* hold the flap $F_1$ of the envelope $E_1$ down in a region between the envelope transport 100 and the respective conveyors 302, 312 of the filling aid 300 so that the goods $G_1$ do not collide with the flap $F_1$ in this portion. Further, the inserter comprises an output transport 506 for moving a filled envelope towards an output of the inserter. In FIG. 3(*a*) also the envelopes $E_2$ and $E_3$ are shown, of which envelope $E_2$ has almost been filled and which is positioned along the filling path downstream of envelope $E_1$. Envelope $E_3$ has been completely filled and has been transferred to the output transport 506. The suction belt (not shown in FIG. 3) is switched on, i.e. vacuum is applied, so that the envelope $E_1$ is held by the suction belt and will be transported as the suction belt moves. The pushers 202*a*, 202*b* of the goods transport 200 have engaged the goods $G_4$ for a subsequent filling process which have already been received from a collating track upstream of the inserter.

In FIG. 3(*b*) the envelope $E_1$ has traveled down the filling path and the goods $G_1$ have begun to be filled into the envelope $E_1$. Envelope $E_2$ has been completely filled and will be transferred to the output transport 506, and envelope $E_3$ almost reached the output. Also, the transport of a new envelope into the filling path has begun.

In FIG. 3(*c*), envelope $E_3$ has been removed from the inserter and envelope $E_2$ is now transported by the output transport 506 towards the output of the inserter. The filling of the envelope $E_1$ is in progress, i.e. the inserts $G_1$ are moved towards the bottom B of the envelope $E_1$. The new envelope $E_4$ has been received at the beginning of the filling path and is transported by the envelope transport. The goods $G_4$ have not yet reached the beginning of the filling path, and the filling fingers 310, 320 start to pivot into the filling path.

FIG. 3(*d*) to FIG. 3(*g*) illustrate how the start position for the filling process is reached by the envelope $E_4$, the goods $G_4$ and filling fingers 310, 312 so that finally a position as in FIG. 3(*h*) is reached. Following the situation depicted in FIG. 3(*h*) a situation as in FIG. 3(*a*) is reached. At the same time, envelope $E_1$ is completely filled and ready to be transferred to the output transport 506, while envelope $E_2$ reaches the output of the inserter.

Thus, in the filling process of FIG. 3 the goods transport receives the goods from a collating track. The envelope may be fed by a gripper transport of an envelope feeder towards the filling path and opened by blow air. The envelope may be transported from underneath using the gripper transport. When moving into the filling path, the envelope is opened by the blow air and the flap may be controlled by means of sheet metal stripes laying on the flap. The revolving lateral filling fingers 310, 320 are moved into the opened envelope and the filling process starts when the lateral filling fingers have been moved at least partially into the envelope and the leading edge of the goods is positioned at the hinge line. The suction belt transport keeps the envelope and the flap down and moves the envelope through the filling path. The suction belt has the same speed or slower as the revolving lateral filling fingers and has an adjustable switch on/switch off point for the suction area dependent on the format of the envelope. The goods transport moves the goods into the opened envelope due to the different speed of the goods transport when compared to the speed of the suction belt transport. Once the filling process is completed, in accordance with embodiments, the suction belt transport is switched off and an active transport having a speed equal to or higher than the goods transport takes over the filled envelope which draws it from the lateral filling fingers 310, 320 and moves it out of the filling area.

In FIG. 1 the envelope transport 100 comprises a single suction belt. However, the invention is not limited to such a configuration. Also, a plurality of suction belts may be used as is shown in FIG. 4 showing a partial top view of the inserter of FIG. 1. Instead of providing a single suction belt, three suction belts 102*a*, 102*b* and 102*c* are provided side by side and extending in parallel along the conveying direction F. The suction belts 102*a* to 102*c* are of the same structure as suction belt 102 described above. The suction belts 102*a*, 102*b* and 102*c* are arranged at a distance in a lateral direction of the respective envelopes such that the first pusher 202*a* of the goods transport 200 is arranged between the first and second suction belts 102*a* and 102*b* and such that the second pusher 202*b* of the goods transport 200 is arranged between the second suction belt 102*b* and the third suction belt 102c. It is noted that two suction belts or more than three suction belts may also be used.

Figure 5A:
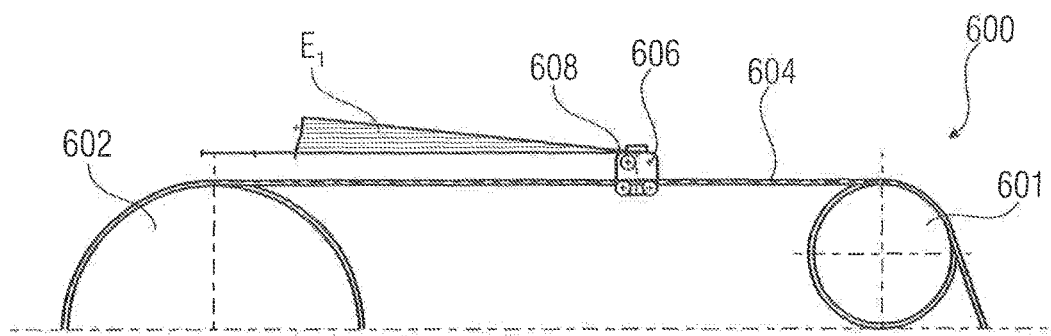
FIGS. 5(a), 5(b), 6, and 7 show gripper conveyors in accordance with different embodiments of the invention.
Figure 5B:
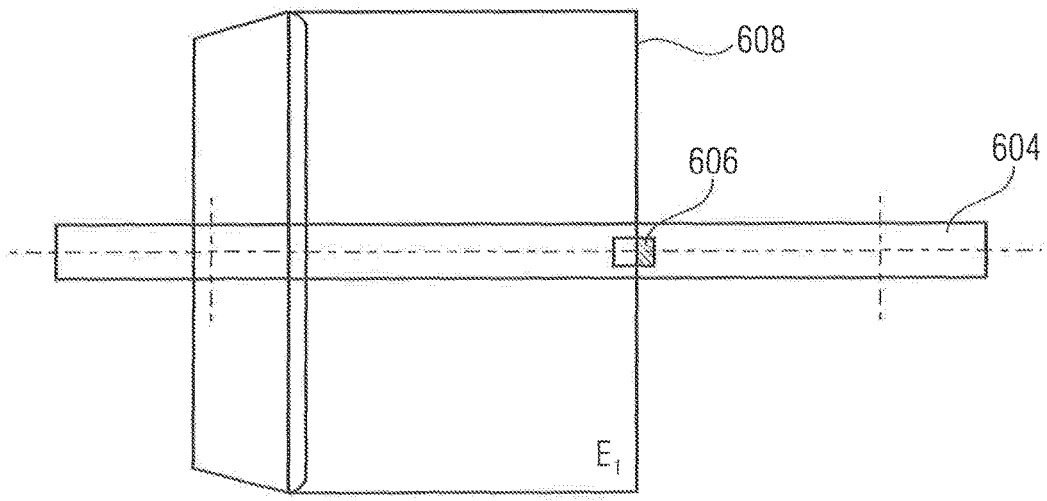

Further, it is noted that the invention is not limited to the use of suction belts, rather any kind of conveyor may be used, advantageously a conveyor that engages with the exterior of the envelope, for example from above or from below. FIG. 5(a) shows an example of a gripper conveyor 600 comprising a first roller 601 and a second roller 602 as well as a belt or a chain 604 extending around the rollers 601, 602. The chain comprises a gripper element 606 for engagement with a leading edge 608 of an envelope $E_1$ so that the envelope is held at its leading edge 608 and moved as the gripper element 206 is moved by the belt 604. FIG. 5(b) shows a top view of the gripper conveyor.

Figure 6:
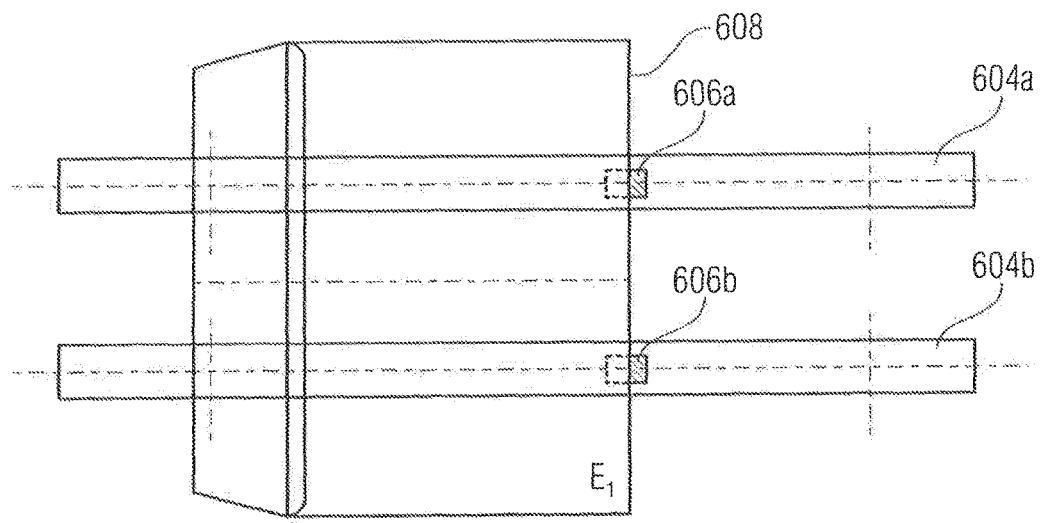

As is shown in FIG. 6, instead of a single gripper conveyor as shown in FIG. 5, two or more gripper conveyors, e.g. two conveyors 604a and 604b, may be provided engaging by means of respective elements 606a and 606b at different positions along the leading edge 608 of the envelope $E_1$. Providing more than one engagement location is advantageous as this avoids a displacement or turning of the envelope $E_1$ with regard to the conveying direction.

Figure 7:
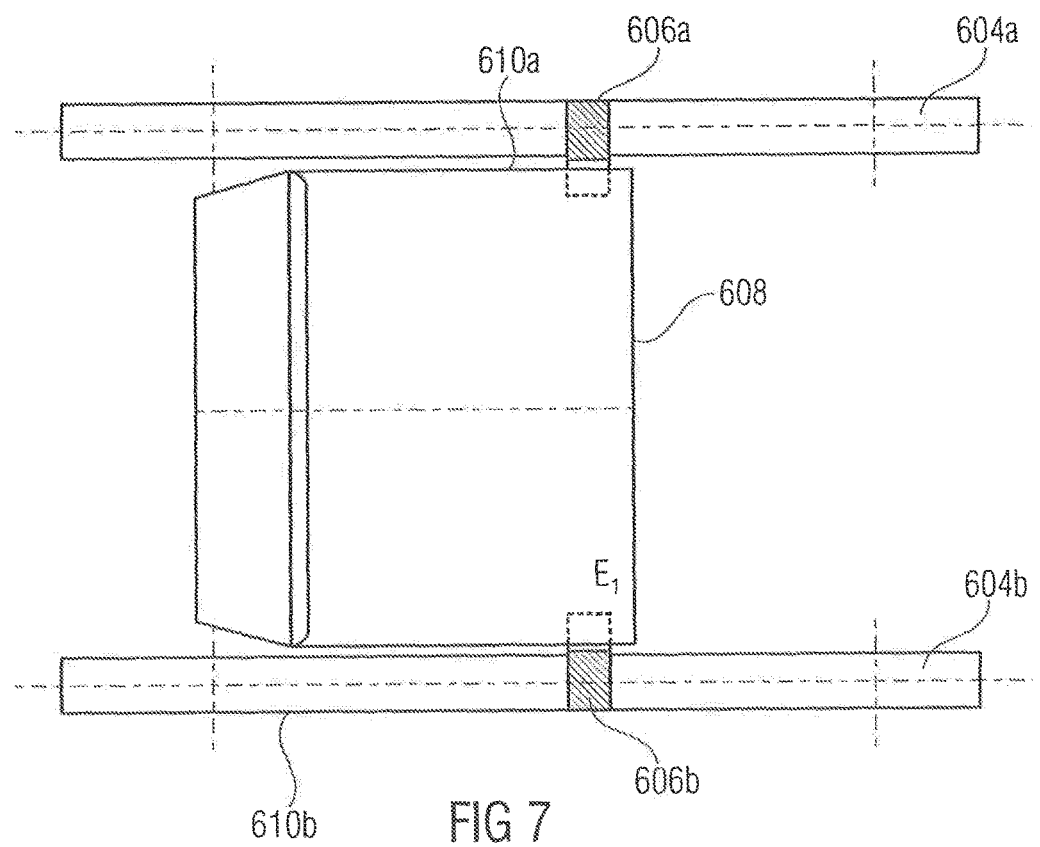

FIG. 7 shows yet another embodiment of a possible gripper conveyor comprising two belts or chains 604a and 604b arranged on both sides of the filling path so that an envelope is transported there between. The gripper elements 606a and 606b, other than in the embodiments of FIGS. 5 and 6, do not engage with the leading edge 608, but with two opposed lateral edges 610a, 610b of the envelope $E_1$, advantageously a position close to the leading edge 608.

Figure 8:
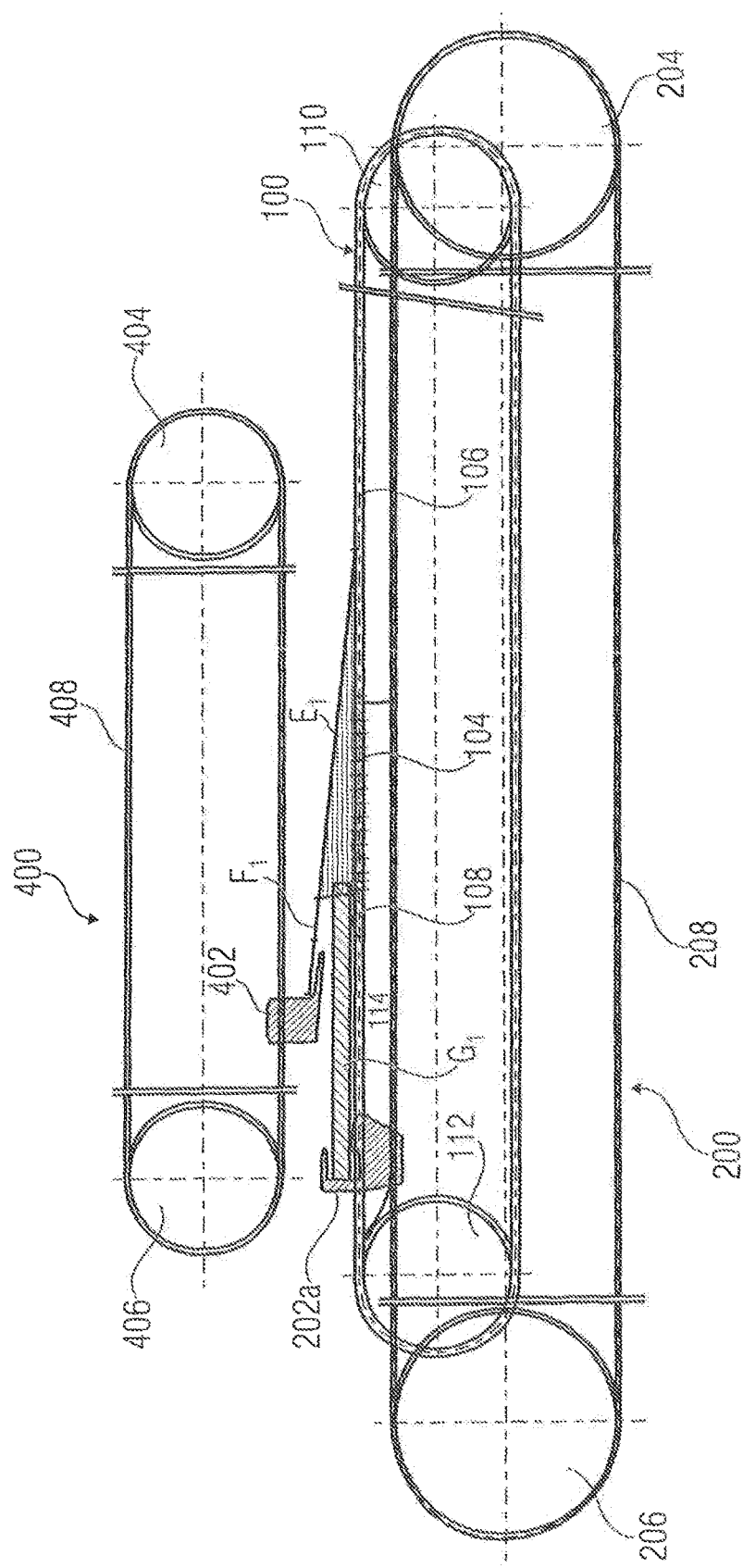
FIG. 8 shows a schematic representation of an embodiment allowing the positioning of an envelope such that its flap is arranged away from the envelope transport.

In the embodiments described so far the envelope was placed on the envelope conveyor such that its flap is positioned on the envelope conveyor. However, the principles of the inventive approach may also be applied for inserters in which the envelope is held such that the side not having the flap is moved by an envelope conveyor. In such a configuration the lateral filling fingers operating independent of the envelope transport can also be used. FIG. 8 shows a schematic representation of an embodiment allowing the positioning of the envelope such that when the envelope is open the flap is arranged away from the envelope transport. In FIG. 8, the envelope transport 100 is shown which may be formed of a suction transport that was described with regard to FIGS. 1 and 2. The separating device 400 having basically the same structure as described with regard to FIGS. 1 and 2 is used in accordance with this embodiment to engage with flap $F_1$ of the envelope $E_1$ and is moveable at the same speed as the envelope so that the separating element 402 maintains the flap $F_1$ open during the filling process. Other than in FIGS. 1 and 2, the goods transport 200 is placed at a different position and with a different orientation, more specifically the goods transport is provided upside down when compared to the positioning in FIG. 1 so that the pusher 202a does not collide with the flap $F_1$ held open by the element 402. Except for the different placement of the envelope, the different arrangement of the goods conveyor and the different functionality of the separating device, the functionality of the inserter as shown in the embodiment of FIG. 8 is the same as the functionality of the inserter as described with regard to FIGS. 1, 2 and 3.

It is noted that an embodiment has been described above, however, not all of the described elements are necessitated in accordance with the teachings of the present invention. Rather, in accordance with an embodiment, an apparatus for inserting one or more goods $G_1$ to $G_4$ into a moveable cover $E_1$ to $E_3$ comprises the cover transport 100 and at least one separating device 400 configured to engage with a first part of the cover $E_1$ to $E_3$ and to maintain the first part of the cover $E_1$ to $E_3$ separate from a second part of the cover $E_1$ to $E_3$ during at least a part of the movement of the cover $E_1$ to $E_3$.

A further embodiment of the filling aid 300 will now be described with reference to FIG. 9 which is a schematic top view of the inserter similar to the one in FIG. 1, except that the filling aid 300 is realized in accordance with another embodiment of the invention. Those elements already described with regard to FIG. 1 have associated therewith the same reference signs, but are not described again. The filling aid 300 comprises a first conveyor 302 comprising a rail 340 having two bent portions 340a, 340b that are connected by respective straight portions 340c, 340d. The straight portions 340c, 340d are arranged in parallel to each other. The straight portion 340c is arranged at a side of the conveyor 302 facing the envelope transport 100, and the straight portion 340d is provided on the side of the conveyor 302 facing away from the envelope transport 100. The first bent or curved portion 340a is arranged at a position ahead of the start of the filling path, i.e. further upstream when compared to the start of the filling path, and the second bent or curved portion 340b is arranged behind the end of the inserting path, i.e. further downstream in the transport direction F when compared to the end of the filling path. A plurality of filling aid elements or filling fingers 310' are provided which are removably mounted to the rail 340. Each of the filling fingers 310' is individually movable along the rail 340, e.g. the filling fingers 310' may be self-propelled. The filling fingers 310', like in FIGS. 1 to 3, are moved at least partially into an envelope. Each of the filling fingers 310' may be moved and controlled individually. At the left-hand part of the conveyor 302 a number of filling fingers is shown in a waiting position. As soon as a new envelope is fed towards the filling path, the most forward filling finger is moved in accordance with the principles of the invention for supporting the inserting process as described above. The filling aid 300 comprises a second conveyor 304 having the same structure as the first conveyor 302. The conveyor comprises a rail 342 having two bent portions 342a, 342b connected by respective straight portions 342c, 342d. A plurality of filling aid elements or filling fingers 320' are provided and may be moved independently of each other along the rail 304.

Figure 9:
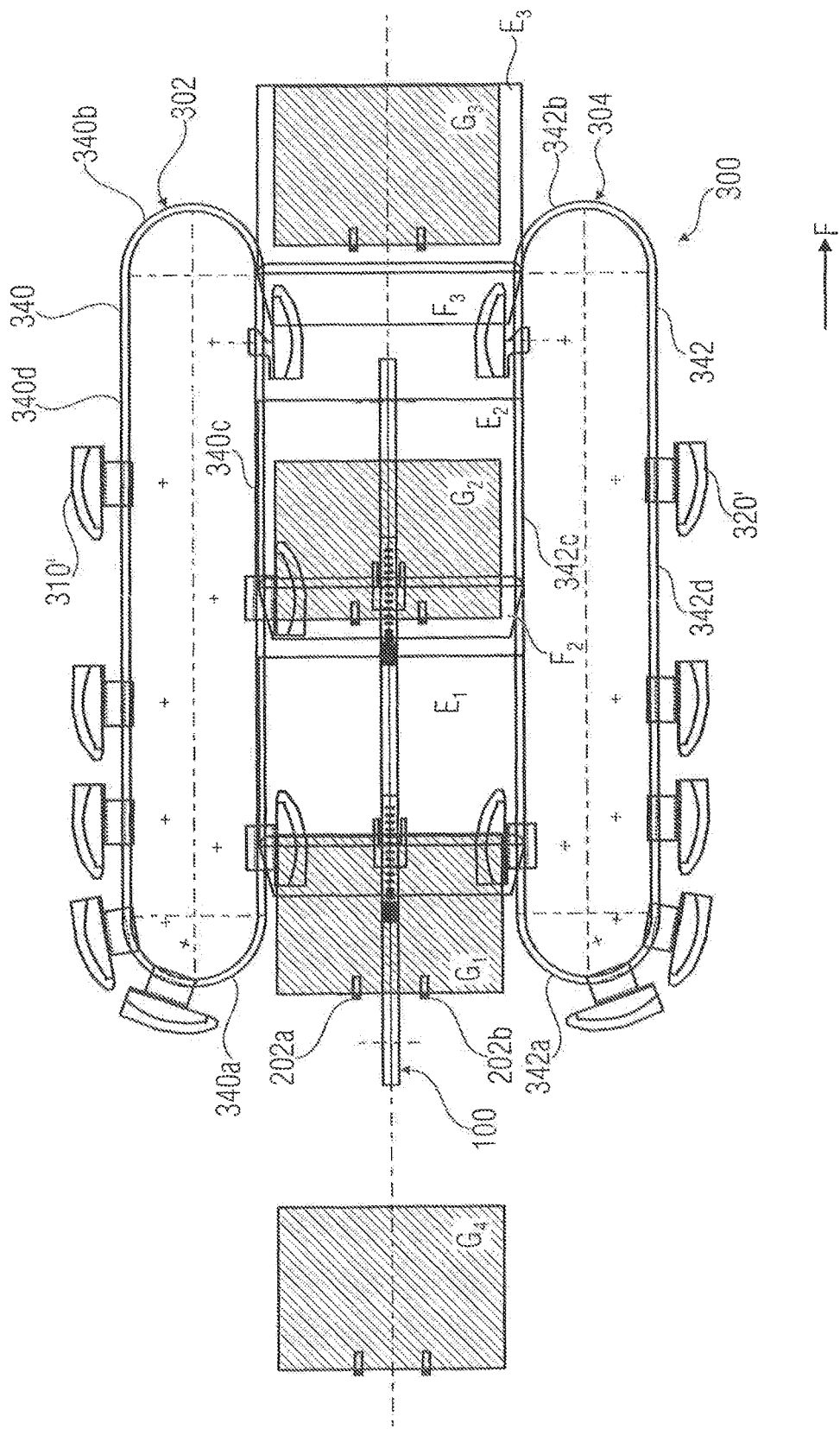
FIG. 9 is a schematic top view of the inserter similar to the one in FIG. 1 describing a filling aid in accordance with an embodiment of the invention.

The embodiment of FIG. 9 is advantageous as an individual control of the respective filling fingers 310', 320' is possible so that, for example, a depth by which the respective fingers 310', 320' intrude into the interior of the envelope $E_1$ can be controlled easily. More specifically, an individual control for each of the envelopes to be filled is possible and, for example, on the basis of the goods to be inserted an insertion depth may be selected. Otherwise, the functionality of the filling aid depicted in FIG. 9 corresponds to the functionality of the filling aid described above. The placement of the filling fingers inside the envelope will now be described with reference to FIG. 9(a) and FIG. 9(b), schematically showing the placement of the filling fingers inside the envelope for a thin insert (see FIG. 9(a)) and for a thick insert (see FIG. 9(b)).

FIG. 9(a) is a schematic view of a portion of the inserter as it is shown in FIG. 2 or in FIG. 9. An insert $G_1$ having a thickness $d_1$ is supplied to the inserter. The filling finger 310 has been placed inside the envelope $E_1$ such that the throat of the envelope $E_1$ is arranged about halfway up the inclined part of the upper part 310b of the filling finger (see the position of the hinge line HL). Thereby, the throat of the envelope $E_1$ is opened by $h_1$ (the opposite faces of the envelope $E_1$ at the hinge line are separated by the distance $h_1$). This distance $h_1$ is sufficient to allow secure and reliable inserting of the insert $G_1$ into the envelope. It is not necessitated to fully open the envelope (fully placing the filling finger into the envelope).

In FIG. 9(b) the insert $G_1$ has a thickness $d_2$ which is greater that the thickness in FIG. 9(a), i.e. the insert is thicker. In this case, the filling finger 310 has been placed inside the envelope $E_1$ such that the throat of the envelope $E_1$ is arranged about all the way up the inclined part of the upper part 310b of the filling finger (see the position of the hinge line HL). Thereby, the throat of the envelope $E_1$ is opened by $h_2$, which is greater than the distance $h_1$ in FIG. 9(a). This distance $h_2$ allows reliable and secure inserting of the insert $G_1$ into the envelope by fully opening the envelope (fully placing the filling finger into the envelope). As can be seen from a comparison of FIG. 9(a) and FIG. 9(b) this may be achieved by moving the filling finger 310 by different distances along the transport direction of the insert/envelope. More specifically, in case of FIG. 9(a) the filing finger 310 is moved to a position $x_1$ along the transport direction. In FIG. 9(b) the filing finger 310 is moved further down along the transport direction to a position $x_2$, thereby being placed deeper inside the envelope $E_1$. Different opening distances may be achieved by moving the filing finger such that a position upstream or downstream of $x_1$ is reached.

It is noted that the placement of the filling fingers inside the envelope as described with respect to FIG. 9(a) and FIG. 9(b) may be achieved by filling aids described in FIG. 1 and FIG. 9.

Figure 10A:
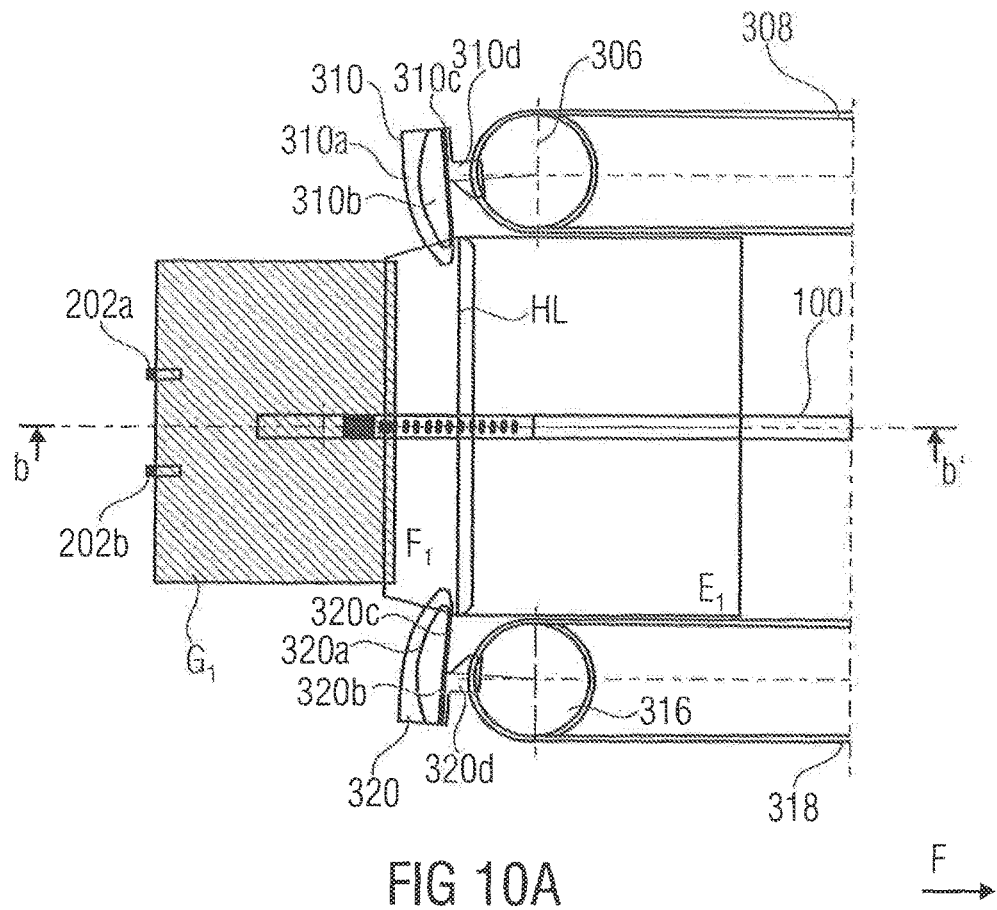
Figure 10B:
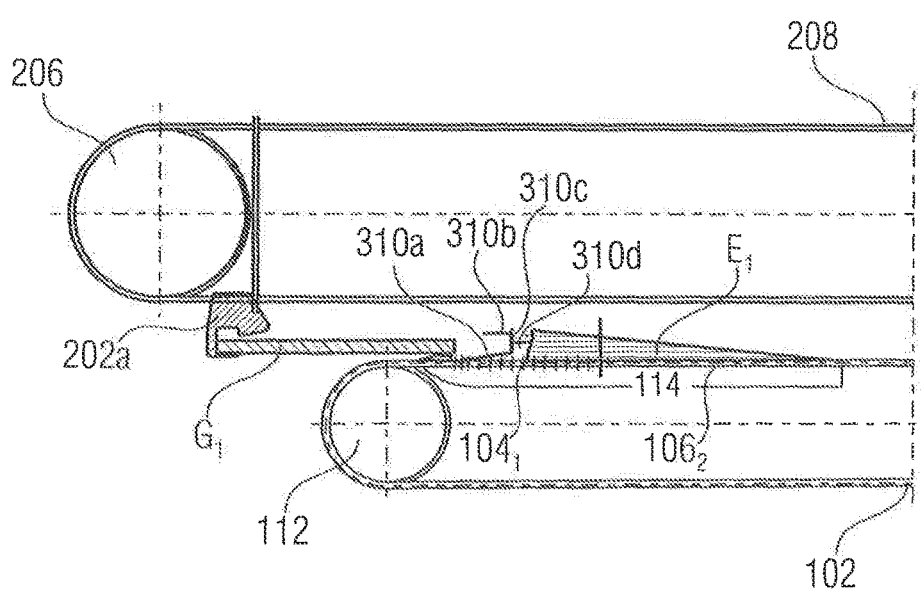

In the following the functionality of the filling aid fingers at the beginning of the filling process will be described on the basis of FIG. 10 showing an enlarged view of a front part of the filling path of the inserter of FIG. 1. FIG. 10(a) is a schematic top view, and FIG. 10(b) is a sectional view taken along line b-b'. FIG. 10 shows the situation at the beginning of the filling or inserting process. The envelope $E_1$ has already been engaged by the envelope transport 100. The goods pusher 202a move the goods $G_1$. The filling fingers 310, 320 have passed the rollers 306, 316 halfway so that at the position shown in FIG. 10(a) a longitudinal extension of the filling fingers 310, 320 is substantially perpendicular to the envelope transport direction F (along which the envelope $E_1$ and the goods $G_1$ are transported). The filling fingers 310, 320 are mounted to the belts or chains 308, 318 by respective connecting parts 310d, 320d. In accordance with embodiments the filling fingers may be removably mounted to the respective belts 308, 318. The leading edge or end of the filling fingers is about to reach the hinge line HL of the envelope $E_1$. It is noted that in accordance with the inventive approach the filling process is a continuous process, i.e., the envelope $E_1$, the goods $G_1$ and the filling finger 310, 320 are moved continuously. As the respective fingers are moved they will complete their turn around the respective rollers 306, 316 and will enter into the envelope $E_1$ prior to the goods $G_1$ so that the goods $G_1$ are guided by the respective filling fingers 310, 320. As is shown in FIG. 10(b) the filling finger 310 comprises the above described lower part 310a and the upper part 310b connected by the wall part 310c, thereby defining a space between the upper and lower parts 310a, 310b for accommodating the goods $G_1$ on their way into the envelope $E_1$.

Figure 11B:
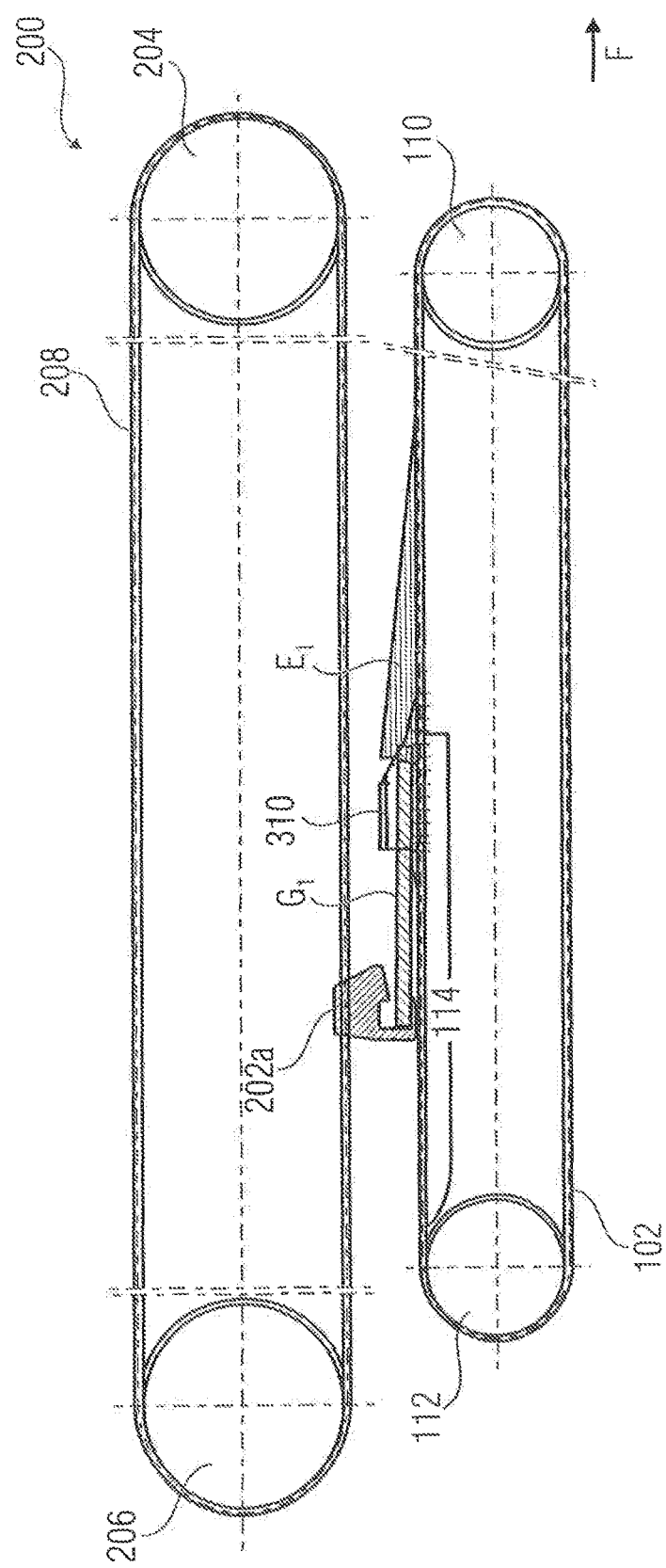

FIG. 11 shows the filling process at a position downstream from the position in FIG. 10. Again, FIG. 11(a) is a top view, and FIG. 11(b) is a view taken along line b-b' in FIG. 11(a). The envelope transport 100 moves the envelope $E_1$ with a first velocity, and the goods transport 200 moves the pusher 202a and thereby the goods $G_1$ with a velocity faster than the velocity by which the envelope $E_1$ is moved. Thus, as both the envelope $E_1$ and the goods $G_1$ travel down the inserting or filling path, the goods starts to "overtake" the envelope. The envelope is opened so that the goods are inserted into the envelope. The filling fingers 310, 320 are arranged such that their leading edges have been moved into the envelope $E_1$ and the goods $G_1$ are guided into the envelope by means of the filling fingers 310, 320, thereby avoiding any collisions with the envelope $E_1$. As mentioned above, the filling fingers 310, 320 are driven independently of the envelope transport 100 at a speed that is equal to or slower than the speed of the envelope conveyor 100; the filling fingers 310, 320 do not cause any transport of the envelope $E_1$. Also, the lateral distance of the filling fingers 310, 320 is only defined by the dimension of the goods $G_1$ to be inserted, but not by the lateral dimension of the envelope $E_1$.

Figure 12A:
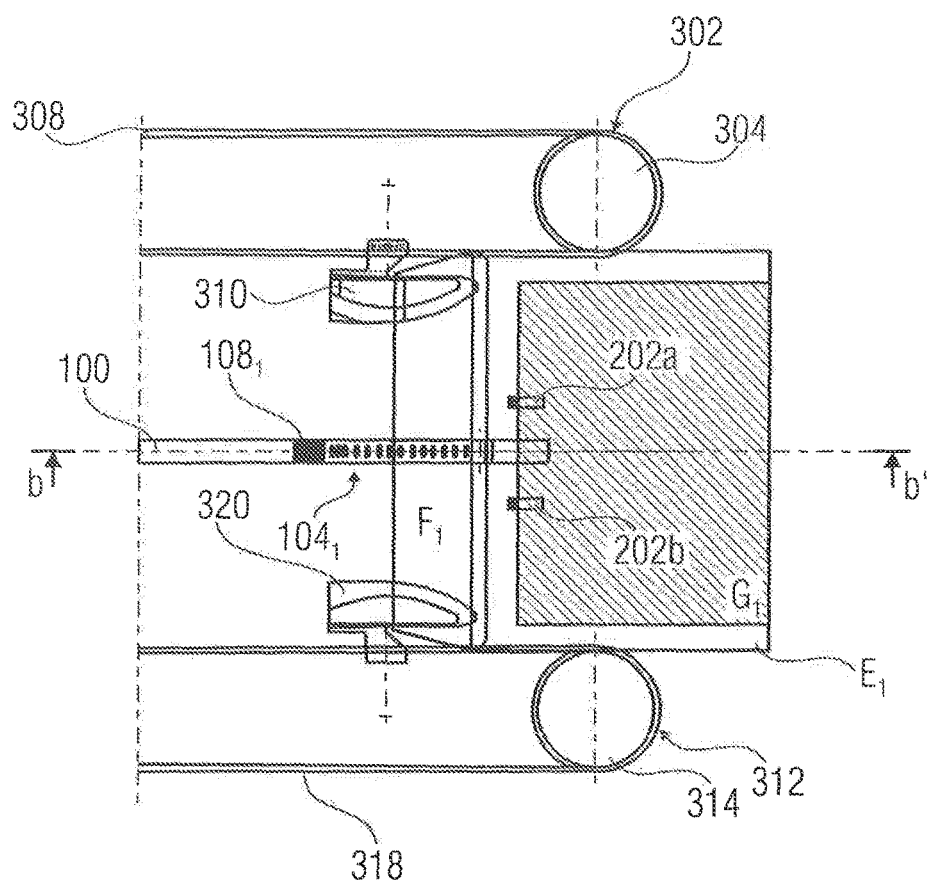
Figure 12B:
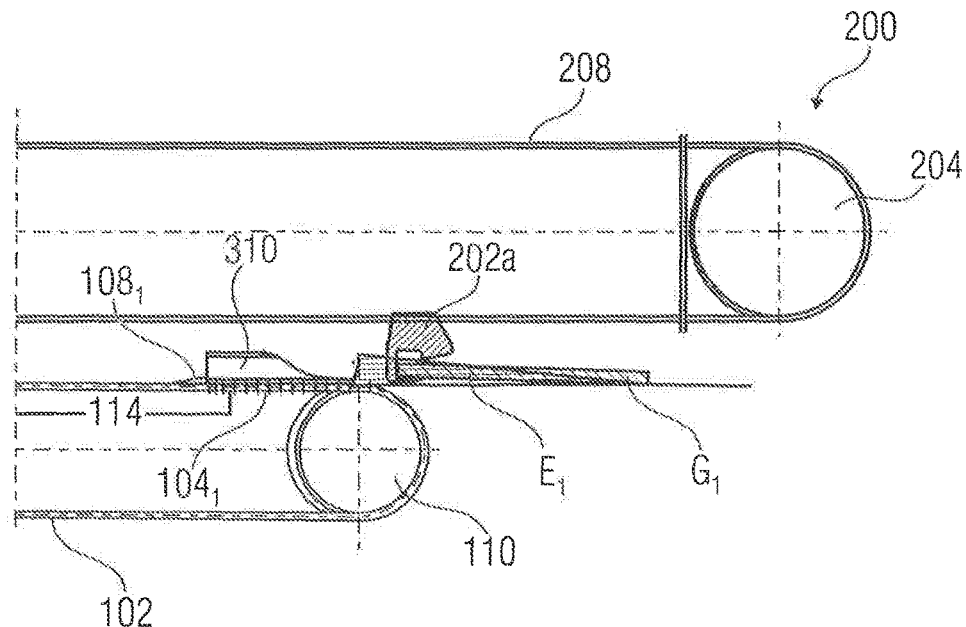

FIG. 12 shows a situation even further down the filling path where the filling process has been completed. Again, FIG. 12(a) is a top view, and FIG. 12(b) is a sectional view taken along line b-b'. As can be seen, the envelope $E_1$ reached the end of the filling path and the goods $G_1$ are completely inserted into the envelope $E_1$, i.e. they reached the envelope bottom at a leading edge of the envelope $E_1$. Further, the suction portion $104_1$ of the envelope transport 100 is now in an area into which the vacuum chamber 114 does not extend, so that the transport of the envelope $E_1$ by the envelope transport 100 ceases. The further transport of the filled envelope $E_1$ is provided by the goods transport 200 still engaging by means of the pushers 202a, 202b the goods $G_1$. Further, since the goods transport 200 operates at a speed faster than the filling aid transport 302, 312, the filled envelope $E_1$ is drawn off the filling fingers 310, 320.

As far as FIGS. 10, 11 and 12 are concerned, it is noted that these figures were described on the basis of the embodiment depicted in FIG. 1, however, the same functionality may be achieved when using the filling aid of the embodiment of FIG. 9.

Figure 13B:
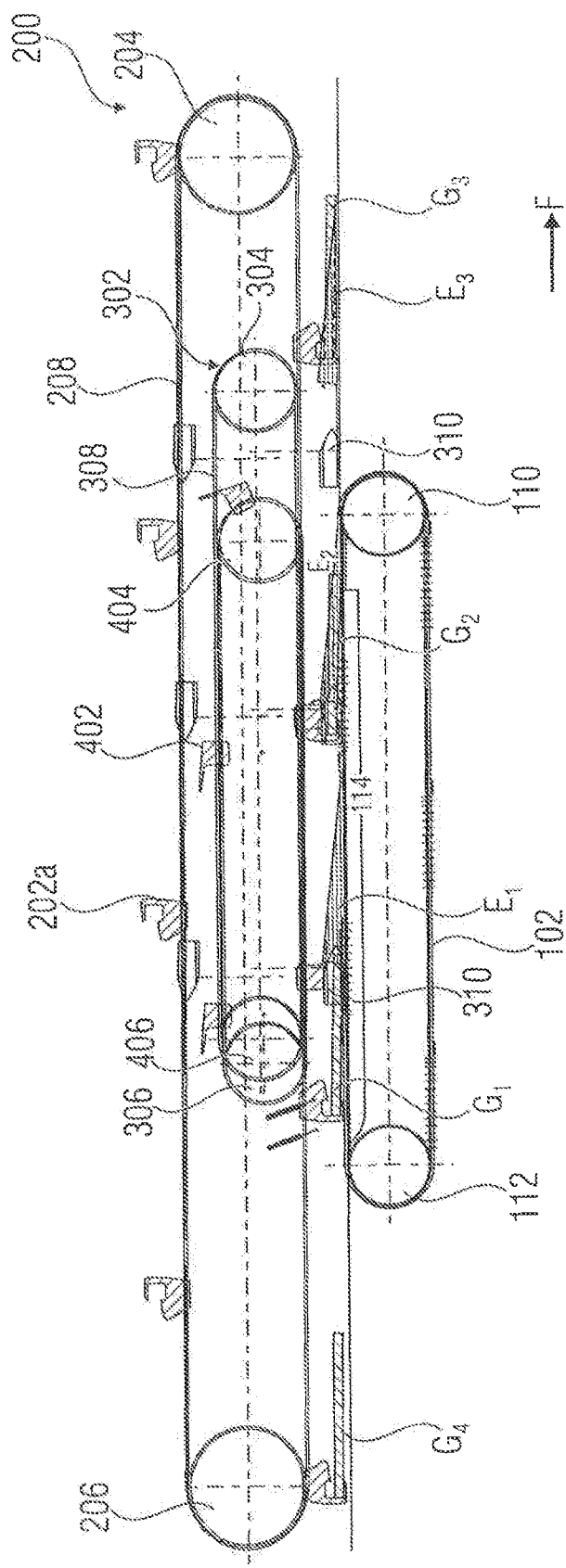

FIG. 13 shows yet another embodiment of the filling aid. In FIGS. 1 and 9 the filling aid was arranged on the lateral sides of the filling path, however, the invention is not limited to such embodiments. Rather, as is shown in FIG. 13(a), the filling aid may be arranged above the filling path. Again, the filling aid 300 comprises two conveyors 302, 304 arranged on the lateral sides of the filling path, i.e. on both sides of the envelopes $E_1$, $E_2$ transported along the filling path. FIG. 13(b) shows further details of the filling aid conveyor 302, which comprises the rollers 304, 306 around which the chain or belt 308 extends to which the respective filling fingers 310 are mounted. Contrary to the embodiments described so far, the first and second conveyors 302, 304 are not arranged in a plane that is parallel to the plane or level in which an envelope is transported, rather, the conveyors 302 and 304 are arranged perpendicular to the plane in which the envelopes travel. More specifically, the conveyor 302 is arranged such that the belt 308 extends on a lower side adjacent to the filling path for moving the filling finger 310 in the envelope transport direction F, whereas an upper part is distant from the plane in which the envelopes are transported. Still, as can be seen from FIG. 13(a), the conveyors 302, 304 are provided on the opposite lateral sides of the filling path to avoid interference with the other transports, e.g. the separating device transport and the goods transport. The functionality provided by the filling aid 300 in accordance with the embodiment shown in FIG. 13 is the same as the functionality described above with regard to FIGS. 1 to 3 and 9 to 12, except that instead of the lateral insertion of the filling fingers into the envelope as described above the filling fingers 310, 320 are moved into the envelope from above.

Figure 15:
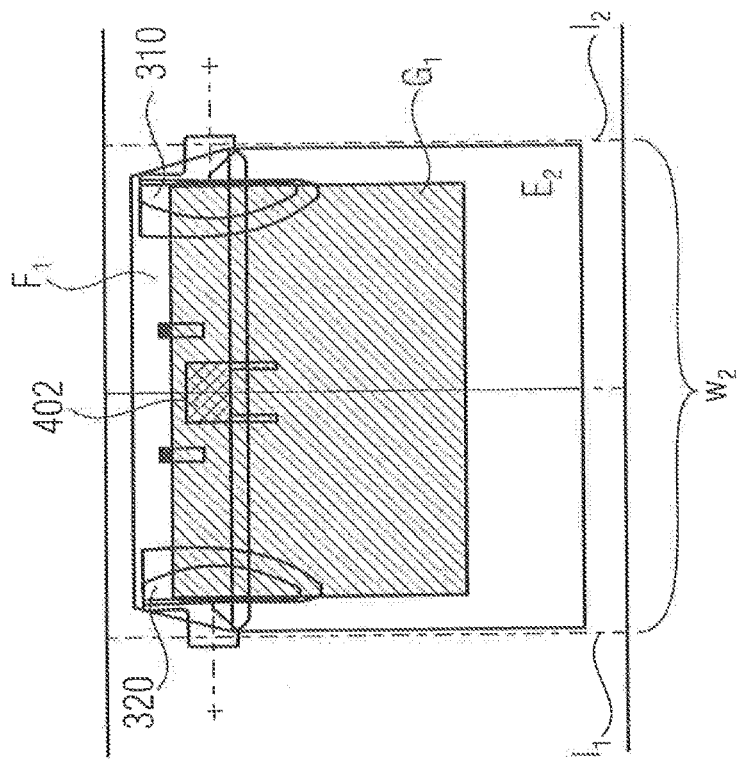
FIG. 15 shows a second envelope having a second width and a filling finger inserted.
Figure 14:
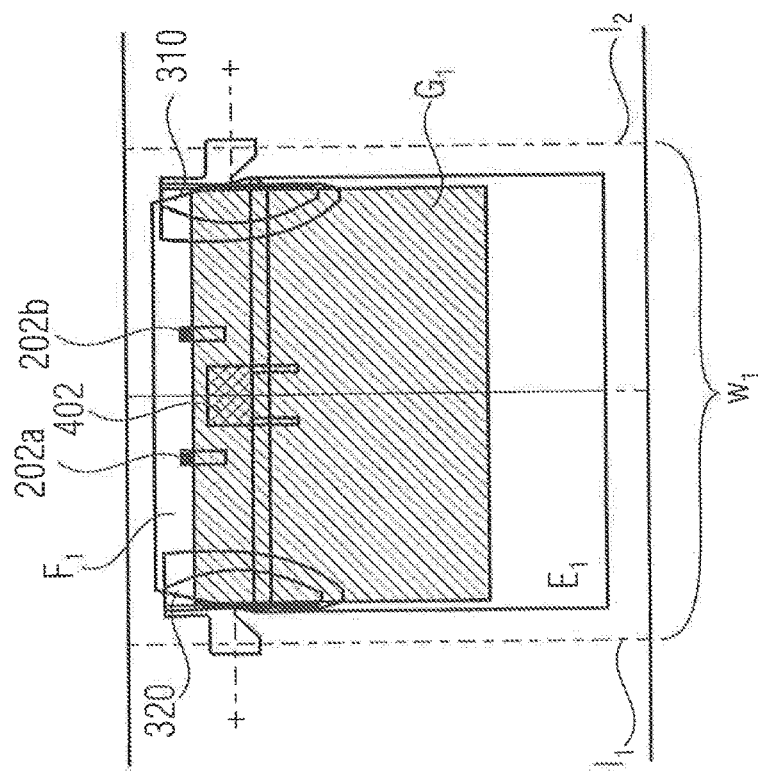
FIG. 14 shows a first envelope having a first width and a filling finger inserted.

As mentioned above, the filling fingers in accordance with the inventive approach are only for guiding the one or more goods to be inserted into an envelope without causing a transport of the envelope. Therefore, it is not necessitated to set the distance of the opposing filling fingers dependent on the envelope, thereby avoiding the above mentioned problems with regard to the tolerances of such envelopes. Rather, in accordance with the inventive approach, the filling fingers are only adjusted dependent on the goods to be inserted. This is described in further detail with regard to FIGS. 14 and 15. FIG. 14 shows a first envelope $E_1$ having a first width $w_1$, and FIG. 15 shows a second envelope $E_2$ having a second width $w_2$, wherein the second width $w_2$ is greater than the first width $w_1$. The goods to be inserted in FIGS. 14 and 15 are considered to be the same and to have the same dimensions. As can be seen from a comparison of FIGS. 14 and 15, the filling fingers 310, 320 are maintained at the same position (see the lines $l_1$ and $l_2$ in FIGS. 14 and 15) despite the fact that the width $w_1$ of the first envelope $E_1$ is smaller than the distance between the two lines $l_1$ and $l_2$ while the width $w_2$ of the envelope $E_2$ corresponds to the distance between the lines $l_1$ and $l_2$. Thus, the position of the filling fingers 310, 320 only depends on the dimension of the goods $G_1$, but not on the dimensions of the envelope $E_1$ and $E_2$, thereby avoiding the problems with conventional approaches that used the filling fingers also for transporting the envelope. For example, when considering FIG. 15, in a conventional approach it would have been necessitated to increase the distance between the filling fingers 310, 320 to allow for the transport of the envelope $E_2$, however, the goods $G_1$ would not be properly guided in such a situation, thereby increasing the probability of filling errors. In addition, the above mentioned problems regarding the tolerances of the envelopes are avoided.

Figure 17:
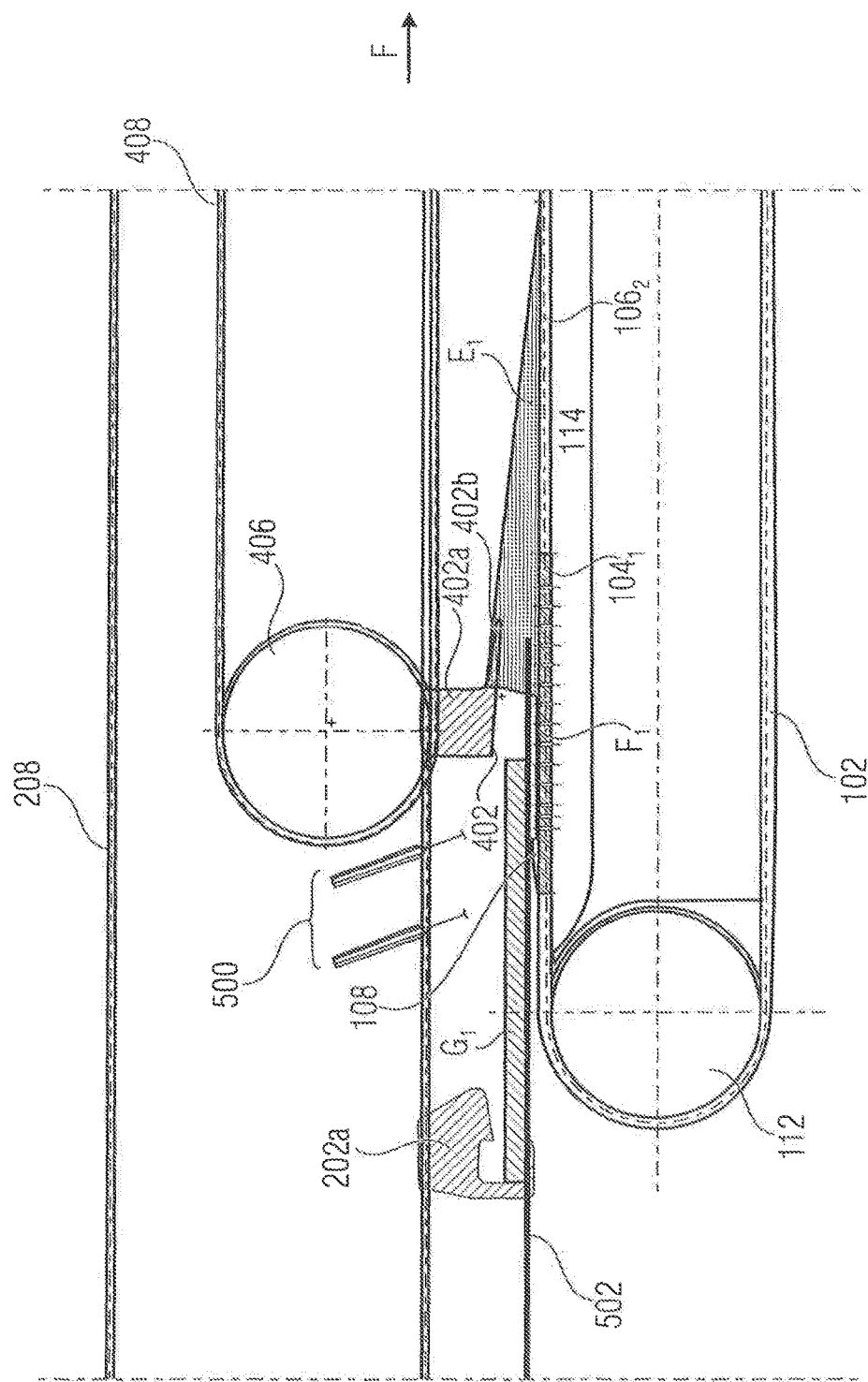
FIG. 17 shows a situation where the envelope, the goods and the claws have been moved further in the transport direction when compared to FIG. 16.

In the following, further embodiments of the separating device will be described with reference to FIGS. 16 to 22. FIG. 16 shows an initial situation of the filling process, where the envelope $E_1$ is already transported by the envelope transport 100, however, the goods $G_1$ have not yet reached the hinge line HL of the envelope $E_1$. The separating claw 402 has passed three quarters of the roller 406 of the separating device transport. The claw 402 has a claw main body 402a and a claw tip 402b. The claw tip 402b protrudes in the transport direction F from the claw body 402a. In accordance with embodiments, the claw tip 402b may be flexible for avoiding damaging of the envelope upon entering it. FIG. 17 shows that the envelope $E_1$, the goods $G_1$ and the claw 402 have been moved further in the transport direction F when compared to FIG. 16. The claw 402 has completely passed the roller 406 and the claw tip 402b engages with the inside of the upper side of the envelope $E_1$. Also, the goods $G_1$ have been further moved towards the envelope opening now held open by the claw tip 402b. The goods $G_1$ have been moved across the elevation 108 of the suction belt 102 thereby securely passing over the flap $F_1$ of the envelope $E_1$ that is held on the suction portion $104_1$ of the suction belt 102. Thus, the goods $G_1$ are raised above the plane in which the flap $F_1$ is arranged so that the goods $G_1$ can securely pass the flap without colliding with it.

Figure 18:
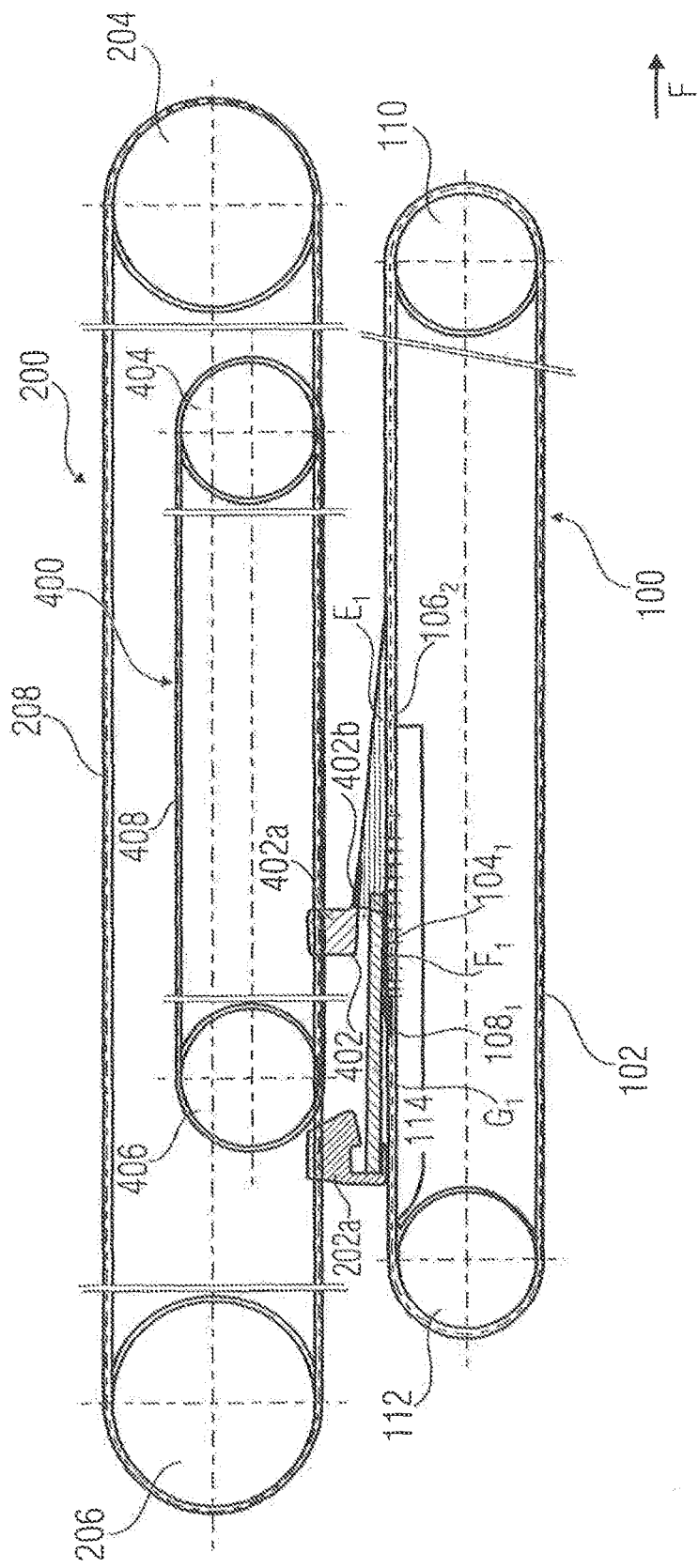
FIG. 18 shows a situation where the envelope, the goods and the claws have been moved even further in the transport direction when compared to FIG. 17.

In FIG. 18 the envelope $E_1$, the goods $G_1$ and the claw 402 have been moved further along the filling path. The separating claw 402 is moved together with the envelope $E_1$, advantageously at the same speed as the envelope, thereby maintaining the upper side of the envelope $E_1$ separated from the lower side during the transport of the envelope $E_1$.

In FIG. 18 it is shown that the leading edge of the goods $G_1$ has reached the throat opening of the envelope $E_1$ and has been partially inserted.

Figure 19:
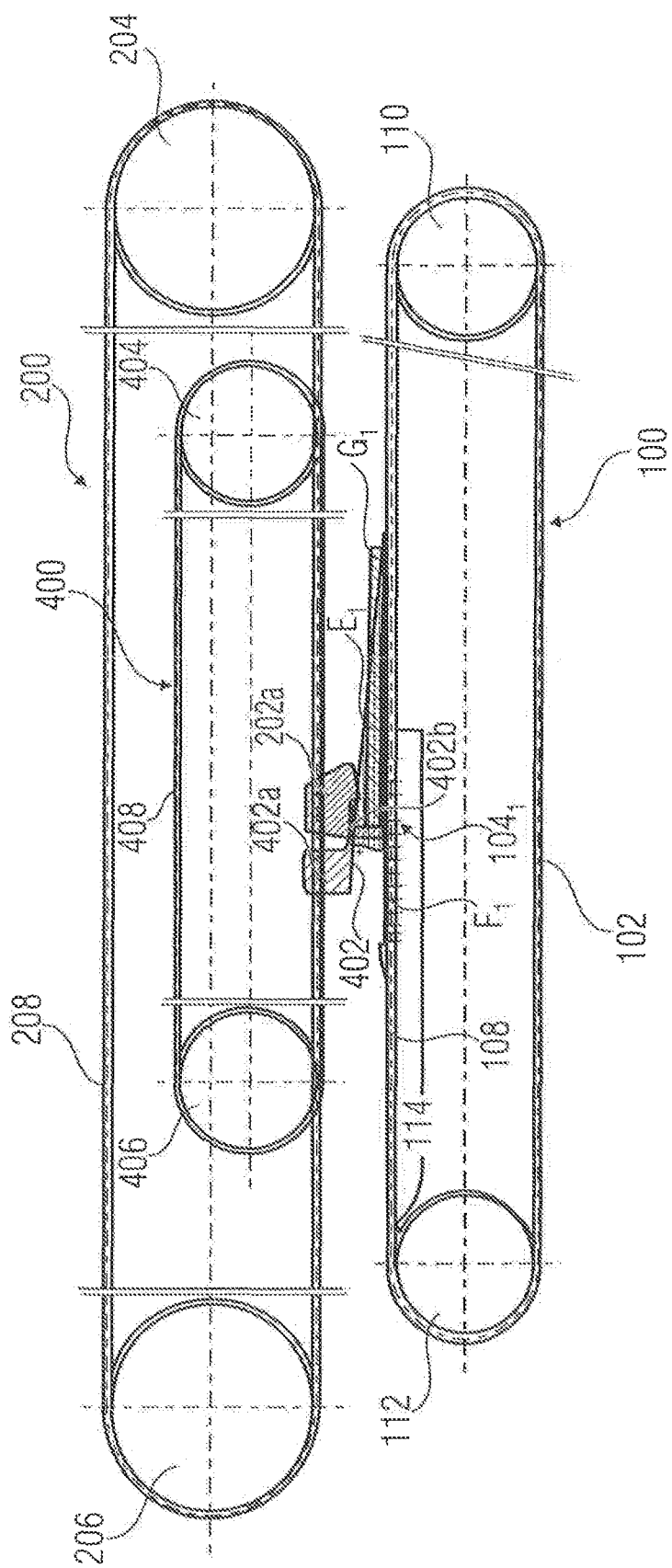
FIG. 19 shows a situation in which the filling process is almost completed.

FIG. 19 shows that the filling process is almost completed, i.e., the goods $G_1$ reached the bottom or leading edge of the envelope $E_1$. As described above, the goods transport 200 moves the goods $G_1$ at a velocity that is higher than the velocity by which the envelope $E_1$ and also by which the claw 402 of the separating device is moved so that, eventually, the pusher 202a overtakes the claw 402 as shown in FIG. 19. Also the suction belt 102, more specifically the suction area $104_1$, has almost reached the end of the vacuum chamber 114.

Figure 20:
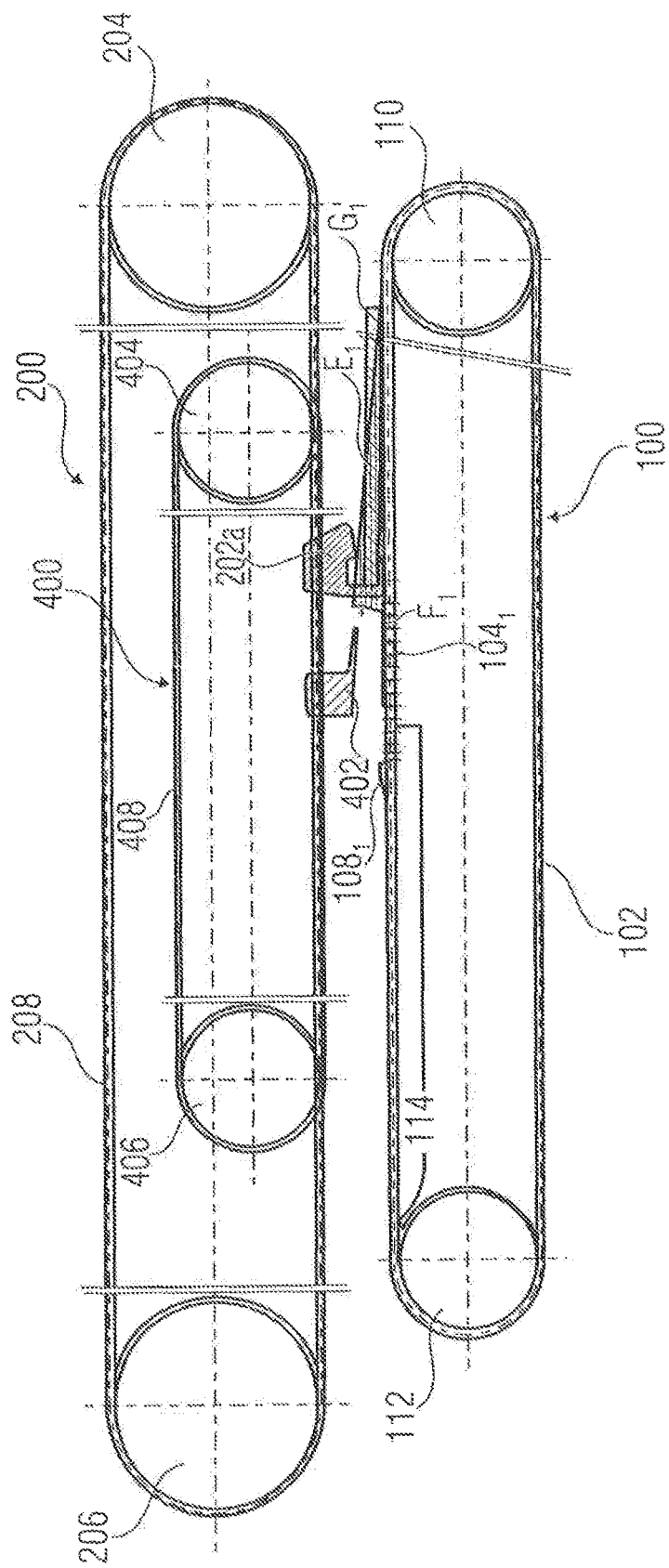
FIG. 20 shows the situation where the filling process has been completed and transport of the envelope has been taken over by the goods transport.

FIG. 20 shows that the filling process has been completed and transport of the filled envelope $E_1$ has been taken over by the goods transport 200, more specifically the filled envelope $E_1$ is pushed out of the filling path by the pushers 202a of the goods transport 200 still in an engagement with the goods $G_1$. The envelope has been transported by means of the suction belt to a position beyond the vacuum chamber so that transport of the envelope $E_1$ by the transport 100 ceases and the envelope is moved with the higher speed of the goods transport 200 towards an output. This, at the same time, the envelope is drawn off the claw 402 of the separating device as this device is operated at a speed that is equal to or slower than the speed of the transport 100.

So far the separating device has been described as comprising the separating claw, however, the invention is not limited to such embodiments. For example, as shown in FIG. 21, instead of the claw a suction element 402' may be provided that acts onto the outer surface of the envelope E so that it is maintained in its open position due to the suction force.

Figure 22A:
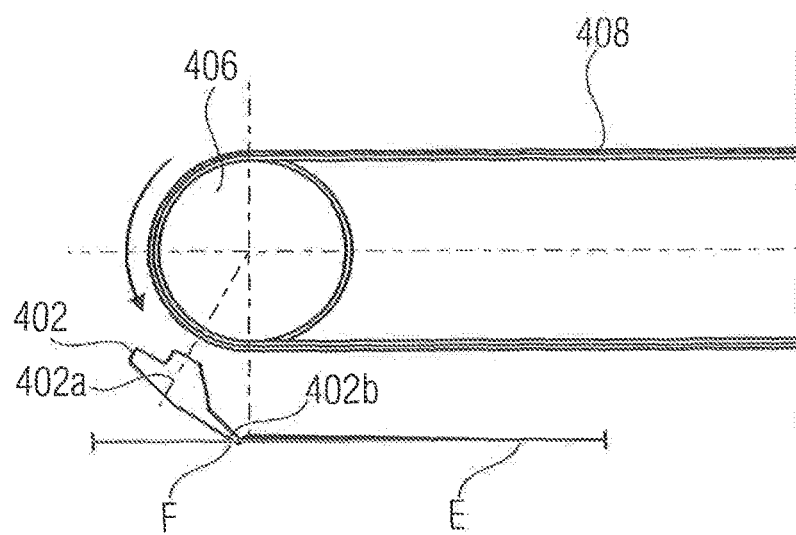
FIGS. 22(a) and 22(b) show a separating device according to yet another embodiments of the invention.
Figure 22B:
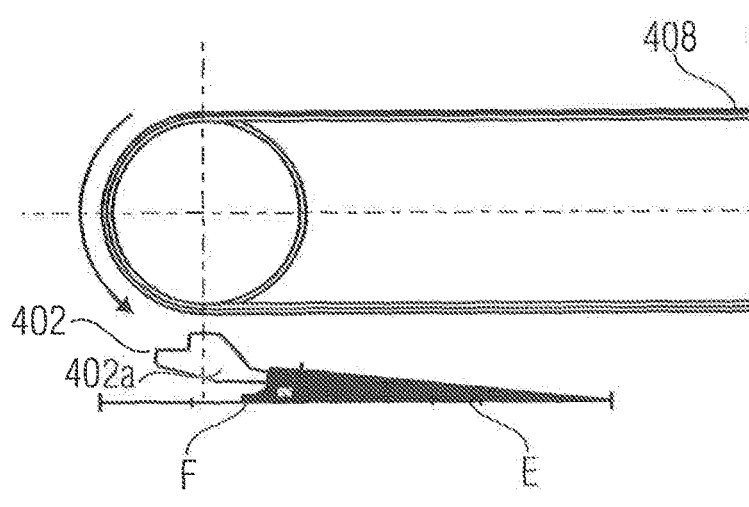

In accordance with further embodiments the separating element 402, for example the claw, may be configured such that upon moving around the roller 406, the separating element tip reaches a position in or below the level in which the envelope is transported so that the lower side of the envelope is pressed downwards which may be desired for more reliably separating the upper and lower sides of the envelope from each other. FIG. 22 schematically depicts such an embodiment. As can be seen, the tip 402b of the separating element 402 is structured to extend by a distance from the main body 402a so that upon rotating about the roller 406, the tip 402b is either in the transport level or a little bit below the transport level of the envelope E (see FIG. 22(a)) thereby pressing the envelope downwards for easier opening of the envelope. Once the separating element 402 completed its turnaround the roller 406, its tip 402b is raised above the level of the envelope E again, so that the lower side of the envelope and the upper side of the envelope are separated from each other (see FIG. 22(b)).

Instead of structuring the separating element 402 in way as shown in FIG. 22 it is also possible to provide a separating element 402 that is mounted to the transport 408 in such a way that prior to entering into the envelope E it is moved to the first position below the envelope transport level as shown in FIG. 22(a) and, after having been inserted into the envelope, it is retracted to the second position above the plane in which the envelope is transported. For example, appropriate means may be provided for allowing such a functionality, for example actuators for vertically moving the elements between the two positions. Also respective guide elements may be arranged along the part of movement so that in the beginning the element "dives" to the first position and then returns to the second position.

Figure 23:
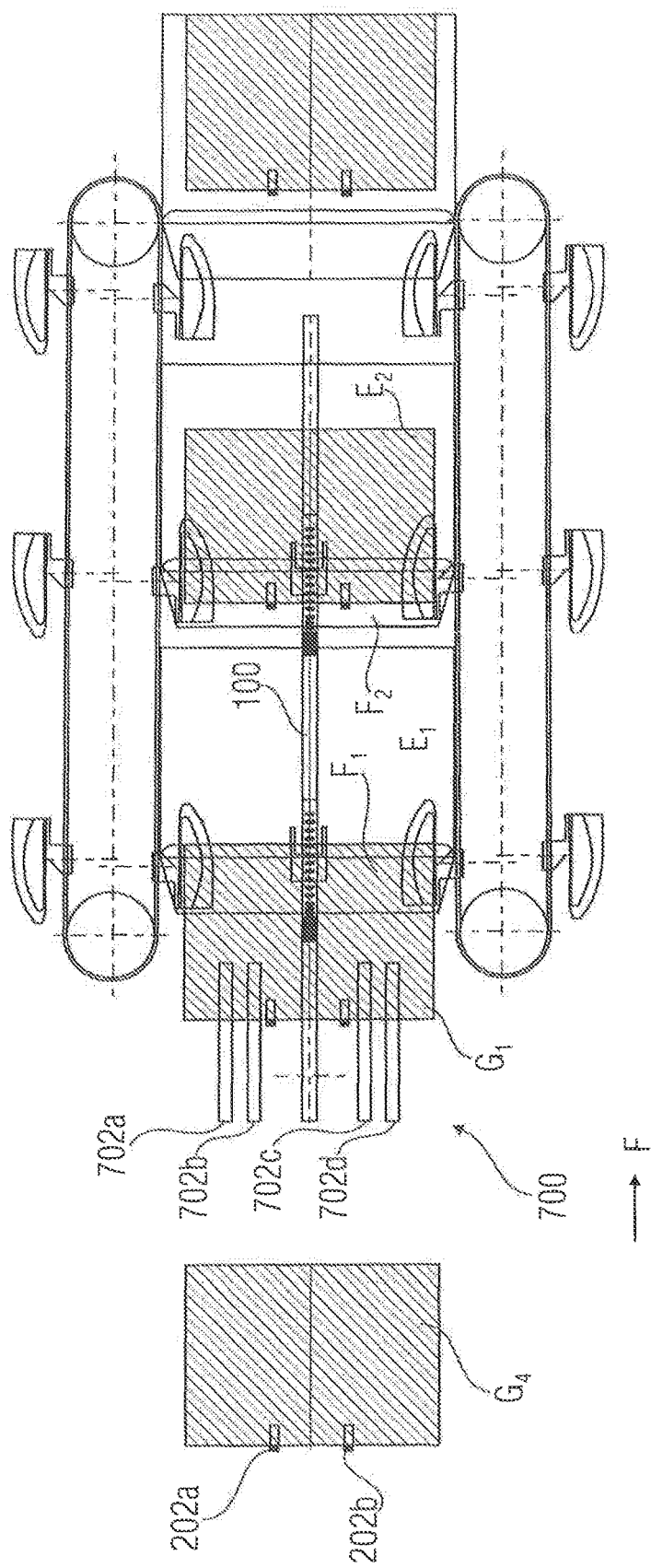
FIG. 23 shows a flap holder in accordance with embodiments of the invention configured to cover an envelope flap during at least a part of the movement of the envelope in an inserter as is it is shown in FIG. 1.

In the following, embodiments of the flap holder will be described with reference to FIGS. 23 to 29. Embodiments will be described in which the inserter, in addition to the above-described elements, further comprises a flap holder configured to cover an envelope flap during at least a part of the movement of the envelope and to maintain the envelope flap and one or more moving goods to be inserted into the envelope separated from each other. FIG. 23 shows a top view of the inserter as is it is shown in FIG. 1. In addition, a flap holder 700 is provided, while the other elements correspond to those which have been described with regard to FIG. 1. The flap holder 700 comprises four parallel flap holder elements 702a-702d. The flap holder elements 702a-702d may be formed of sheet-metal springs or spring plates and extend along the transport direction F. The flap holder 700 is arranged at the beginning of the filling path, so that an envelope, for example envelope $E_1$ which is moved into the filling path is arranged beneath the flap holder. As the envelope is inserted into the filling path, the flap holder, initially, covers an envelope body and, during the further movement of the envelope, covers the envelope flap. The one or more goods to be inserted are arranged above the flap holder 700, so that in a transfer region at the beginning of the filling path, the flap holder 700 is arranged between an envelope and the one or more goods.

The flap holder elements are arranged on both sides of the envelope transport 100, more specifically, the flap holder elements 702a and 702b are arranged in a portion between the envelope transport 100 and the first filling aid conveyor 302. Further, the flap holder elements 702a and 702b are arranged such that the pusher 202a of the goods transport 200 is at a position between the envelope transport 100 and the inner flap holder element 702b. The flap holder elements 702c and 702d are arranged in a similar way on the other side of the envelope transport 100, i.e. they are arranged between the second filling aid conveyor 312 and the envelope transport 100, wherein the pusher 202b of the goods transport is at a position between the inner flap holder element 702c and the envelope transport 100.

The functionality of flap holder 700 is such that upon entering the filling path, the envelope and the goods are separated from each other. The envelope is transported by the envelope transport 100 along the transport direction F and, in accordance with embodiments, the flap of the envelope is held on the transport belt, for example by a suction force applied. Thus, the center part of the envelope flap is held on the transport, so that the goods can pass the flap in this portion without any collisions. However, in the portions between the envelope transport 100 and the filling aid conveyors 302, 312 the flap, prior to inserting the filling aids is not held, so that the flap may raise from the transport level and a collision with the goods to be inserted may occur. Alternatively or in addition, the corners of the leading edge of the goods may hang down also resulting in a collision. Therefore, at the start of the filling process, the flap holder 700 is provided for covering the flap in those regions where the flap is not held, so that in the transfer area where the goods pass the flap, a separation between the flap and the goods is ensured, thereby allowing for a reliable filling process.

It is noted that the invention is not limited to the use of a suction belt as an envelope transport. In case another kind of transport is used which does not provide for a holding of the flap, an additional flap holder element may be provided between the flap holder element 702b and 702c.

In FIG. 23 an embodiment has been described comprising four or five flap holder elements. It is noted that the inventive approach is not limited to such embodiments, rather, more than four or five flap holder elements or less than four flap holder elements may be used. FIG. 24(a) shows an embodiment in accordance with which six flap holder elements 702a-702f are provided. The flap holder elements are arranged in a similar way as shown in FIG. 23, however, in addition between the outer flap holder 702a in FIG. 23 and the first filling aid conveyor 302 a first additional flap holder element 702e is arranged. Between the outer flap holder element 702d on the other side of the center line C of the envelope E and the second filling aid conveyor 312 in FIG. 23 a further second flap holder element 702f is arranged.

Figure 24B:
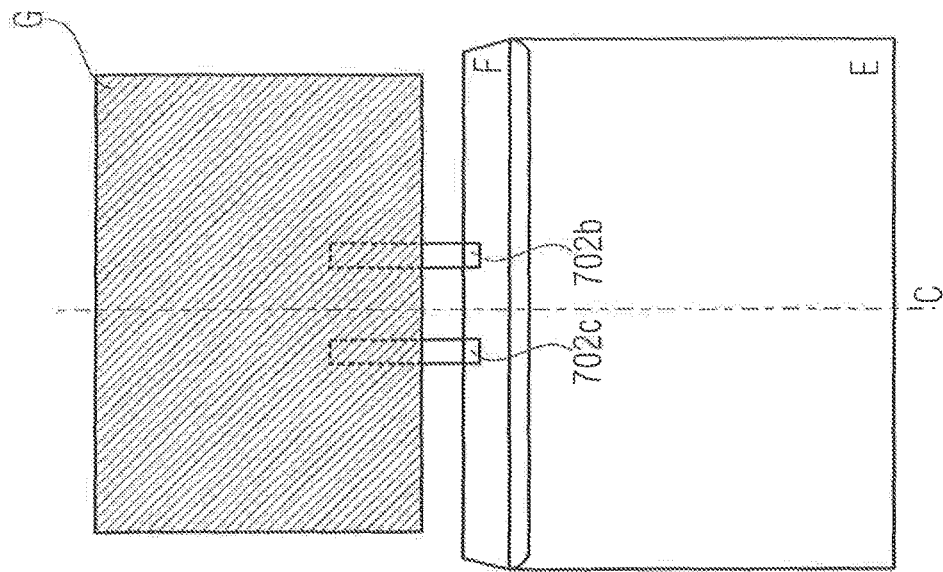
Figure 24A:
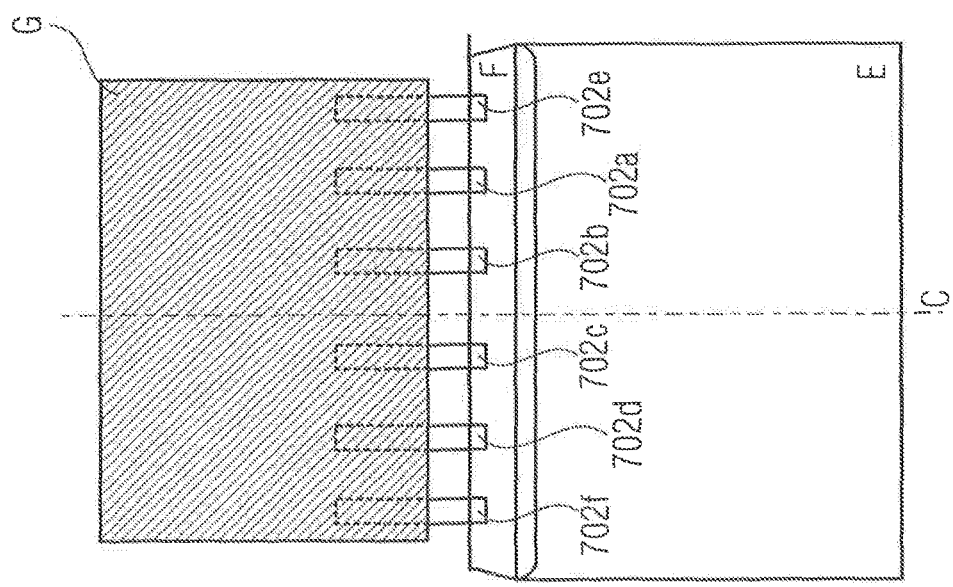

FIG. 24(b) shows another embodiment comprising only two flap holder elements 702b and 702c, flap holder elements 702a and 702d have been omitted.

The number of flap holder elements may be selected dependent on the format of the goods and envelopes to be processed by the inserter and/or by the characteristics of the goods/inserts. For example, goods/envelopes of the same format, but having a different stiffness may necessitate the use of more or less flap holder elements. For example, the stiffer the material of the goods/envelopes, the less bending is to be expected and the less flap holder elements are needed.

FIG. 25 shows an embodiment using stationary flap holder elements. FIG. 25 shows the different stages of one or more goods transferring or passing an envelope flap while using a flap holder. In FIG. 25(a) an initial situation is shown in which an envelope $E_1$ has been fed to the envelope transport. The surface 502 is shown in FIG. 25(a) that may be formed of a plate or one or more stripes and which extends up to a position X towards the beginning filling path (see the leading edge 502a). Goods on their way to the filling path move above the surface 502, and an envelope is fed to the filling path from beneath passes the leading edge 502a of the surface 502. The flap holder element 702a has a leading edge 704 which extends in the transport direction F beyond the position X. As the envelope $E_1$ is moved into the inserting path, the leading edge 704 contacts the envelope body 706. The goods $G_1$ to be inserted into the envelope $E_1$ arrive and a leading edge 708 of the goods $G_1$ is arranged on a trailing edge 710 of the flap holder element 702a. Thus, in FIG. 25(a) an edge of the Flap F1 has already reached the position X while the goods did not yet reach this position. Since the goods and the envelope are continuously moved, this situation results in a generation of a gap g between the edge of the flap and the leading edge of the goods, as is shown in FIG. 25(b). This gap is more likely to occur the shorter the flap is. To avoid collisions between the goods and the flap, the flap holder is provided which is arranged such that it spans the gap and, thereby maintains the goods and the envelope separated. In FIG. 25(b) the envelope $E_1$ and the goods $G_1$ have been moved further and, for example, by means of an air nozzle 500 the envelope $E_1$ has been opened so that the envelope's upper side 712 is separated from the envelope's lower side 714, to which the flap $F_1$ is attached. The flap holder element 702a may be formed from a sheet-metal spring or a spring loaded plastic element which is biased in a direction of the envelope $E_1$, however, the flap holder element 702a is dimensioned such that upon opening the envelope throat 716 the leading edge 704 of the flap holder element 702a is also raised, i.e. the flap holder elements 702a allows the opening of the envelope $E_1$. In FIG. 25(c) the envelope $E_1$ and the goods $G_1$ have been moved further down the transport direction F so that due to the further movement the leading edge 704 of the stationary or fixed flap holder element 702a is no longer in contact with the upper side 712 of the envelope body, but is only in contact with the flap $F_1$. Due to the resilient nature of the flap holder element 702a it deflects downward onto the flap $F_1$ after leaving the upper side 712. The goods $G_1$ already reached the envelope throat 716 and the flap holder element 702a is arranged between the flap $F_1$ and the goods $G_1$, thereby allowing for a secure transfer of the goods $G_1$ across the flap $F_1$ without any collisions between the goods $G_1$ and the flap $F_1$ in the transfer area depicted in FIG. 25.

Figure 26A:
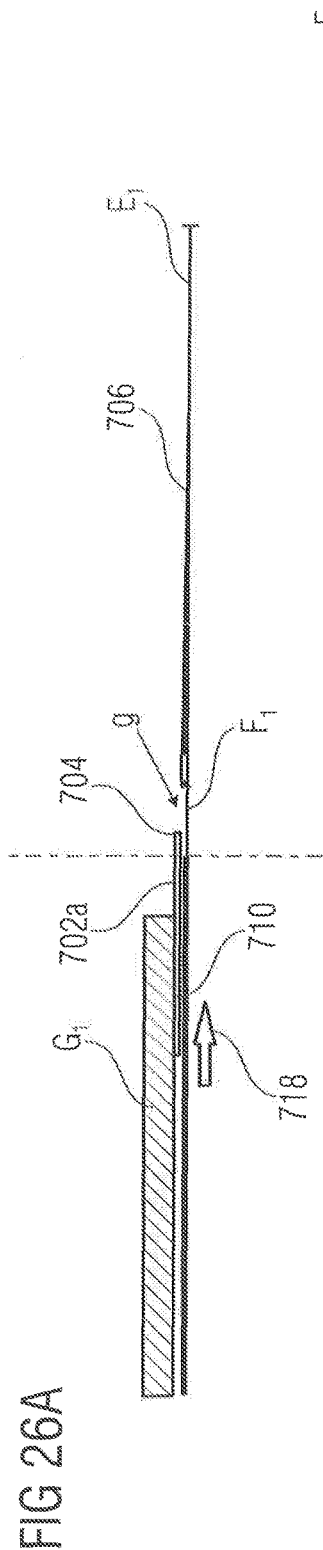
Figure 26B:
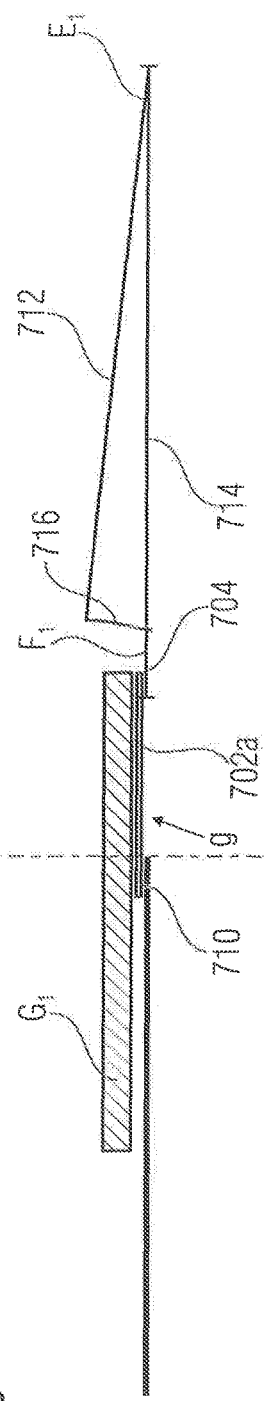
Figure 26C:
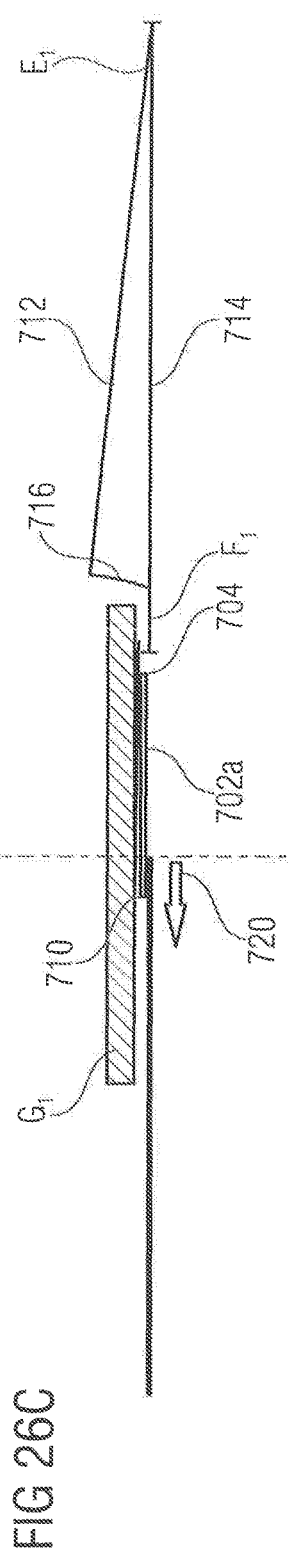

FIG. 26 describes another embodiment of the flap holders which may be provided movable. To be more specific, the flap holders may be moved at least partially along the transport direction F together with the goods and the envelope to ensure that during this movement the envelope flap is contacted by the flap holder and that the flap holder separates the flap and the goods. FIG. 26(a) shows an initial situation similar to FIG. 25(a) where an envelope $E_1$ has been received in the filling path and the goods $G_1$ arrive at the filling path. The flap holder element 702a is movable along the transport direction F as is shown by the arrow 718. In FIG. 26(a) a first position of the flap holder element 702a is shown in which the leading edge 704 is in contact with $F_1$ of the envelope $E_1$ that has been inserted into the filling path. The goods $G_1$ which arrive at the filling path are in contact with the flap holder element 702a that is arranged between the goods $G_1$ and the flap $F_1$. In FIG. 26(b) the envelope $E_1$ and the goods $G_1$ have been moved further down the filling path. Also, the flap holder element 702a, which is movable, has been moved further down in the filling direction so that the contact of the leading edge 704 and the flap $F_1$ is maintained during the movement from the position shown in FIG. 26(a) and the position shown in FIG. 26(b). The leading edge of the goods $G_1$ has reached the leading edge 704 of the flap holder element which separates the goods $G_1$ from the flap $F_1$. In FIG. 26(b) the leading edge of the goods $G_1$ has already passed the trailing edge of the flap $F_1$ so that the goods $G_1$ can now pass the flap $F_1$ without any collisions and can be securely and reliably inserted into the envelope $E_1$, which has been opened by appropriate means, for example, by blow air provided by nozzles. In FIG. 26(c) the goods $G_1$ and the envelope $E_1$ have been moved further along the transport direction F. Since the leading edge of the goods $G_1$ has already passed securely the trailing edge of the flap $F_1$, the flap holder element 702a is retracted from the second position shown in FIG. 26(b) back towards the first position shown in FIG. 26(a) as is schematically shown by the arrow 720.

Figure 27A:
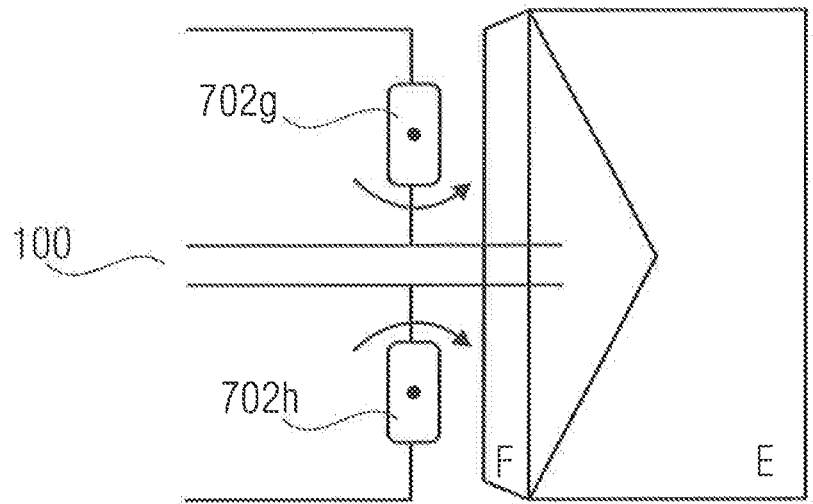
FIGS. 27(a) and 27(b) show a flap holder in accordance with another embodiment of the invention.
Figure 27B:
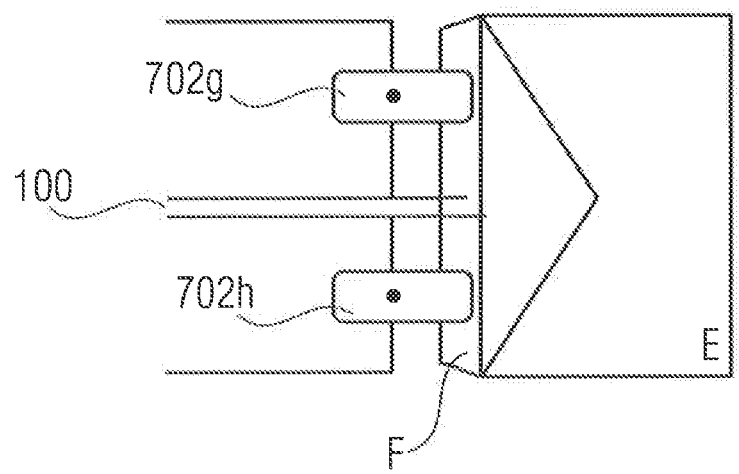

So far, stripe-shaped flap holders have been described. The invention is not limited to such embodiments, rather, the flap holders may have any suitable shape. FIG. 27 shows a flap holder in accordance with another embodiment of the invention. The flap holder elements 702g and 702h are provided which have an rectangular or an elliptical shape and which can be rotated between a first position shown in FIG. 27(a) and a second position shown in FIG. 27(b). In the first position the short axis of the plates 702g, 702h extends substantially along the transport direction, and the long axis of the plates 702g, 702h extends substantially perpendicular to the transport direction. In this position the flap F of the envelope is not covered, i.e., there will be a gap between the goods and the envelope edge. Upon rotating the plates 702g, 702h into then position shown in FIG. 27(b) the short axis of the plates 702g, 702h extends substantially perpendicular to the transport direction, and the long axis of the plates 702g, 702h extends substantially along the transport direction so that the leading edges of the plates 702g, 702h cover the flap.

In the embodiments depicted so far, flap holder elements were described which extended by the same distance across the envelope and/or the envelope flap. However, the invention is not limited to such embodiments, rather, dependent on the characteristics of the envelope opening some flap holder elements may extend further onto the envelope as others. Such an embodiment is now described with regard to FIG. 28. The flap holder in the embodiment of FIG. 28 comprises six flap holder elements of which only flap holder elements 702a, 702b and 702e (see for example FIG. 24(a)) are shown. The envelope $E_1$ has an opening 716 being deeper at the center of the envelope $E_1$ and decreasing towards the outer edges of the envelopes. The flap holder elements 702a, 702b and 702e are provided such that the respective leading edges of the flap holder elements are arranged at different end positions along the transport direction F, for example, the larger the opening 716 is, the further the flap holder elements extend onto the envelope $E_1$.

Figure 28:
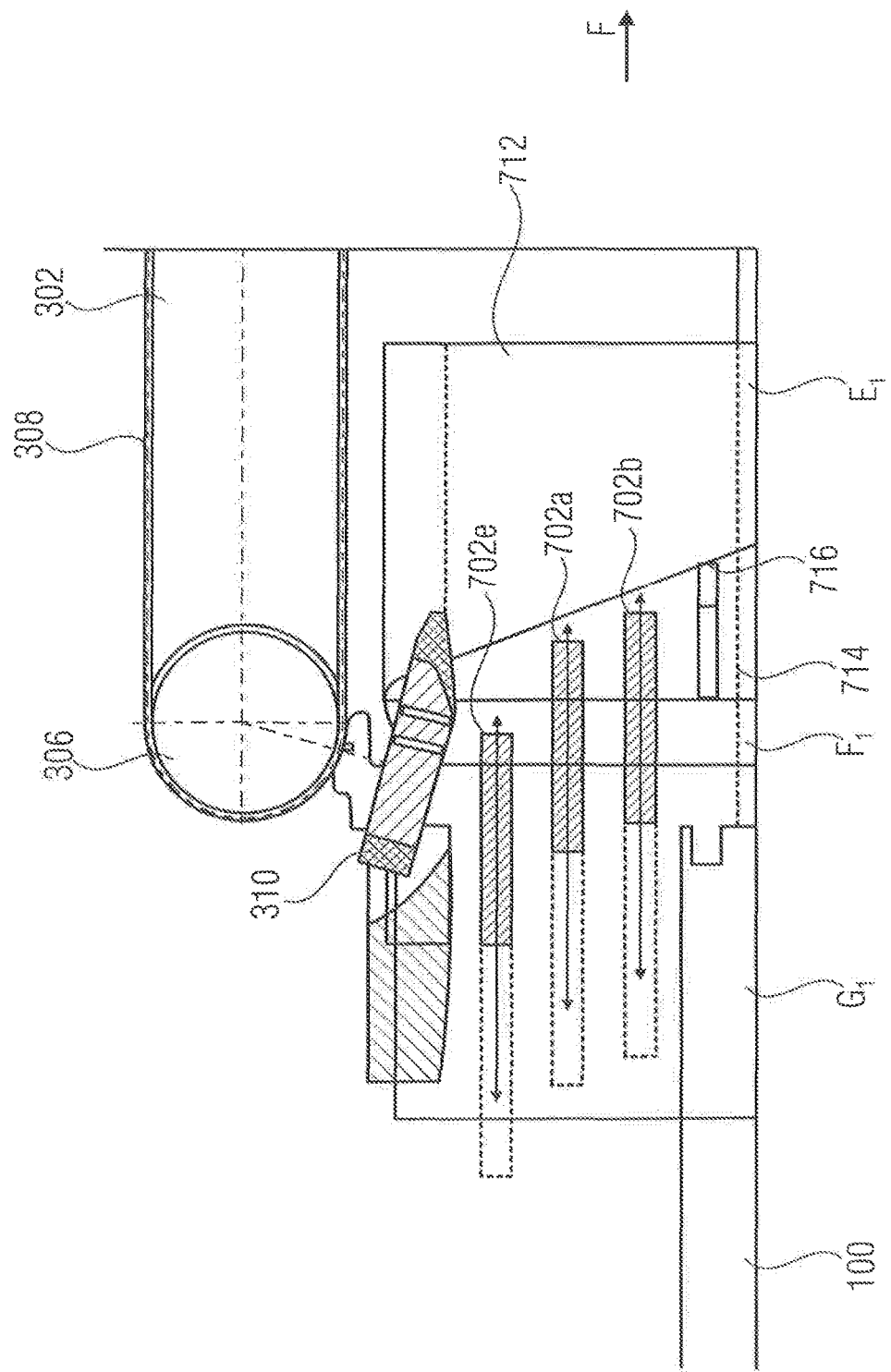
FIG. 28 shows adjustable flap holders in accordance with an embodiment.

To allow for the handling of different kinds of envelopes, the flap holder elements may be arranged adjustable, as is indicated by the respective arrows shown in FIG. 28. For example, in case of a stationary flap holder, the respective flap holder elements may be provided with or connected to drives which allow for the adjustment of the leading edges of the flap holder elements dependent on the characteristics of the envelope, for example, the way it is shown in FIG. 28, advantageously prior to the start of an inserting job. In case of movable flap holder elements as described with regard to FIG. 26, the drive or motor provided for moving the flap holder elements between the first and second positions may be controlled such that at the second positions one flap holder element is positioned further down the transport direction F than other flap holder elements.

Figure 29:
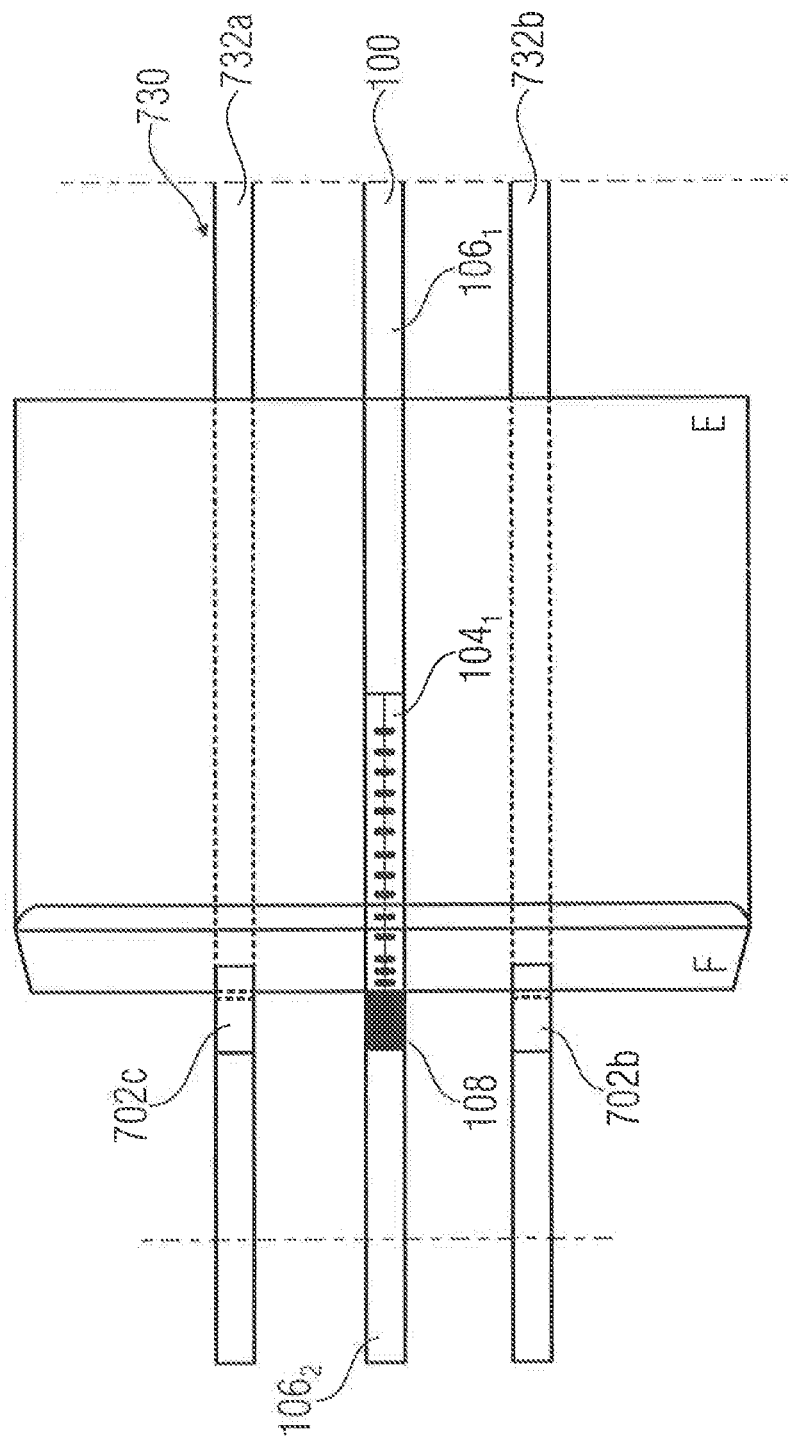
FIG. 29 shows another embodiment of the flap holder comprising flap holder elements which can travel together with the envelope along the filling path.

In accordance with another embodiment of the invention shown in FIG. 29, the flap holder may comprise flap holder elements 702b, 702c which can travel together with the envelope along the filling path, like the filling fingers of the filling aid. A circulating conveyor 730 is provided which comprises two belts 732a, 732b to which the flap holder elements 702b, 702c are mounted so that after completing the filling process and removing the envelope from the filling path, the flap holder elements 702b, 702c can be returned to the starting position. Advantageously, along the circulating conveyor a plurality of flap holder elements are provided for allowing the handling of one or more envelopes along the filling path.

Further, although the flap holder elements are shown to be spaced at the same intervals in the lateral direction (lateral to the transport direction F), it is noted that the intervals may be different, e.g. dependent on the characteristics of the goods and/or envelopes.

In the following, further embodiments of the invention will be described. More specifically, in the embodiments described so far the filled envelope is transported by the pushers of the goods transport, however, the present invention is not limited to such an implementation. For example, when the goods to be inserted comprise a low number of elements, e.g. only one or two sheets, or when the goods are not stiff or not rigid, a reliable transport of the envelope by the goods transport may not be possible or may be difficult (e.g. necessitate a reduced speed which, in turn, reduces the throughput). Goods may be deformed or damaged by the pusher. Further, the change in the transport speed of the envelope due to the goods transport taking over transport of the filled envelope may be critical because the filled envelope may be displaced (this may also happen when filling sufficiently stiff or rigid goods into the envelope). To avoid such problems, embodiments of the invention comprise a further envelope transport causing the transport of the filled envelope.

Figure 30A:
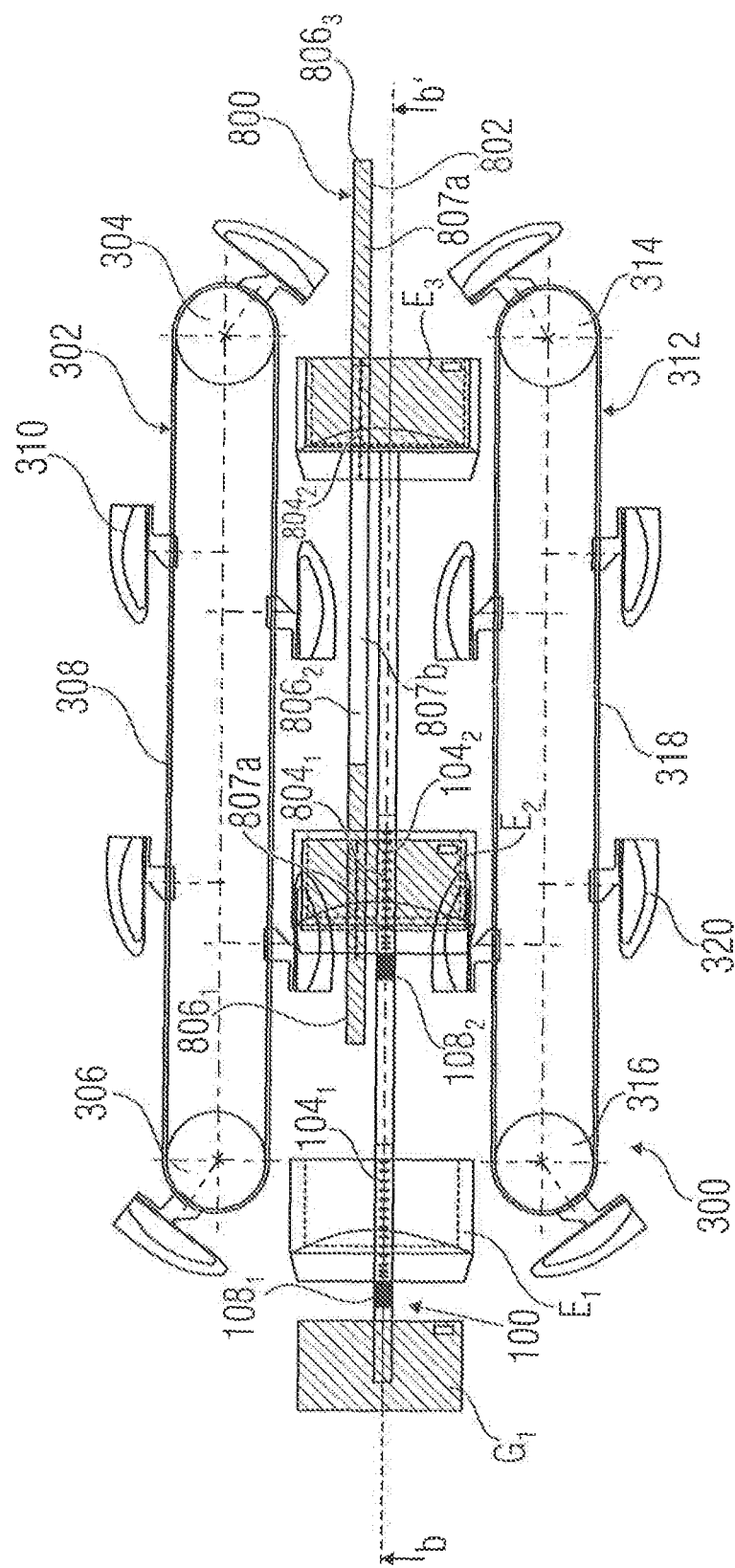
Figure 30B:
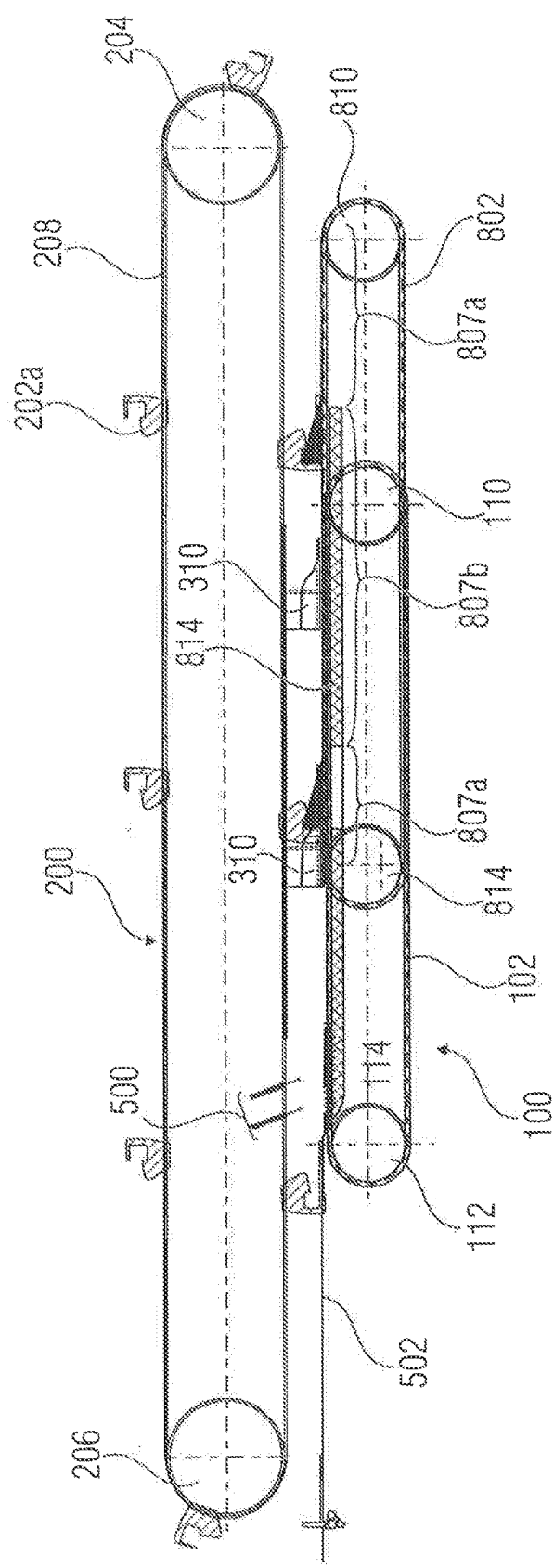

FIG. 30 shows an embodiment comprising such an additional envelope transport, wherein FIG. 30(a) is a schematic top view, and FIG. 30(b) is a sectional view taken along line b-b'. In FIG. 30 an inserter similar to the one of FIGS. 1 and 2 is shown. Elements of the inserter already described with respect to FIGS. 1 and 2 have associated therewith the same reference signs as used in FIGS. 1 and 2 and will not be described again. In addition to the envelope transport 100 used for transporting the envelope while inserting the goods, an additional envelope transport 800 is provided. The additional envelope transport 800 is arranged parallel and partially overlapping with the transport 100. The additional envelope transport 800 is arranged between the transport 100 and the first conveyor 302 of the filling aid 300. The additional envelope transport 800 comprises a suction belt 802 having first portions $804_1$ and $804_2$ where the suction belt 802 is provided with openings so that a suction force can be applied by a vacuum mechanism provided beneath the suction belt 802 to an object (e.g. a filled envelope) arranged on the suction belt 802. Further, the suction belt 802 comprises second portions $806_1$, $806_2$, $806_3$ between the first portions $804_1$ and $804_2$ where no holes are provided so that in this part of the suction belt no suction force is applied to an object arranged thereon. Further, in FIG. 30(a) portions 807a of the additional envelope transport 800 are hatched and portion 807b is not hatched. In portions 807a of the transport 800 no vacuum force is applied towards the belt 802, and in portion 807b of the transport 800 a vacuum force is applied towards the belt 802. Thus, when the first portions $804_1$ and $804_2$ of the belt 802 pass portion 807b a suction force is applied to the envelope on the belt 802 so that the envelope is transported by the additional envelope transport 800.

As can be seen from FIG. 30(b), the additional envelope transport 900 comprises a first, driven roller 910 and a second roller 812 around which the suction belt 802 extends. The envelope transport 800 further comprises a vacuum chamber 814 that is arranged in portion 807b of the transport 800 and extends partly between the rollers 810 and 812 for applying the suction force to the sections 804 of the suction belt as the respective sections 804 are moved across the vacuum chamber 814. The vacuum chamber 814 extends from the roller 812 along the conveying direction F towards the roller 810, however, the vacuum chambers 114 and 814 of the transports 100 and 800 do not overlap.

Once the envelope is filled it will no longer be transported by the transport 100. At this time, the filled envelope reached a position where it will be transported by the additional transport 800 with a velocity equal to or faster than the velocity of the goods transport. Thus, the filled envelope will be transported by the additional transport 800 thereby avoiding the above mentioned problems when transporting the filled envelope by the pushers of the goods transport. By means of the additional envelope transport 800 and the envelope transport 100 along the filling path a continuous transport or conveyer for the envelope is provided for reliably transporting the filled envelope to the output transport or the inserter output. The change in the transport speed of the envelope is not a problem because it occurs by transporting the filled envelope by the additional envelope transport 800, i.e. the envelope—during the further transport—is held by the transport elements of the additional envelope transport 800. This avoids undesired movements of the envelope or the like and thus allows for a reliable transport of the filled envelope towards the inserter output.

It is noted that in accordance with embodiments the inserter may be controlled such that dependent on the goods to be filled into an envelope the transport of the filled envelope may be caused by the goods transport 200 or by the additional envelope transport 800. For example, when it is determined that thin goods are to be filled into an envelope the additional envelope transport 800 may be activated. In case of inserts being sufficient rigid the additional envelope transport 800 may be deactivated so that the filled envelope is transported by the goods transport 200.

The additional envelope transport 800 may transport the filled envelope with a velocity higher than the transport 100 and higher than a velocity of the filling aid 300 so that the filled envelope will be removed from the filling fingers (see envelope $E_3$).

Figure 3A:
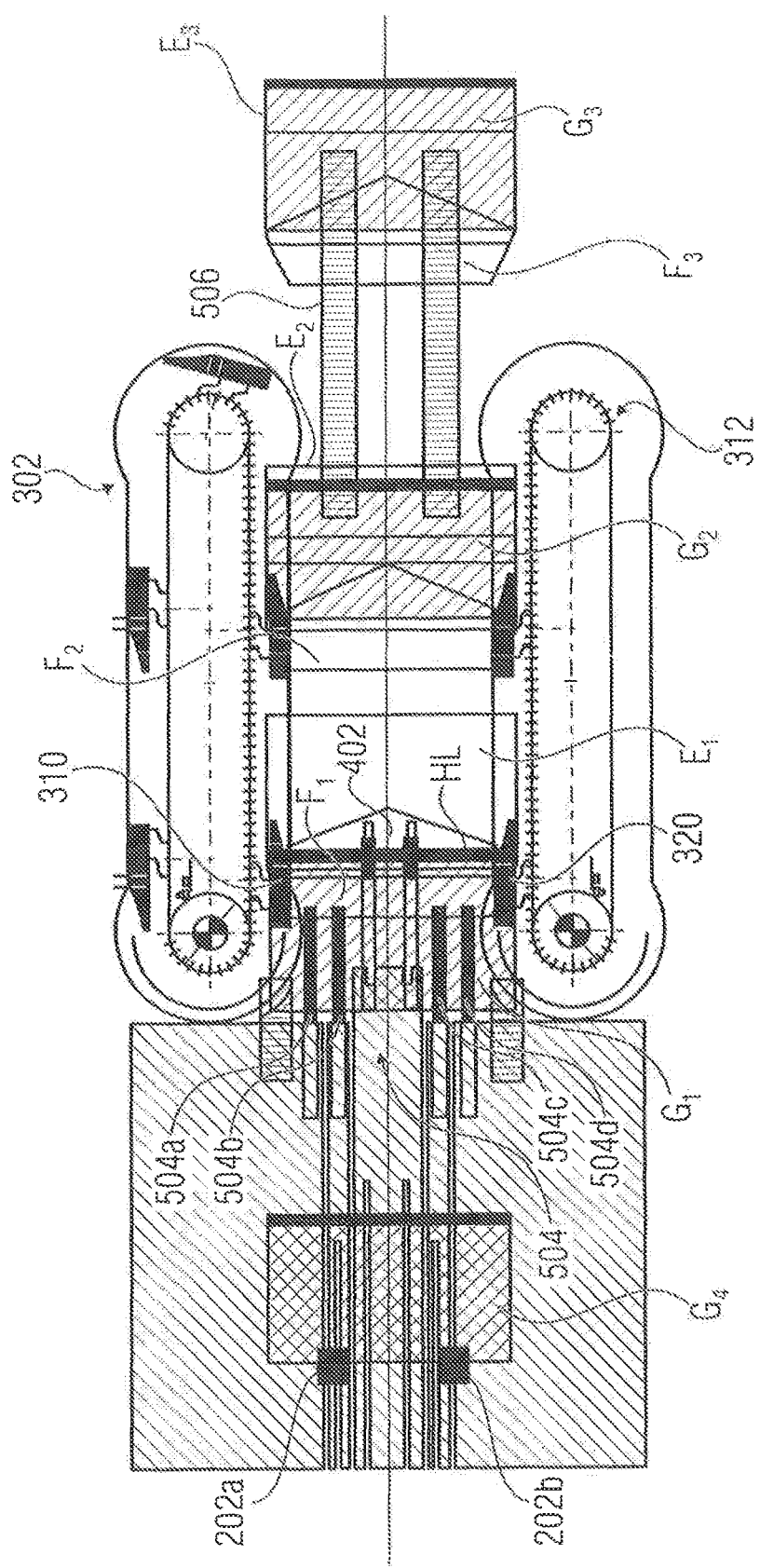
Figure 3B:
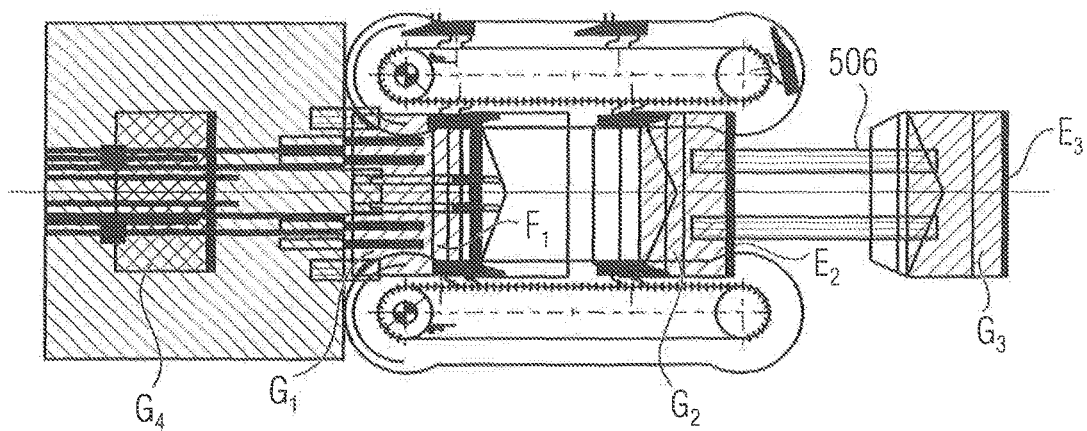
Figure 3C:
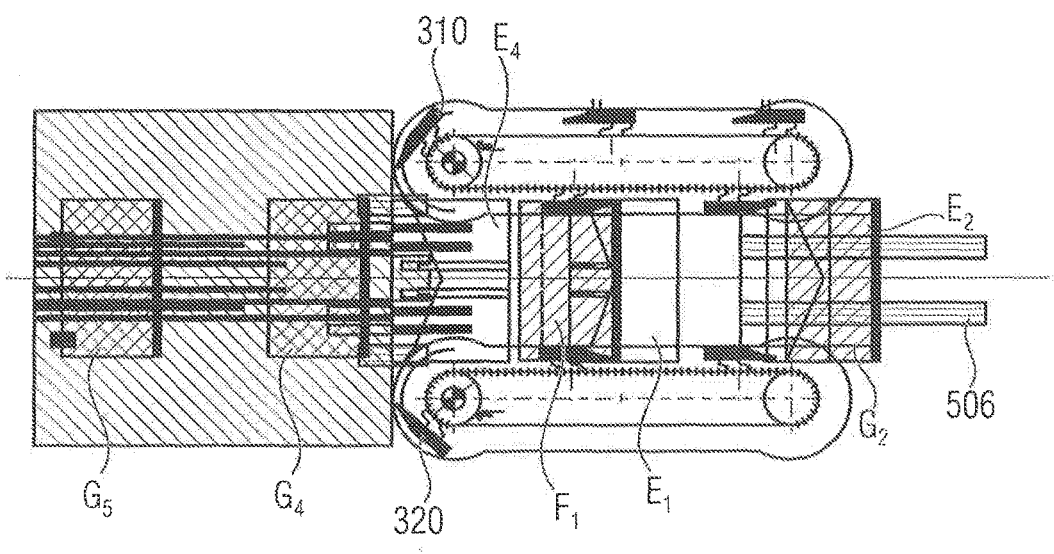
Figure 3D:
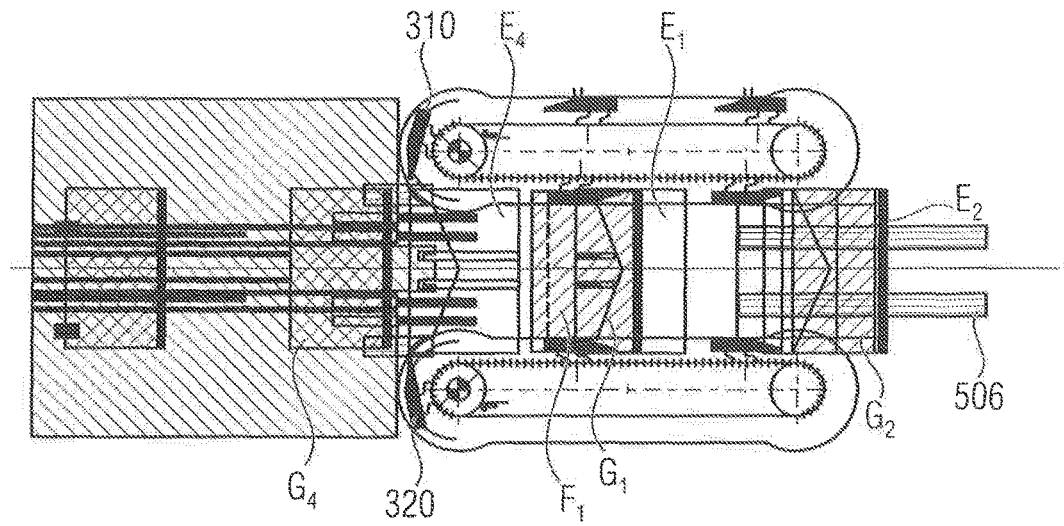
Figure 3E:
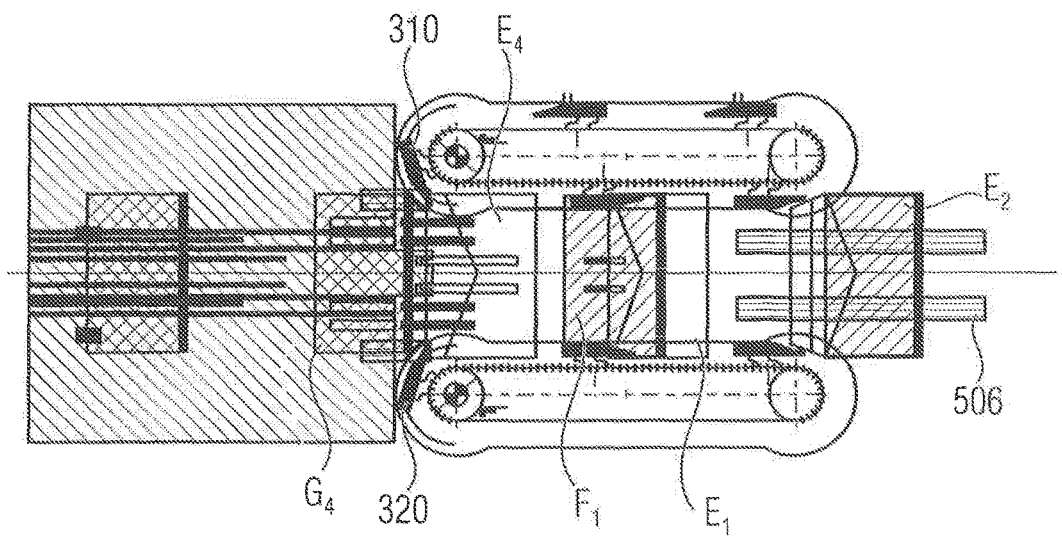
Figure 3F:
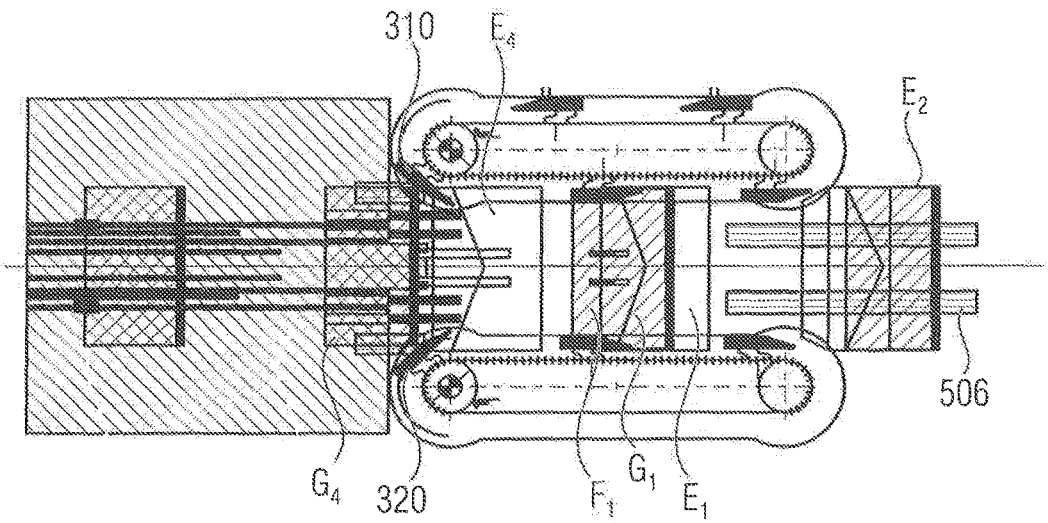
Figure 3G:
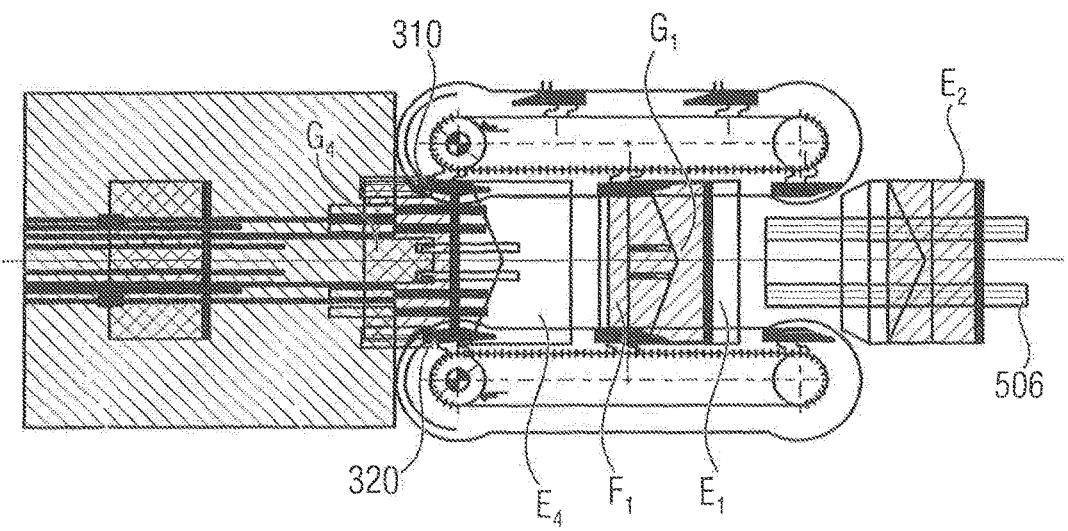
Figure 3H:
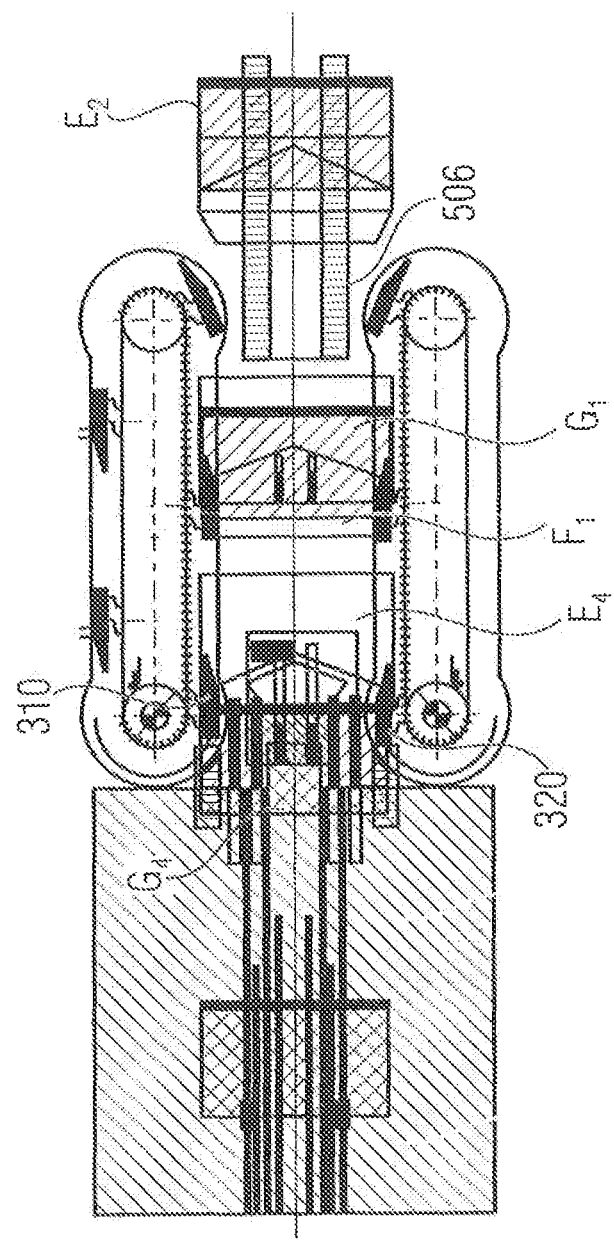

In the embodiment of FIG. 30 the additional envelope transport 800 is provided for transporting the filled envelope to an output transport 506 for moving a filled envelope towards an output of the inserter as is for example shown in FIG. 3(a). Alternatively, the additional envelope transport 800 may extend further in the transport direction to the output of the inserter (where the filled envelope is transferred to a subsequent station like a metering device, a sorter etc.). In this case, the additional envelope transport 800 also forms the output transport 506 of the inserter.

Figure 31:
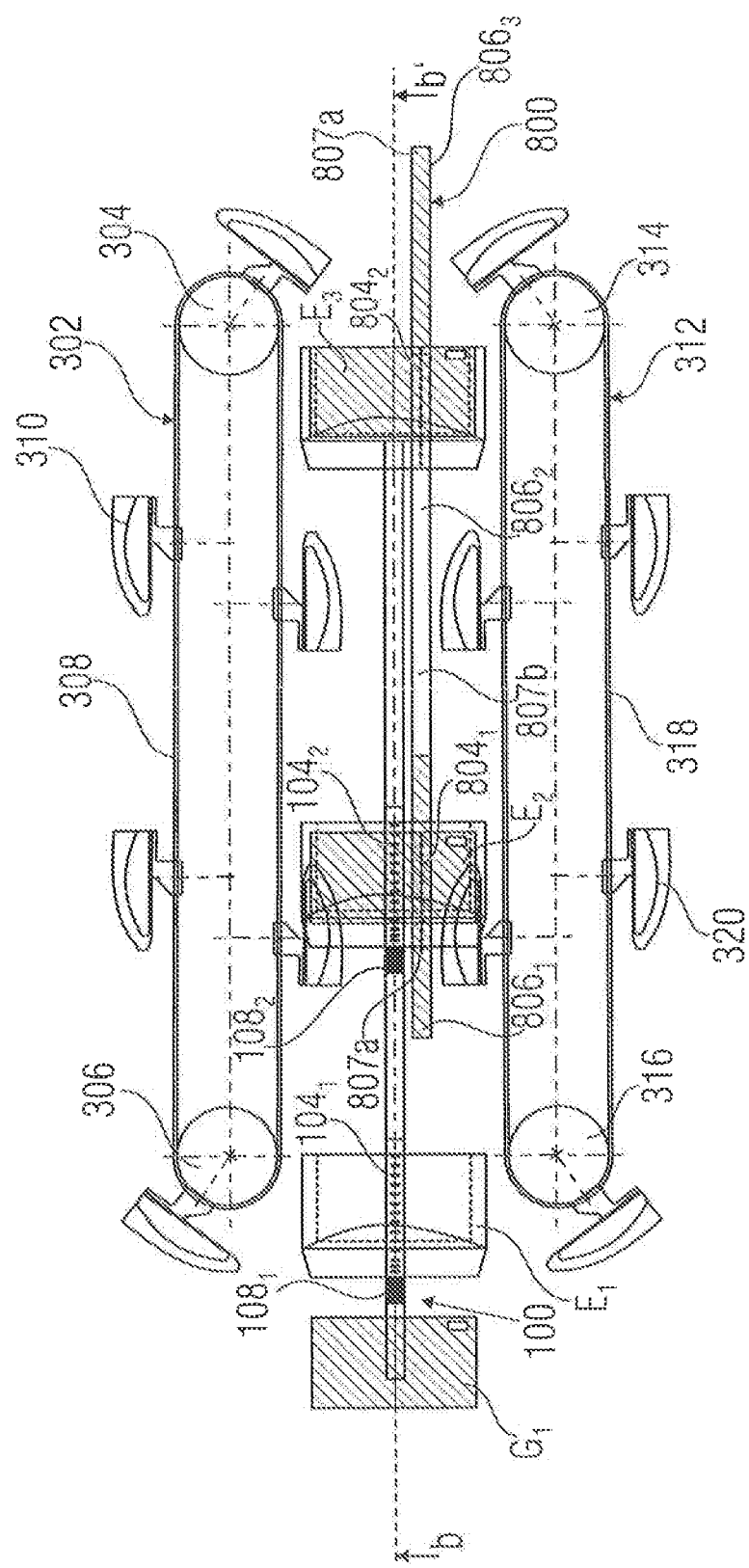
FIG. 31 shows another embodiment of the additional envelope transport.

FIG. 31 shows another embodiment of the additional envelope transport 800. In this embodiment, the additional envelope transport 800 is arranged between the transport 100 and the second conveyor 312 of the filling aid 300. Otherwise, the embodiment of FIG. 31 corresponds to the one of FIG. 30.

Figure 32:
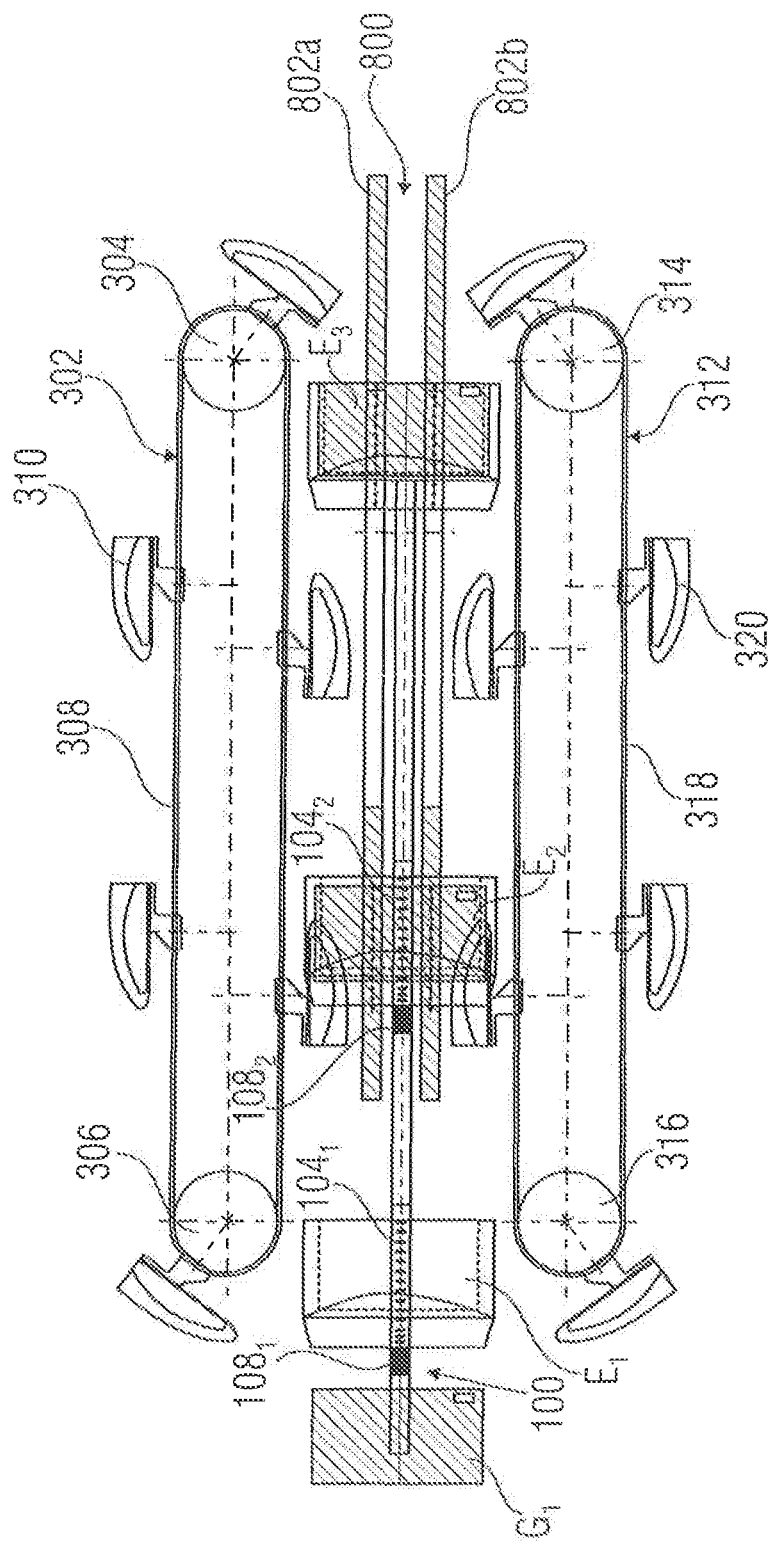
FIG. 32 shows yet another embodiment of the additional envelope transport.

FIG. 32 shows yet another embodiment of the additional envelope transport 800. In this embodiment, the additional envelope transport 800 comprises a first suction belt 802a arranged between the transport 100 and the first conveyor 312 of the filling aid 300 and a second suction belt 802b arranged between the transport 100 and the second conveyor 312 of the filling aid 300. The belt 802a corresponds to the one of FIG. 30, and the belt 802b corresponds to the one of FIG. 31. Using two belts may be advantageous to avoid a rotational movement of the filled envelope and to maintain its orientation during transport.

Instead of the above described suction transport comprising the suction belt also other transports for realizing the additional envelope transport are possible, e.g. a belt transport or one or more suction rollers.

Figure 33:
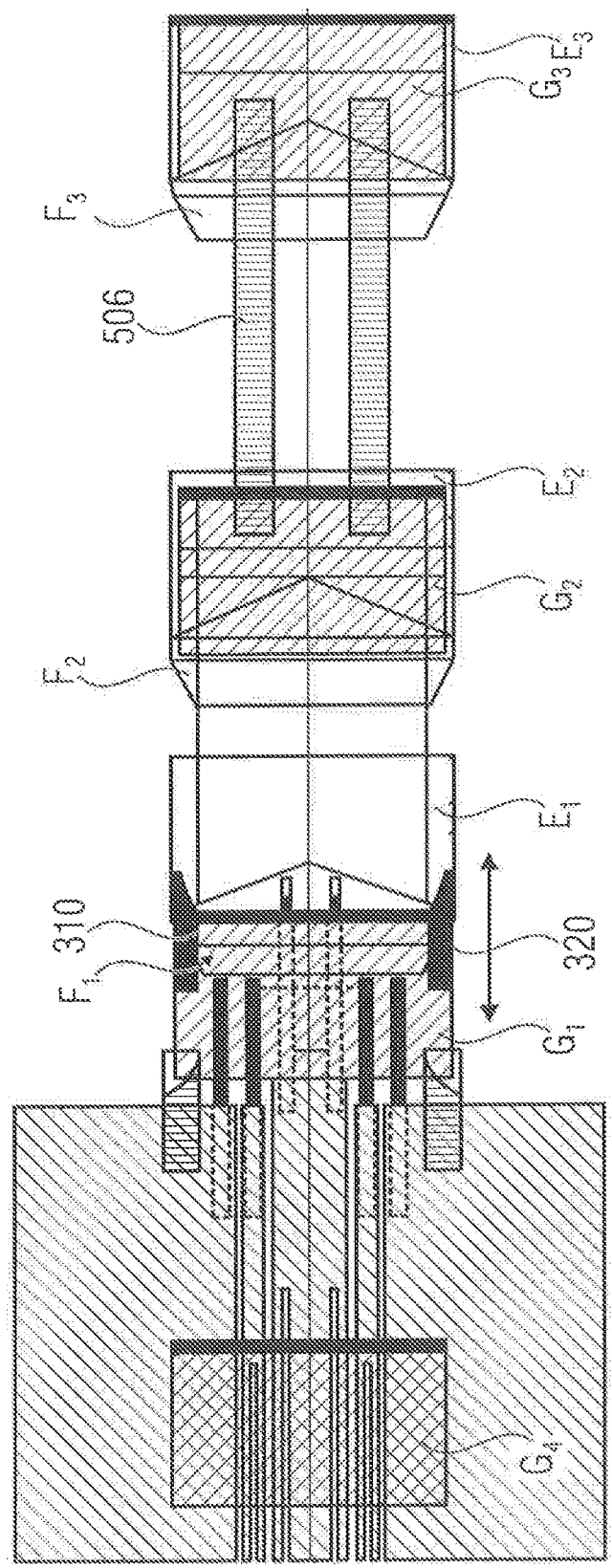
FIG. 33 shows a schematic representation of an alternative embodiment for realizing the filling fingers.

In the following, further embodiments of the filling aid will be described. More specifically, in the embodiments described so far the filling aid comprises the conveyors for moving the filling fingers at least partly along the filling path together with the envelope. However, the present invention is not limited to such embodiments. It is sufficient to provide the filling fingers such that they are present until the goods have passed the hinge line of the envelope. FIG. 33 shows a schematic representation of an alternative embodiment for realizing the filling fingers. As can be seen, no conveyor is provided, rather, the filling fingers 310, 320 are arrange movable (back and forth) along the direction indicated by the arrow. When the envelope $E_1$ is supplied to the filling path, the filling fingers 310, 320 are in a rest or standby position which may be upstream of the filling path entrance. Once the envelope was supplied to the filling path the filling fingers 310, 320 are moved in the transport direction to be moved at least partly into the envelope. Once the goods $G_1$ passed the hinge line of the envelope $E_1$ the filling fingers 310, 320 may be retraced to their standby position until a new envelope has been supplied. As can be seen from FIG. 33, no filling fingers are in the envelope $E_2$ during the further filling process. The standby position of the filling fingers 310, 320 may be different from the above mentioned position. For example, the standby position may be at the sides of the filling path, and the filling fingers 310, 320 may be arranged rotatable to be moved from the standby position into the filling path and into the envelope and back into the standby position. Alternatively, the standby position of the filling fingers 310, 320 may be above or below the filling path.

Further, it is noted that embodiments may be provided that allow the handling only one envelope at a time, i.e., only one envelope is arranged along the filling path. In such an embodiment the envelope transport may extend all the way through the filling path to the output transport or the inserter output so that the unfilled and the filled envelope is transported by the same transport. The goods transport will operate at a higher velocity than the envelope transport until the envelope is filled. After filling is complete the goods transport may be decelerated (alternatively the envelope transport may be accelerated) for releasing the goods from the goods transport.

In the embodiments described so far the goods are transported faster than the envelope so that the goods will be filled into the opened envelope. The present invention is not limited to such embodiments. In accordance with another embodiment the envelope may be transported faster than the goods so that the goods will be filled into the envelope. For example, when considering an inserter as shown in FIG. 1 and FIG. 2, the transport elements are modified to allow for the transport of the envelope and the goods from the right to the left (i.e. the transport direction F is opposite to the one shown in FIG. 2). The envelope is opened and when starting to overtake the "slower" goods the envelope is moved over the goods (i.e. the goods are received inside the envelope).

As can be seen from the embodiments described above, in accordance with the inventive approach an apparatus for inserting one or more goods into a moveable envelope is described. However, while the embodiments have been described on the basis of goods and envelopes comprising flaps, it is noted that the invention is not limited to such embodiments. Rather, the inventive approach is applicable to any kind of cover that is provided for receiving one or more goods therein. The cover and the goods are both moved during the inserting process and the filling aid is provided in a way as described above. In accordance with embodiments, the cover conveyor is arranged opposite to the goods conveyor and engages the cover at at least two locations or along a position of the cover. For example instead of the number of openings in the suction belt, one or more slits extending in the longitudinal direction of the belt may be provided. The at least two locations may be arranged consecutively along the cover transport direction or lateral to the cover transport direction. The elongated position may also be along the transport direction or lateral thereto. Further, in accordance with embodiments the respective drives of the different conveyors/transports are independent of each other so that each of the drives may be driven using individual driving and velocity curves. Instead of the suction belt and the gripper transport also conveyor using a pusher or a slider may also be used. While it has been mentioned above that the goods transport operates at a speed equal to or less than the speed of the cover transport, it is noted that the filling aid conveyors may be operated at a velocity that is independent of the velocity of the transport.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for inserting one or more goods into a moving cover, comprising:
   a cover feeder;
   a cover transport configured to receive the cover from the cover feeder and to move the cover along a filling path, along which the one or more goods are inserted into the cover; and
   at least one separating device configured to
      open the cover so that a first part and a second part of the cover are separated from each other, and
      engage with the first part of the cover and maintain the first part of the cover separate from the second part of the cover during at least a part of the movement of the cover; wherein
   the cover is moved by the cover transport independent of the separating device; and
   the cover transport moves the cover along the filling path at least until the one or more goods are completely inside the cover.

2. The apparatus of claim 1, wherein, for opening the cover, the separating device is configured to be arranged initially at a first position within or below a cover transport level, and to be moved subsequently to a second position above the cover transport level, wherein at the first position the separating device is in contact with the second part of the cover, and wherein at the second position the separating device is in contact with the first part of the cover.

3. The apparatus of claim 1, further comprising:
   a conveyor to which the separating device is mounted; wherein
   the conveyor is configured to move the separating device;
   the first part of the cover includes a cover front side and the second part of the cover includes a cover back side;
   at a first position the separating device contacts the cover front side;
   at a second position the separating device separates the cover back side from the cover front side; and
   the conveyor moves the separating device between the first position and the second position.

4. The apparatus of claim 3, wherein the conveyor comprises a deflection element configured to deflect the separating device at the beginning of the filling path into a first position which is within or below a cover transport level.

5. The apparatus of claim 3, wherein at least two separating devices are provided which are arranged consecutively along the conveyor.

6. The apparatus of claim 1, wherein the separating device is configured to move together with the moving cover during at least a part of its movement for maintaining the first part of the cover separate from the second part of the cover, and wherein the separating device is configured to move along at least a section of the filling path in a direction along which the cover and the one or more goods are moveable along the filling path so as to engage with the first part of the cover as the cover moves.

7. The apparatus of claim 1, wherein the filling path extends in a cover transport direction and a goods transport direction, wherein a cover opening is oriented lateral to the cover transport direction.

8. The apparatus of claim 1, wherein the separating device is arranged outside a level in which the cover is moved, and wherein the separating device is arranged above the cover transport level.

9. The apparatus of claim 1, wherein the separating device is configured to be moved with a velocity which is independent from a velocity at which the cover is moved.

10. The apparatus of claim 1, comprising at least one movable filling device configured to be laterally moved into the cover.

11. The apparatus of claim 1, wherein the separating device is arranged such that it engages the first part of the cover symmetrically with regard to center of the cover.

12. The apparatus of claim 1, comprising an additional cover conveyor configured to transport the filled cover with a velocity higher than the cover transport, higher than a velocity of a filling aid, and/or higher than a velocity of a goods transport.

13. The apparatus of claim 12, wherein the additional cover conveyor comprises a suction transport.

14. The apparatus of claim 1, wherein the cover comprises an envelope, wherein the envelope comprises a first side comprising an envelope flap, and a second side being opposite to the side including the envelope flap.

15. An apparatus for inserting one or more goods into an envelope, wherein the envelope comprises a first side comprising an envelope flap, and a second side being opposite to the side including the envelope flap, the apparatus comprising:
    a path along which an envelope and one or more goods to be inserted can be moved, wherein the path is arranged to move the one or more goods with a faster velocity than the envelope,
    an envelope feeder;
    an envelope transport configured to receive the envelope from the envelope feeder and to move the envelope along a filling path, along which the one or more goods are inserted into the envelope, and
    at least one separating device configured to
        open the envelope so that the first side and the second side of the envelope are separated from each other, and
        engage with the second side of the envelope and maintain the second side of the envelope cover separate from the first side of the envelope during at least a part of the movement of the envelope; wherein
    the envelope is moved independent of the separating device; and
    the cover transport moves the cover along the filling path at least until the one or more goods are completely inside the cover.

16. The apparatus of claim 15, wherein, for opening the envelope, the separating device is configured to be arranged initially at a first position within or below an envelope transport level, and to be moved subsequently to a second position above the envelope transport level, wherein at the first position the separating device is in contact with the first side of the envelope, and wherein at the second position the separating device is in contact with the second side of the envelope.

* * * * *